United States Patent
Kaneko et al.

(10) Patent No.: US 7,952,757 B2
(45) Date of Patent: May 31, 2011

(54) PRODUCTION OF COLOR CONVERSION PROFILE FOR PRINTING

(75) Inventors: Nao Kaneko, Suwa (JP); Yoshifumi Arai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 312 days.

(21) Appl. No.: 11/820,005

(22) Filed: Jun. 14, 2007

(65) Prior Publication Data

US 2007/0291312 A1 Dec. 20, 2007

(30) Foreign Application Priority Data

Jun. 14, 2006 (JP) .................................. 2006-165043

(51) Int. Cl.
*G03F 3/08* (2006.01)
*H04N 1/46* (2006.01)
*G09G 5/02* (2006.01)

(52) U.S. Cl. ......... 358/1.9; 358/518; 358/523; 358/530; 345/601; 345/602; 345/603; 345/604

(58) Field of Classification Search ................. None
See application file for complete search history.

(56) References Cited

U.S. PATENT DOCUMENTS

| 5,309,525 A * | 5/1994 | Shimomura et al. .......... 382/157 |
| 5,612,902 A * | 3/1997 | Stokes ............................ 702/85 |
| 7,180,629 B1 * | 2/2007 | Nishio et al. .................... 358/1.9 |
| 2004/0085556 A1 * | 5/2004 | Shibahara et al. ............. 358/1.9 |
| 2005/0094169 A1 | 5/2005 | Berns et al. |
| 2005/0094871 A1 * | 5/2005 | Berns et al. .................... 382/162 |

FOREIGN PATENT DOCUMENTS

| WO | WO2005/043884 | 5/2005 |
| WO | WO2005/043885 | 5/2005 |
| WO | WO2005/043889 | 5/2005 |

* cited by examiner

*Primary Examiner* — Benny Q Tieu
*Assistant Examiner* — Haris Sabah
(74) *Attorney, Agent, or Firm* — Martine Penilla & Gencarella, LLP

(57) ABSTRACT

A system is configured to calculate an evaluation index of sample ink amount data from a color difference evaluation index and an image quality evaluation index and create a profile on the basis of a sample with a high rating value. When the image quality evaluation index is predicted, the image quality evaluation index corresponding to any sample ink amount data is estimated based on a profile produced on the basis on actual evaluation. A printer driver is configured to create a plurality of profiles by using different indices in this system and to perform color conversion by using the plurality of profiles. The plurality of profiles are appropriately selected according to the user's needs, printing conditions, and type of printing object image.

8 Claims, 32 Drawing Sheets

(A) NON-UNIFORM INTERPOLATION (B) BEFORE NON-UNIFORM INTERPOLATION (C) AFTER NON-UNIFORM INTERPOLATION

(A) SPECTRAL NEUGENBAUER MODEL $$R(\lambda) = a_w R_w(\lambda) + a_c R_c(\lambda) + \cdots + a_k R_k(\lambda)$$

$$a_w = (1-f_c)(1-f_m)(1-f_y)$$
$$a_c = f_c(1-f_m)(1-f_y)$$
$$a_m = (1-f_c)f_m(1-f_y)$$
$$a_y = (1-f_c)(1-f_m)f_y$$
$$a_r = (1-f_c)f_m f_y$$
$$a_g = f_c(1-f_m)f_y$$
$$a_b = f_c f_m(1-f_y)$$
$$a_k = f_c f_m f_y$$

(B) MURRAY-DAVIES MODEL $$f_c = f_{1D-LUT}(d_c)$$

(A) CELL DIVISION YULE-NIELSEN SPECTRAL NEUGENBAUER MODEL (B) INK AREA COVERAGE (C) CALCULATION OF SPECTRAL REFLECTANCE $Rsmp(\lambda)$ $$Rsmp(\lambda) = \left(\sum a_i R_i(\lambda)^{1/n}\right)^n$$
$$= \left(a_{11}R_{11}(\lambda)^{1/n} + a_{12}R_{12}(\lambda)^{1/n} + a_{21}R_{21}(\lambda)^{1/n} + a_{22}R_{22}(\lambda)^{1/n}\right)^n$$

$$a_{11} = (1-f_c)(1-f_m)$$
$$a_{12} = (1-f_c)f_m$$
$$a_{21} = f_c(1-f_m)$$
$$a_{22} = f_c f_m$$

|  | DIGITAL COUNTS OF INK AMOUNT | | | |
|---|---|---|---|---|
| CYAN | 0 | 50 | 168 | 255 |
| MAGENTA | 0 | 56 | 173 | 255 |
| YELLOW | 0 | 49 | 162 | 255 |
| BLACK | 0 | 56 | 126 | 255 |
| LIGHT CYAN | 0 | 43 | 182 | 255 |
| LIGHT MAGENTA | 0 | 64 | 186 | 255 |

FIG. 11

$$R(\lambda)=\{a_w R_w(\lambda)^{1/n}+a_c R_c(\lambda)^{1/n}+a_m R_m(\lambda)^{1/n}+a_b R_b(\lambda)^{1/n}\}^n$$

$$a_w = (1-f_c)(1-f_m)$$
$$a_c = f_c(1-f_m)$$
$$a_m = (1-f_c)f_m$$
$$a_b = f_c f_m$$

$$SI_3 = |(\vec{L}a_1 - \vec{L}p)| + |(\vec{L}a_2 - \vec{L}p)|$$
$$+ |(\vec{L}a_3 - \vec{L}p)| + |(\vec{L}a_4 - \vec{L}p)|$$
$$+ |(\vec{L}a_5 - \vec{L}p)| + |(\vec{L}a_6 - \vec{L}p)|$$

↓ MINIMIZATION

| C | M | Y | K | Ic | Im | GI |
|---|---|---|---|----|----|----|
| 0 | 0 | 0 | 0 | 0 | 0 | 2 |
| 128 | 0 | 0 | 0 | 0 | 0 | 2.3 |
| 256 | 0 | 0 | 0 | 0 | 0 | 2.1 |
| 0 | 128 | 0 | 0 | 0 | 0 | 2.3 |

LUT(200)

FIG. 32

PRODUCTION OF COLOR CONVERSION PROFILE FOR PRINTING

The entire disclosure of Japanese Patent Application No. 2006-165043, filed on Jun. 14, 2006, is expressly incorporated by reference herein.

BACKGROUND OF THE INVENTION

1. Field of the Invention

The present invention relates to a technology for producing a color conversion profile for use in printing.

2. Description of the Related Art

In recent years, the use of ink-jet printers and laser printers as color printers has become widespread. A color printer uses a color conversion lookup table to convert input color image data into amounts of inks of a plurality of types. In the conventional method for producing a color conversion lookup table, (i) a large number of color patches are printed, (ii) colors of the color patches are measured to obtain calorimetric values, and (iii) a lookup table that represents correspondence relationships between the colorimetric values of color patches and the amounts of ink used to print the color patches is produced.

However, calorimetric values are dependent upon viewing conditions during colorimetry. Accordingly, even when a color conversion lookup table has been produced so as to give a printout having good color reproduction under a certain viewing condition, printouts produced using the color conversion lookup table sometimes cannot achieve good color reproduction under other viewing conditions. Accordingly, there has existed a need for a color conversion lookup table that enables good color reproduction under various viewing conditions. There has also been a need, for example, when producing a copy of a painting, to produce a color conversion lookup table that can reproduce as faithfully as possible the color appearance of the original.

Further, the quality of printouts produced using a color conversion lookup table is greatly dependent upon the ink amount and calorimetric values defined in the color conversion lookup table. Actually, it is necessary to produce a color conversion lookup table so that good color reproduction can be achieved under various viewing conditions and at the same time a printout with high image quality can be obtained. Accordingly, as mentioned hereinabove, there has been a need to produce a color conversion lookup table that ensures good color reproduction under various viewing conditions and at the same time enables printing of high-quality images. Such requirements are not limited just to color conversion lookup tables, but are generally common for various types of profiles used for color conversion.

Thus, as described above, a color conversion lookup table has to satisfy simultaneously a large number of different requirements, but the required properties can differ depending on printing application, conditions during printing, and user's needs. Accordingly, a system is needed that can easily produce an adequate profile corresponding to printing application or conditions during printing and makes it possible to select an adequate profile according to printing application or conditions during printing from among a large number of profiles.

Further, while it is desirable to produce an adequate profile that reflects the results obtained in simultaneous evaluation of a large number of different properties according to printing application, conditions during printing, and user's needs, as described hereinabove, the increase in the number properties that have to be evaluated will predictably make it impossible to produce a profile rapidly. In particular, in evaluating the image quality, quantification corresponding to viewer's vision has to be performed and such quantification requires complex computations. Accordingly, there has been a need for a system that can produce a profile rapidly and easily, while efficiency evaluating the image quality.

SUMMARY OF THE INVENTION

In accordance with the present invention, profiles that differ for each application and condition are adequately used and profiles that differ for each application and condition are easily produced.

The present invention provides an apparatus for performing color conversion by referring to a profile defining correspondence relationship between calorimetric values and ink amount data, comprising:

a profile memory that stores a plurality of profiles; and a color converter that selects one profile from among the plurality of profiles and converts given calorimetric values into ink amount data by referring to the selected profile, wherein each profile is produced using a plurality of sample ink amount data selected based on evaluation indices including a color difference index and an image quality index; the color difference index represents a color difference between a sample color calculated from a spectral reflectance of a virtual sample patch that has to be printed with an ink amount represented by the sample ink amount data and a comparative color selected as a basis for comparison; and at least one of image quality indices is a graininess index obtained by applying the sample ink amount data to a graininess profile prepared based on a plurality of correspondence relationships between ink amount data for graininess evaluation and sample graininess indices obtained by actually evaluating a patch for graininess evaluation that is actually printed with an ink amount represented by the ink amount data for graininess evaluation.

With such device, a desired profile can be selected from among a plurality of profiles, for example, color conversion profiles that achieve good color reproduction under various viewing conditions, color conversion profiles capable of reproducing as faithfully as possible the color appearance of an original, and color conversion profiles that can realize printing with high image quality, and color conversion can be performed. By performing printing with data after such color conversion, it is possible to obtain printouts capable of achieving good color reproduction under various viewing conditions, printouts capable of reproducing as faithfully as possible the color appearance of an original, and printouts with high image quality.

When a profile is produced, adequate indices are selected from color difference evaluation indices and image quality evaluation indices. Therefore, the desired profile can be easily produced. An evaluation index that includes a color inconstancy index or an evaluation index that includes a metamerism index can be used as a color difference evaluation index. When an evaluation index that includes a color inconstancy index is used, it is possible to produce a color profile that achieves good color reproduction under various viewing conditions. On the other hand, when a metamerism index is used, it is possible to produce a color profile capable of reproducing as faithfully as possible the color appearance of an original.

The image quality evaluation indices include at least an index for evaluating graininess; in addition, an index that evaluates the degree of smoothness of grid point arrangement, an index that evaluates the size of color gamut, and an index that evaluates the amount of ink can be also employed. When an index that evaluates graininess is used, the graininess can be made less visible to the viewer. The graininess index can be obtained in the following manner. First, a patch for graininess evaluation is actually printed with an ink amount represented by a plurality of ink amount data for graininess evaluation, the patch for graininess evaluation is actually evaluated, and a sample graininess index is obtained. A plurality of correspondence relationships between the sample graininess indices and ink amount data for graininess evaluation can thus be obtained, and a graininess profile is prepared based on this correspondence relationship. Then, by applying the prepared graininess profile to the required sample ink amount data, it is possible to obtain a graininess index of a virtual sample patch that has to be printed with the ink amount represented by the sample ink amount data.

An index that evaluates the degree of smoothness of arrangement of grid points corresponding to sample colors in a predetermined color space can be used as the index for evaluating the degree of smoothness. Where the arrangement of grid points corresponding to sample colors is smooth in the predetermined color space, the conversion accuracy obtained with the color conversion profile increases and the appearance of tone jumps can be suppressed. Thus, interpolation calculations are used when a color conversion profile is produced and when color conversion is performed after the profile has been produced. Generally, with a regular arrangement of grid points in each color space, when colors located between the grid points are calculated by interpolation calculations, the interpolation can be performed without significant fluctuations of interpolation accuracy caused by local position in the space. Therefore, by smoothing the arrangement of grid points in accordance with the present invention, it is possible to perform highly accurate interpolation calculation when a color conversion profile is produced and when color conversion is performed after the profile has been produced. As a result, the occurrence of tone jumps can be prevented and a color conversion profile enabling the production of printouts with smooth changes of gradation can be created. Further, when the arrangement of grid points is smoothed, a large color gamut can be ensured by performing smoothing, while using binding conditions that maintain the size of color gamut. As a result, a gradation-rich printout can be obtained.

With an index that evaluates a color gamut size, the color gamut size can be maximized, and this index also makes it possible to obtain a gradation-rich printout. Further, with the index evaluating ink amount, ink bleeding can be prevented and a printout with high image quality can be obtained.

The present invention may take the form of any of a number of different embodiments, for example, a profile production method and profile production device, a computer program for realizing the functions of such a method or device, a storage medium having such a computer program recorded thereon, and a data signal including such a computer program and embodied in a carrier wave.

BRIEF DESCRIPTION OF THE DRAWINGS

FIG. 11 shows grid point coordinates of cell division in the Cellular Yule-Nielsen Spectral Neugebauer model;

FIG. 32 is a table illustrating a graininess profile of a variant example of the present invention.

DESCRIPTION OF THE EXEMPLARY EMBODIMENTS

The embodiments of the present invention will be described below in the following order.
A. First Embodiment
 A-1. Configuration of Color Converter.
 A-2. Configuration of Profile Generator.
B. Example of Spectral Printing Model.
C. Example of Graininess Profile
D. Variant Examples

A. First Embodiment

A-1. Configuration of Color Converter.

Figure 1:
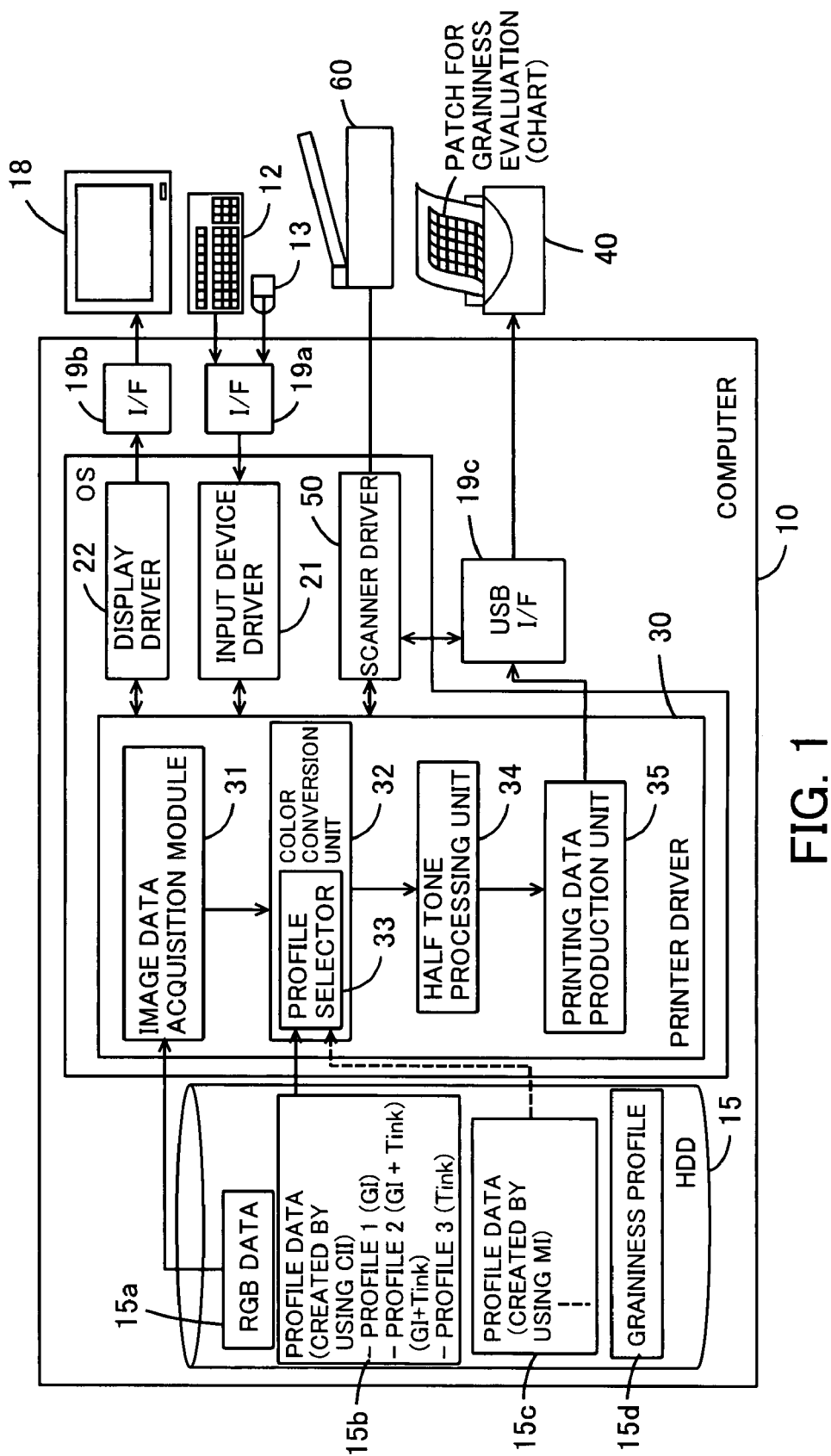
FIG. 1 is a block diagram showing a system configuration in the first embodiment of the invention.

FIG. 1 is a block diagram illustrating the configuration of a color converter that is an first embodiment of the present invention. This color converter is realized by employing a configuration making it possible to implement the color conversion in accordance with the present invention with a computer 10 of general use. It goes without saying that other configurations can be also employed. The computer 10 comprises a CPU and a ROM or a RAM as a storage medium (not shown in the figure) that serve as a computation center and can execute a predetermined program including the program of the present invention, while using a peripheral device such as an HDD 15. An input device for operation such as a keyboard 12 or a mouse 13 is connected to the computer 10 via an I/F 19a, and a display 18 for performing display is also connected to the computer via the I/F 19b. Furthermore, a printer 40 and a scanner 60 are connected to the computer 10 via an USB I/F 19c.

The printer of the present embodiment has a structure in which ink cartridges filled with inks of a plurality of colors are detachably installed for each color, and this structure carries cartridges of each color of CMYKlclm (cyan, magenta, yellow, black, light cyan, light magenta) system. In the printer 40, inks can be ejected from the nozzles formed in the carriage, while causing the main scanning of the carriage and the auxiliary scanning with a paper feed roller, multiple colors are formed by combining the ink colors, and a color image is thereby formed on a printing medium. The printer of the present embodiment is a printer of an ink jet type, but the present invention is applicable not only to the ink jet system, but also to printers of various other types such as laser printers.

In the computer 10 of the present embodiment, a printer driver 30, a scanner driver 50, an input device driver 21, and a display driver 22 are incorporated in an OS 20. The display driver 22 controls the display of a printing object image in the display 18 or a property screen of the printer. The input driver 21 receives the code signals from the keyboard 12 or mouse 13 that are inputted via the I/F 19a and receives a predetermined input operation. The scanner driver 50 serves to control the scanner 60 and generates image data based on the image read with the scanner 60.

The configuration of the embodiment shown in FIG. 1 makes it possible to realize the color conversion in accordance with the present invention with the printer driver 30. In the printer driver 30, printing is executed by performing the predetermined processing with respect to an image that is indicated for printing by an application program (not shown in the figure). For this purpose, the printer driver comprises an image data acquisition module 31, a color converter 32, a half-tone processing unit 34, and a print data creation unit 35.

The print data acquisition module 31 acquires RGB data 15a from the HDD 15 and changes the number of pixels by interpolation or the like, as necessary, if the number of pixels is too large or too small on the basis of resolution during printing with the printer. The RGB data are dot-matrix data that represent by gradation each color component of RGB (red, green, blue) and define the color of each pixel. In the present embodiment, the data employ a color system according to an sRGB standard in which there are 256 gradations of each color. In the present embodiment, the RGB data are explained by way of an example, but a variety of other data such as JPEG image data employing an YCbCr color system or data employing a CMYK color system can be also employed.

The color converter 32 is a module that comprises a profile selector 33, refers to a profile selected by the profile selector 33, and converts the color system of RGB data to a CMYKlclm color system. In a working example, the input values are gradation values that represent the ejection amount of ink of each color of CMYKlclm by 256 gradations. In the embodiment shown in FIG. 1, profile data 15b, 15c of a plurality of types are recorded in the HDD 15. These profile data 15b, 15c are further subjected to fine division, and a plurality of profiles (profile 1, profile 2, ...) are recorded for each profile data 15b, 15c. The profiles serve to convert the RGB data 15a (for example, sRGB data) to ink amount data and are in the form of tables that represent the colors with the sRGB color system and CMYKlclm color system, associate the two systems to each other, and describe the correspondence relationship for a plurality of colors. Therefore, any color represented in the sRGB color system can be converted into a color of the CMYKlclm color system by interpolation calculations.

The profile data 15b is a profile produced by selecting ink amount data so as to minimize the difference in color appearance when the printing results are observed under different viewing conditions. In the example shown in FIG. 1, the ink amount data are selected using a CII (Color Inconstancy Index) in order to minimize the difference in color appearance. The profile data 15c is a profile produced by selecting ink amount data so as to bring the color of the printout as close as possible to the color of the original even when the printout and the original are observed under different viewing conditions when a certain original is printed with the printer 40. In the example shown in FIG. 1, the ink amount data are selected using a MI (Metameric Index) so as to bring the color of the printout as close as possible to the color of the original. The MI is a color difference evaluation index CDI that indicates the difference between two colors. Further, the CII is a color difference evaluation index CDI indicating the difference in color when a common sample is observed under two viewing conditions.

In the present embodiment the image quality of the printout that is printed with the ink amount data is evaluated using the color difference evaluation index CDI and also an image quality evaluation index IQI, and ink amount data enabling the realization of high-quality printing are selected. A variety of indices can be employed as the image quality evaluation index. In a working example, a graininess index (GI) that evaluates the printout graininess and an index (Tink) that evaluates the amount of ink used are employed. It goes without saying that a variety of the indices also can be employed as the image quality evaluation index, provided that they enable the evaluation relating to image quality. A plurality of profiles can be produced as the aforementioned profile data 15b, 15c if the ink amount data are selected by employing any of the aforementioned GI and Tink or any combination thereof. The profiles that are thus produced in advance are recorded as the profile data 15b, 15c in the HDD 15. Further, the CII, MI, GI, Tink are calculated using respective sample ink amount data, but functional forms thereof are different. The process of producing profiles using these indices will be described below in greater detail.

The profile selector 33 selects and acquires an adequate profile from the profiles stored in the HDD 15. Thus, because different indices are used when the profile data 15b, 15c are produced, the ink amount data obtained with each profile differ from each other and the images that are preferred as the color conversion objects or printing conditions are also different. Accordingly, by selecting an adequate profile with the profile selector 33 and referring to the selected profile in the color converter 32, color conversion can be accurately carried out correspondingly to the image that is the printing object, printing conditions, and the user's intent.

A configuration selected by the user in advance can be employed for the profile selector 33, as a working example, provided that an adequate profile can be selected. For example, by displaying a setting screen (not shown in the figures) on the display 18 with the printer driver 30 and receiving the inputs from the keyboard 12 or the like, the indices indicated by the user or the profile itself can be recognized. Further, where this profile is selected in the profile selector 33, color conversion that accurately corresponds to the user's intent can be implemented.

For example, in the profile 1 to profile 3 using CII, only GI, GI and Tink, and only Tink are taken into account, respectively. In the profile 2, an ink amount data with the preferred values of GI and Tink indices is selected, but when the GI and Tink are added as conditions, as compared with the case when only CII is used, it is impossible obtain independently optimum indices for the CII, GI, and Tink and the value of CII itself tends to increase. On the other hand, in the profile 1, the GI is taken into account and the Tink is not taken into account, whereas in the profile 3, the Tink is taken into account, but GI is not taken into account. Therefore, the CII tends to be lower in the profile 1 and profile 3 than in the profile 2. Further, in the profile 1, the graininess is difficult to feel. Thus, where the options such as in the above-described profile 1 to profile 3 are available, the number of choices increases. For example, it is possible to sacrifice any one of the GI and Tink and emphasize the suppression of the difference in color appearance. In any case, by employing a configuration that enables the selection of the profile intended by the user, printing that matches the user's objective can be executed. Further, with the configuration that selects a profile, but also clarifies the indices that are used to produce the profile at the same time as the profile is selected, it can be said that the selection of indices is essentially made by the user.

Further, when the profile selector 33 selects the profile data 15b, the color converter 32 functions as a color conversion unit that converts the RGB data 15a into ink amount data so that the calorimetric values obtained in observing the printout obtained with the ink amounts after the conversion under different viewing conditions will match one another. When the profile selector 33 selects the profile data 15c, the color converter 32 functions as a color conversion unit that converts the RGB data 15a into ink amount data so that a spectral reflectance of the image indicated by the inputted RGB data 15a is reproduced. Therefore, it can be said that a color conversion unit having multiple functions is provided by the profile selector 33 and the color converter 32.

The half-tone processing unit 34 generates for each color the half-tone data that represent the color of each pixel with fewer gradations (two gradations in the present embodiment) than in the CMYKlclm data by referring to the CMYKlclm data obtained by conversion with the color converter 32. The print data creation unit 35 receives the half-tone data, arranges the data in the order to be used by the printer, and successively outputs them to the printer by taking the data used for one main scanning cycle as a unit. As a result, the printer prints an image indicated by the RGB data 15a. Further, because the color difference evaluation index and the image quality evaluation index have been taken into account, as described above, in the profile data 15b, 15c that are referred to when the image is printed, good color representation can be attained in the printed image under various viewing conditions. Further, the color appearance of the original can be faithfully reproduced. In addition, printing with high image quality can be carried out.

A-2. Configuration of Profile Production Device

Figure 2:
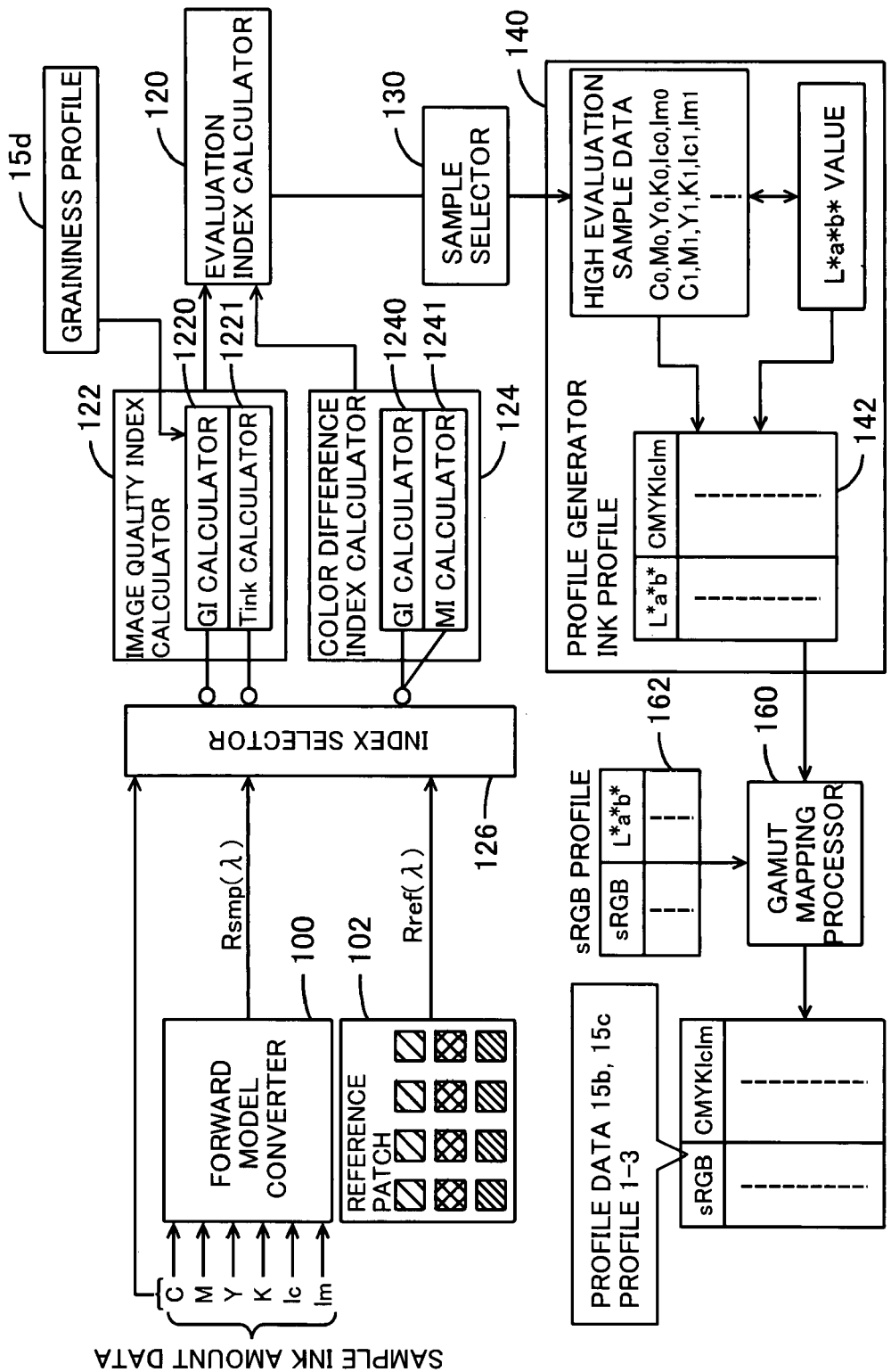
FIG. 2 is a block diagram illustrating the configuration of a system that produces a profile.

A method for producing a profile by referring to a plurality of the above-described indices will be explained below. FIG. 2 is a block-diagram of a profile producing device that produces profiles to be recorded in the HDD 15. This system comprises a spectral printing model converter 100, an evaluation index generator 120, an image quality evaluation index calculator 122, a color difference evaluation index calculator 124, an index selector 126, a sample selector 130, a profile generator 140, and a gamut mapping processor 160. It goes without saying that the system can be realized by using another configuration or a combination of other constituent elements.

In this system, necessary data are prepared and inputted into the index selector 126 before the evaluation indices are produced. The spectral printing model converter 100 converts ink amount data into spectral reflectance $Rsmp(\lambda)$ of a color patch to be printed according to the ink amount data. The term "color patch" in the present specification is not limited to patches of chromatic colors, but is used in a broad sense to include patches of achromatic colors as well. In this embodiment, assuming a color printer that can use six colors of ink, namely, cyan (C), magenta (M), yellow (Y), black (K), light cyan (1c), and light magenta (lm), the spectral printing model converter 100 inputs ejection amounts of these six inks. It goes without saying that inks of other colors can be also used. The spectral printing model will be described in greater detail in Section B. Hereinafter, "spectral printing model" will also be referred to as "forward model".

The reference color patch 102 is prepared as an original for providing a plurality of comparative colors and is an original color patch that includes a plurality of color patches. A plurality of comparative colors may be also acquired, for example, from paintings, in place of the reference color patch 102. The reference color patch 102 is measured with a spectral reflectance meter (not shown in the figure) and a spectral reflectance $Rref(\lambda)$ of each patch is acquired. The color obtained from the reference color patch 102 or paintings will be also referred to as "reference color". The above-described sample ink amount data, spectral reflectance $Rsmp(\lambda)$, and spectral reflectance $Rref(\lambda)$ are inputted in the index selector 126.

The evaluation index generator 120 calculates an evaluation index $EI_1$ for selecting the ink amount data simultaneously satisfying the requirements relating to high quality image and color constancy from the indices outputted from the image quality evaluation index calculator 122 and the color difference evaluation index calculator 124. A plurality of indices can be calculated in the image quality evaluation index calculator 122 and the color difference evaluation index calculator 124, and the index that is the calculation object is selected by the index selector 126. In the embodiment shown in FIG. 2, the image quality evaluation index calculator 122 comprises a GI calculator 1220 that calculates the GI and a Tink calculator 1221 that calculates the Tink. The GI calculator 1220 reads and acquires the graininess profile 15d that is prepared in advance from the HDD 15 and calculates the GI by applying the sample ink amount data to the graininess profile 15d. The graininess profile will be described in greater detail in Section C.

The color difference evaluation index calculator 124 comprises a CII calculator 1240 that calculates the CII and an MI calculator 1241 that calculates the MI. These CII, MI are indices that indicate the difference between a color (sample color) calculated from the sample ink amount data and a comparative color that is used for comparison with the sample color. Formulas for calculating the comparative color or color difference are different for these indices, as will be described hereinbelow.

The index selector 126 acquires data that are necessary to calculate each index and transfers these data to the above-described calculators. Thus, as described hereinabove, the profiles 15b, 15c to be recorded in the HDD 15 are created by using any one of the color difference evaluation indices, and the profile 1 to profile 3 are produced using any combination of image quality evaluation indices. Accordingly, the index calculator 126 selects either the CII calculator 1240 or the MI calculator 1241 and selects either the GI calculator 1220 or the Tink calculator 1221 or both these calculators. The index selector 126 acquires data necessary to calculate the indices in respective calculators and transfers these data to the calculators. As a result, indices are calculated in each calculator. A variety of configurations can be employed in the index selector 126. For example, which index to use can be determined in advance by receiving an indication from the user. Data necessary for calculations in each calculator and the contents of processing using these data will be described in greater detail below.

Where indices are calculated in each calculator, the evaluation index calculator 120 calculates the evaluation index $EI_1$ from these indices. The evaluation index $EI_1$ performs calculations with respect to each of a plurality of ink amount data inputted to the spectral printing model converter 100. The sample selector 130 selects sample ink amount data having a good evaluation index $EI_1$ from the evaluation indices $EI_1$ relating to the plurality of sample ink amount data. The profile generator 140 produces an ink profile 142 by using the selected sample ink amount data and calorimetric values (L*a*b*) of a color patch printed using these sample ink amount data. This ink profile 142 is a lookup table indicating the correspondence relationship of the colorimetric values (L*a*b*) and CMYKlclm ink amounts. "Ink profile" is also called "output device profile". In the present specification, "profile" refers to a specific embodiment of conversion rules for converting a color space, and is used in a broad sense to include device profiles and lookup tables of various kinds. On the other hand, the graininess profile that will be described in greater detail in section C refers to a specific embodiment of conversion rules relating to color space and graininess.

The gamut mapping processor 160 uses the ink profile 142 and the sRGB profile 162, which has been prepared in advance, to produce profiles in the profile data 15b, 15c. For example, a profile for converting the sRGB color space to the L*a*b* color space can be used as the sRGB profile 162. "sRGB profile" is also called "input device profile".

Figure 3:
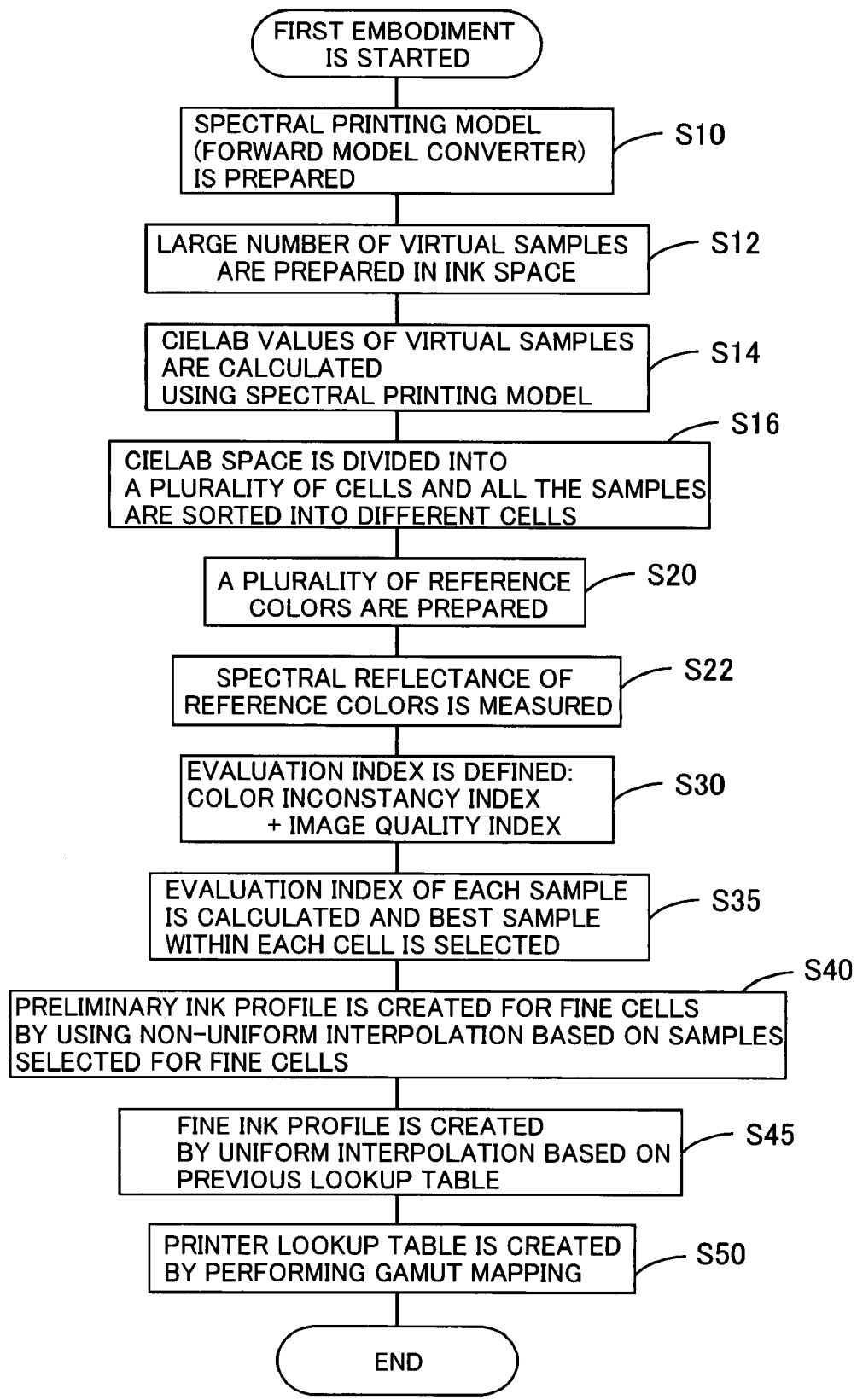
FIG. 3 is a flowchart illustrating the processing procedure in the first embodiment.

Each index will be described below in greater detail with reference to a processing flow in the system shown in FIG. 2. FIG. 3 is a flowchart illustrating the processing procedure. In Step S10, a spectral printing model is determined and a converter 100 is created. In a working example, the Cellular Yule-Nielsen Spectral Neugebauer model is used as the spectral printing model. A detailed description is provided in Section B.

In Step S12, a large number of virtual samples are prepared. Here, "virtual sample" refers to provisional ink amount data used in the profile production process, and means a virtual color patch to be printed according to this ink amount data. Hereinbelow, virtual samples are also referred to as simply "samples". In a working example, ink amounts at eleven points are set at 10% intervals within the range of 0 to 100% for each CMYKlclm ink, and combinations of amounts of all six inks are prepared as virtual samples (sample ink amount data). As a result, $11^6$ (=1,771,561) virtual samples are prepared. "100% ink amount" refers to the amount of ink providing solid coverage with a single ink.

Figure 4:
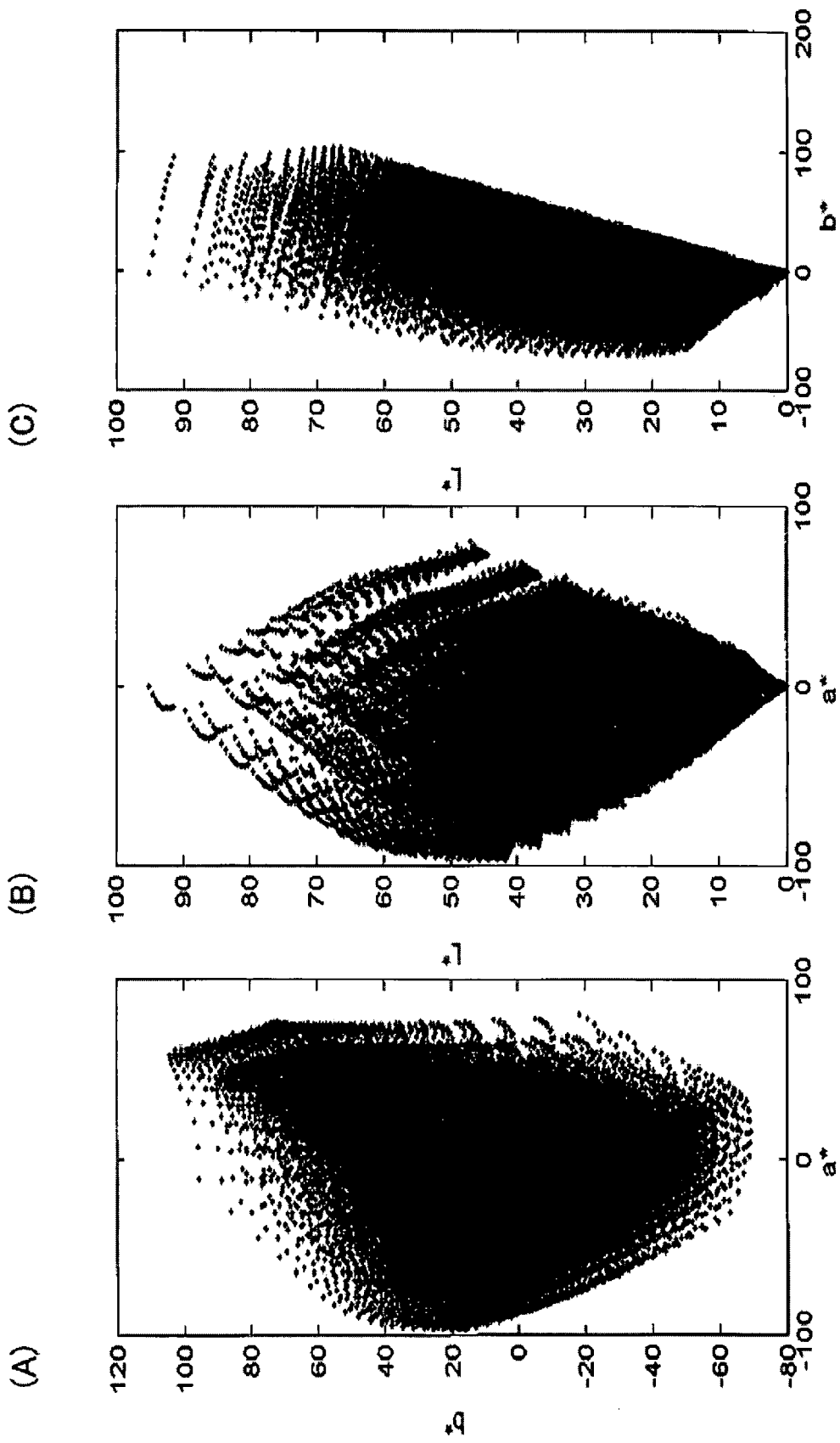
FIG. 4 is a graph showing sample colors in the CIELAB color space in a working example.

In Step S14, the sample ink amount data of the virtual samples are converted into spectral reflectance $Rsmp(\lambda)$ by using the spectral printing model converter 100. The index selector 126 acquires this spectral reflectance $Rsmp(\lambda)$ and calculates the calorimetric values L*a*b* in the CIELAB color system from the spectral reflectance $Rsmp(\lambda)$. The calorimetric values are recorded in a memory (not shown in the figures). In this working example, calorimetric values are calculated using the CIE illuminant D50 and CIE 1931 2° Standard Observer viewing condition. The color observed when a virtual sample is viewed under a certain viewing condition is the aforementioned sample color. FIGS. 4A to 4C are show the distribution of sample colors calculated in a working example. The abscissa in FIG. 4A represents the a* axis of the CIELAB color system, and the ordinate represents the b* axis. In FIGS. 4B and 4C, the abscissa represents the a* axis and b*, and the ordinate represents the L* axis. As can be understood from the description above, the $11^6$ sample colors are more densely concentrated where lightness L* is low and distributed sparsely where the lightness L* is high. A more uniform distribution of sample colors may be achieved by setting sample ink amount to finer intervals in the range of comparatively small ink amounts and to coarser intervals in the range of comparatively large ink amounts.

In Step S16, the color space of the calorimetric values (here, the CIELAB color space) is divided into a plurality of cells, and a plurality of sample colors are sorted in relation to the cells. In a working example, the CIELAB color space is divided equally into 16×16×16 cells. At this time, a plurality of samples are associated with the virtual samples before they are converted with the converter 100.

In step S20, a plurality of comparative colors (the aforementioned reference color patches 102) are prepared. In Step S22, the spectral reflectance $Rref(\lambda)$ of these reference color patches 102 are measured by a spectral reflectance meter (not shown in the figure). In Step S30, an evaluation index $EI_1$ for use in selecting a good sample is set. The evaluation index $EI_1$ used in the first embodiment is represented by the following Equation (1).

(Equation (1))

Here, CDI is any of the above-described CII and MI, IQII is the above-described GI, Tink, and index I designates GI or Tink. $k_1$ and $k_i$ are weight factors to be multiplied by the CDI and IQI and serve to adjust the degree of contribution of each index to the evaluation index $EI_1$. The factor $k_1$ is a numeral other than "0", and the factor $k_i$ is a numeral including "0". Thus, only any one index from amongst the CDI has to be included in the evaluation index $EI_1$, but any indices from amongst the IQI are included in the evaluation index $EI_1$. It goes without saying that the values of factors $k_1$ and $k_i$ may be changed for each above-described sample color.

In Step S35 in FIG. 3, the evaluation index generator 120 calculates an evaluation index $EI_1$ for each sample, and the sample selector 130 selects the best sample in each cell of the CIELAB color space with reference to this evaluation index $EI_1$.

Figure 5:
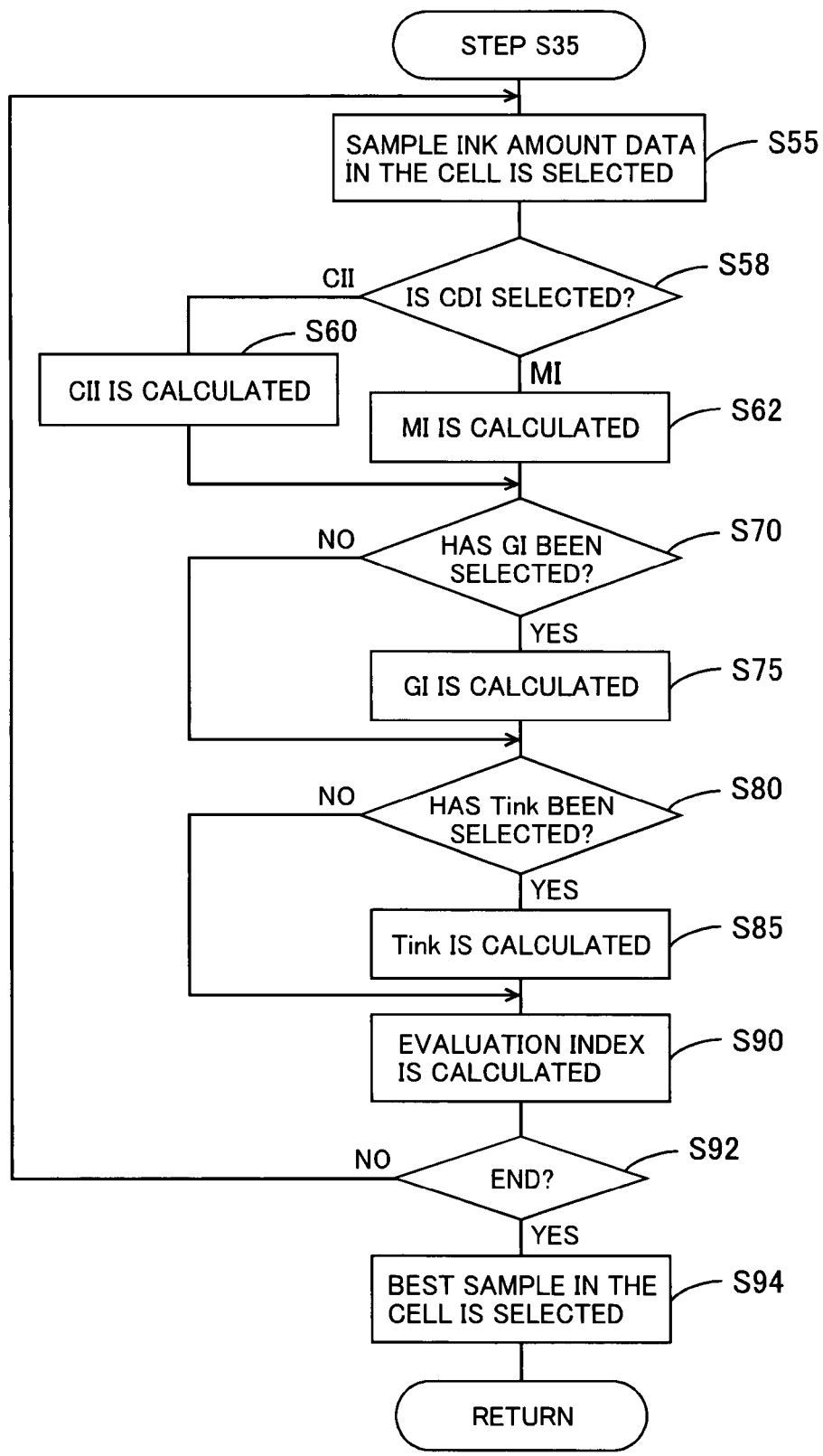
FIG. 5 is a flowchart showing in detail the procedure of Step S35.

FIG. 5 is a flowchart showing in detail the procedure of Step S35. In Step S55, one sample in a certain cell is selected. In Step S58, the index selector 126 determines the index that is the CDI selected as a calculation object. When the CII is determined in Step S58 to be selected, the CII is calculated in Step S60. When the MI is determined in Step S58 to be selected, the MI is calculated in Step S62.

Figure 6:
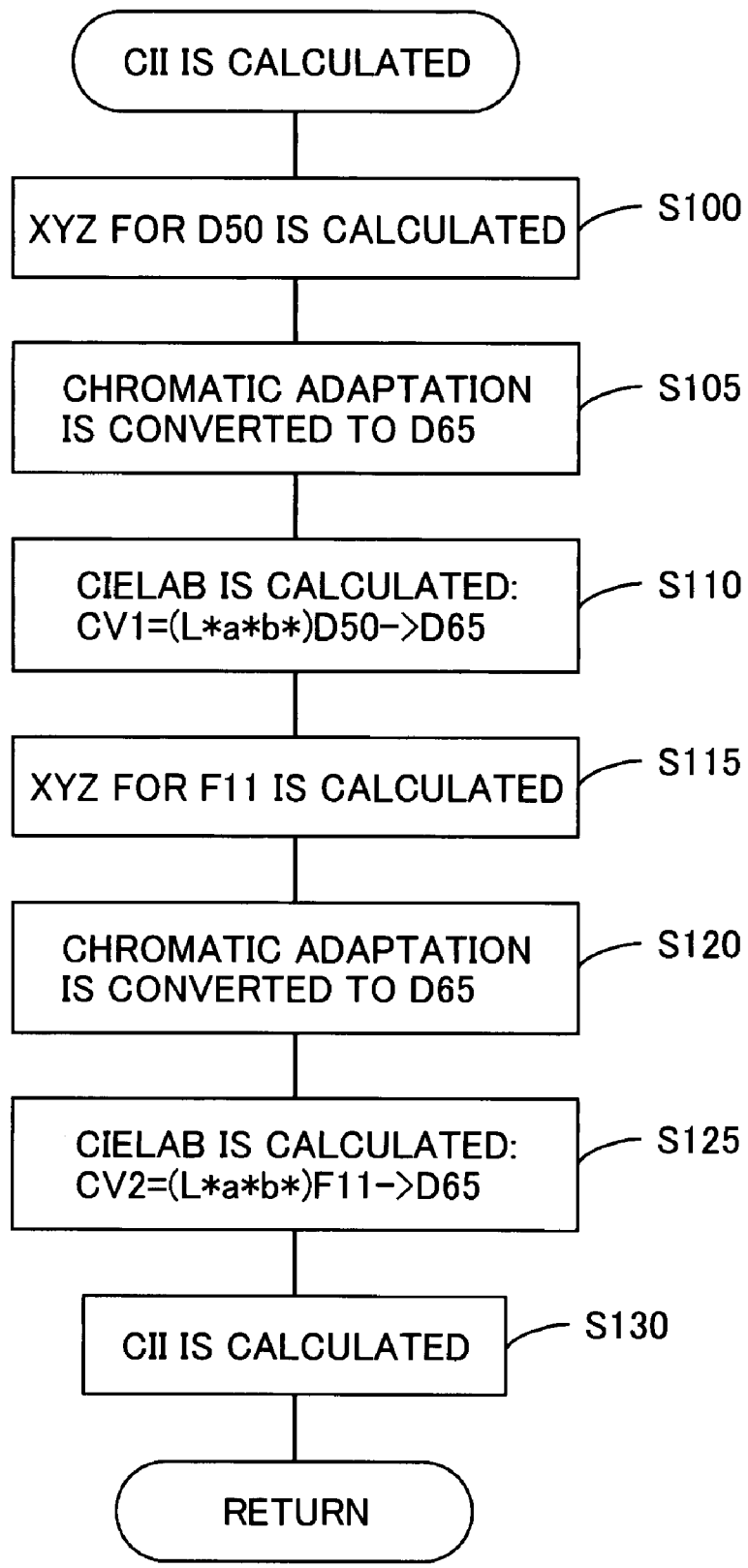
FIG. 6 is a flowchart illustrating the processing of calculating CII.

FIG. 6 is a flowchart illustrating the calculation of CII in Step S60. this processing is carried out with the CII calculator 1240. In the processing, the index selector 126 transfers the spectral reflectance Rsmp(λ) calculated in Step S14 to the CII calculator 1240. The CII calculator 1240 calculates tristimulus values XYZ under a first viewing condition by using the spectral reflectance Rsmp(λ) in Step S100. In a working example, tristimulus values XYZ are calculated under the CIE illuminant D50, CIE 1931 2° Standard Observer viewing condition. In the present specification, "viewing condition" refers to a combination of an illuminant and an observer; unless noted otherwise, the observer is the CIE 1931 2° Standard Observer. In Step S105, a chromatic adaptation transform is applied to these tristimulus values XYZ to calculate the corresponding color under the standard viewing condition. In a working example, CIECAT02 is used as the chromatic adaptation transform, using illuminant D65 as the light source for the standard viewing condition. CIECAT02 is described for example, in "The CIECAM02 Color Appearance Model", Nathan Moroncy et al., IS&T/SID Tenth Color Imaging Conference, pp; 23 to 27, and in "The Performance of CIECAM02", Changjun Li et al., IS&T/SID Tenth Color Imaging Conference, pp. 28 to 31. However, it is possible to use a different chromatic adaptation transform, such as the von Kries chromatic adaptation prediction model, as the chromatic adaptation transform. In Step S110, the colorimetric value $CV1=(L^*a^*b^*)_{D50 \to D65}$ of the corresponding color in the CIELAB color system is calculated. The subscript "D50→D65" means that this calorimetric value represents color appearance under illuminant D50 by corresponding color under illuminant D65.

Thus, in Step S115, tristimulus values XYZ are calculated under the second viewing condition by using the spectral reflectance Rsmp(λ). In a working example, tristimulus values XYZ are calculated under a viewing condition of the CIE illuminant F11 and CIE 1931 2° Standard Observer. In Step S120, a chromatic adaptation transform is applied to the tristimulus values XYZ to calculate the corresponding color under the standard viewing condition. In Step S125, the calorimetric value $CV2=(L^*a^*b^*)_{F11 \to D65}$ of the corresponding color in the CIELAB color system is calculated. In Step S130, CII is calculated using the calorimetric values CV1, CV2.

CII is represented, for example, by the following.
(Equation (2))

Regarding CII, see Billmeyer and Saltzman's Principles of Color Technology, 3rd edition, John Wiley & Sons Inc., 2000, p. 129, and pp. 213 to 215.

The right-hand term of Equation (2) corresponds to the color difference $\Delta E^*_{94(2:2)}$ obtained by the CIE 1994 Color Difference Equation in which values of the lightness and chroma factors $k_L$, $k_C$ are set to 2 and the hue factor $k_H$ is set to 1. In the CIE 1994 Color Difference Equation, the denominator coefficients $S_L$, $S_C$, $S_H$ of the right-hand term of Equation (2) are given by Equation (3) below.
(Equation (3))

Another equation also can be used as the color difference equation employed for calculating CII.

The CII is defined as the difference in color appearance observed when a certain color patch is viewed under first and second viewing conditions different from one another. Therefore, a sample having a low CII is preferred because of a small difference in apparent color when viewed under different viewing conditions. Further, the calorimetric value $CV1=(L^*a^*b^*)_{D50 \to D65}$ of the sample color and the calorimetric value $CV2=(L^*a^*b^*)_{F11 \to D65}$ of the comparative color are the calorimetric values of corresponding colors viewed under the standard viewing condition, and the CII, which is the color difference ΔE between them, rather accurately represents the difference in color appearance between the sample color and the comparative color.

Figure 9:
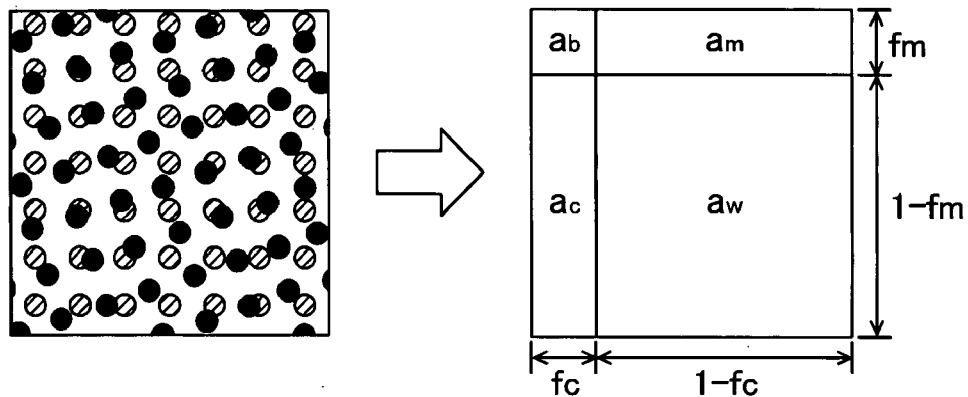
FIG. 9 illustrates the Spectral Neugebauer model.
Figure 9:
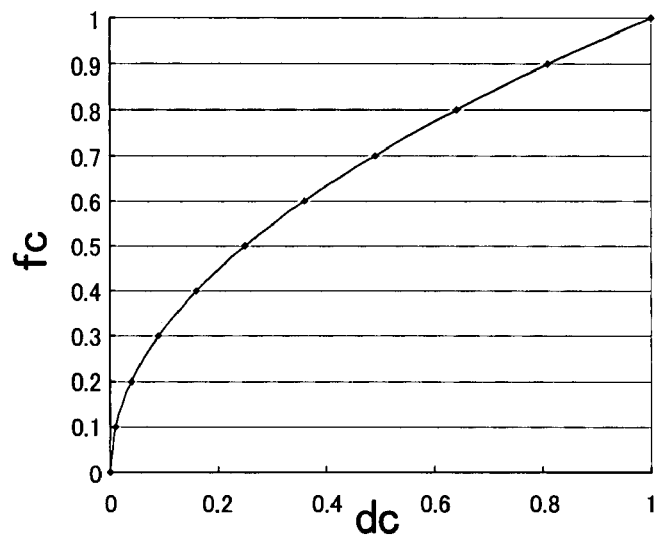

The standard viewing condition is not limited to illuminant D65, and viewing conditions under any illumination light can be used. For example, where illuminant D50 is employed as the standard viewing condition, Step S105 in FIG. 9 is not necessary, and in Step S120 a chromatic adaptation transform for illuminant D50 will be performed. However, the color difference ΔE calculated using the CIELAB color system yields the most reliable values when the illuminant D65 is used. For this reason, the use of the illuminant D65 as the standard viewing condition is preferred.

The calculation of MI in Step S62 is performed by the MI calculator 1241. In this processing, the index selector 126 transfers the spectral reflectance Rref(λ) of the comparative color that is measured in Step S22 to the MI calculator 1241. The MI calculator 1241 calculates the calorimetric values L*a*b* of the CIELAB color system from the spectral reflectance Rref(λ) of the comparative color. The MI is calculated, for example, by the following Equation (4) to compare the comparative color and the sample color of the sample selected in Step S55. The calculation by Equation (4) may be performed for all the comparative colors, but it is also possible to perform the calculation by Equation (4) by extracting a comparative color that is close to the sample color.
(Equation (4))

Here, the expression inside the parentheses of Equation (4) is the metamerism index indicating the color difference between the sample color and the comparative color under the j-th illuminant, the operator ave indicates an operation of taking the average of the metamerism indices obtained under a plurality of illuminants. $\Delta L^*$ denotes a lightness difference, $\Delta C^*_{ab}$ denotes a chroma difference, and $\Delta H^*_{ab}$ denotes a hue difference between the sample color and the comparative color under the i-th illuminant. Thus, the MI in the present embodiment is the average color difference between the sample color and the comparative color under the j-th illuminant. Regarding metamerism indices, see Billmeyer and Saltzman's Principles of Color Technology, 3rd edition, John Wiley & Sons Inc., 2000, p. 127, and pp. 211 to 213. No specific limitation is placed on the illuminant, and D50, F11, A light sources can be employed.

Comparing the above-described Equation (2) and Equation (4), a color difference equation identical to the equitation giving CII can be used as the equation giving MI. The difference between the MI and CII is that the former is a difference in color obtained when two physical body colors are observed under identical viewing conditions, whereas the latter is a difference in color obtained when one physical body color is observed under different viewing conditions. Equations other than Equation (4) also can be used as the color different equation that is employed for calculating MI. CII and Mi represent a difference in color relating to different observation environments, and although the comparative colors for CII and MI differ from one another, both the CII and the MI can be interpreted to include the indices representing the difference between two colors.

Once the CDI has thus been calculated, the image quality evaluation index calculator 122 calculates the IQI in Step S70 and subsequent steps. In Step S70, the index selector 126 determines whether a GI has been selected as the IQI of the calculation object. When the GI is determined in Step S70 to have been selected, the GI calculator 1220 calculates the GI in Step S75. More specifically, the GI calculator 1220 acquires the graininess profile 15d, and calculates the GI by substituting the graininess profile 15d into the ink amount data (CMYKlclm) of the sample selected in Step S55. Where the graininess profile 15d comprises a neural network into which any sample ink amount data (CMYKlclm) can be inputted and the neural network is denoted by NN, the GI can be given by Equation (5) below. A plurality of graininess profiles 15d are prepared, and in Step S75 the graininess profile 15d corresponding to a printing condition based on the profile data 15b, 15c of the production object is selected and used for calculating the GI.

(Equation (5))

The GI is a graininess (or degree of noise) that is felt by an observer when the observer views a certain printout. The smaller is the GI, the lower is the level of graininess felt by the observer. In the resent embodiment, the GI is defined by Equation (6) below.

(Equation (6))

Regarding GI, see, for example, Makoto Fujino, Image Quality Evaluation of Inkjet Prints, Japan hardcopy '99, p. 291 to 294. Furehr, $a_L$ in Equation (6) is a lightness correction term, WS(u) is a Wiener spectrum of an image indicated by half-tone data, VTF is a visual spatial frequency characteristic, and u is a spatial frequency. Equation (6) is represented in a one-dimensional form, but a spatial frequency of a two-dimensional image is easy to calculate as a function of spatial frequencies u, v.

In the processing shown in FIG. 5, the index selector 126 further determines in Step S80 whether Tink has been selected as the IQI of the calculation object. When the Tink is determined to have been selected in Step S80, the Tink calculator 1221 calculates the Tink in Step S85. For this purpose, the index selector 126 transfers the sample ink amount data to the Tink calculator 1221. As described above Tink is an index for evaluating the ink amount that is being used and represents a total value of ink amount used by the sample. For example, where the ink amount of all six types of ink is 20%, the value of Tink is 120%=1.2. The total ink amount Tink has strong correlation with image quality, and the lower is the total ink amount Tink, the better image quality can be obtained. Where the Tink is included in the evaluation index $EI_1$, the image quality can be judged.

With the above-described processing, CDI and IQI that have to be included in the evaluation index $EI_1$ are calculated, and in Step S90 shown in FIG. 5, the evaluation index $EI_1$ is calculated by Equation (1) shown above. In Step S92, a determination is made as to whether calculation of evaluation index $EI_1$ has been completed for all sample colors included in the cell that is a processing object. By repeating Steps S55 to S92 in this manner, evaluation indices $E1_1$ are calculated for all sample colors in the cell. In Step S94, the sample selector 130 selects, from among the sample colors of the cell, the sample having the best evaluation index $EI_1$ as the representative sample for the cell. As a result, a single representative sample is selected for each cell that contains at least one sample. The representative sample will be also referred to hereinbelow as "highly rated sample".

Cells that contain no sample colors whatsoever are also present among the plurality of cells obtained by division in Step S16 of FIG. 3. Accordingly, the processing of FIG. 5 is executed only with respect to cells that contain at least one sample color, and cells that do not contain even one sample color are excluded from the processing objects. Once the representative samples have thus been selected, in Step S40 of FIG. 3, the profile generator 140 produces a preliminary ink profile by performing non-uniform interpolation based on the representative samples. The preliminary ink profile is a color conversion lookup table for converting CIELAB calorimetric values into ink amounts. The prefix "preliminary" means that the profile relates to the relatively coarse cells divided up in Step S16.

Figure 7:
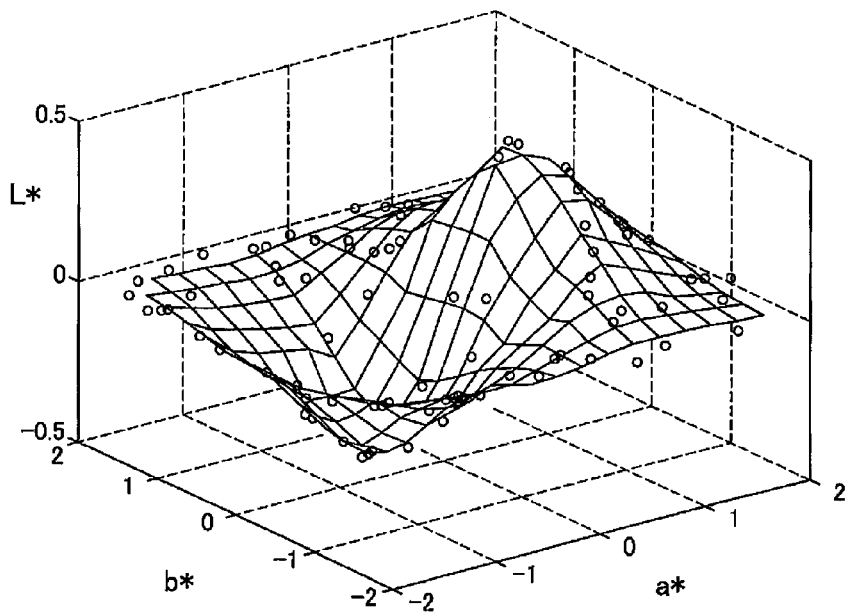
FIG. 7 illustrates non-uniform interpolation in Step S40.
Figure 7:
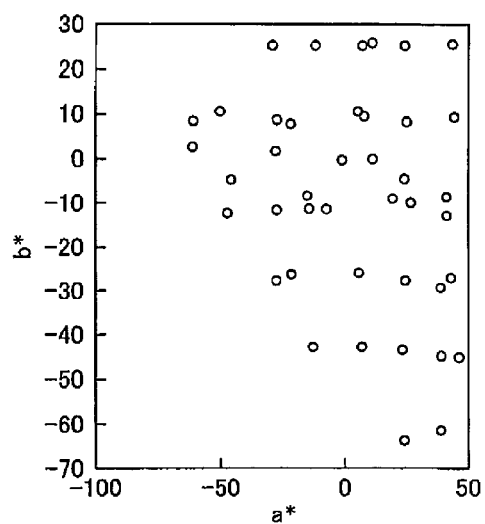
Figure 7:
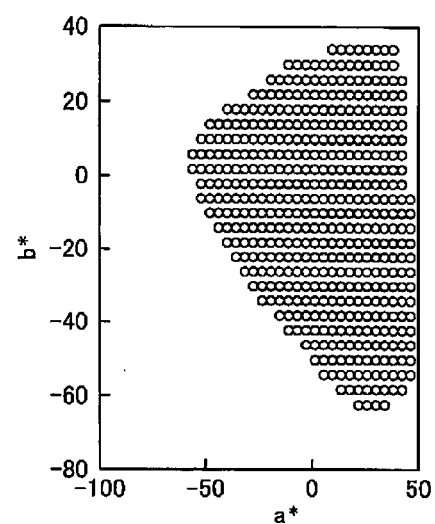

FIG. 7A illustrates non-uniform interpolation in Step S40. This figure shows the CIELAB space; the circles in the figure indicate positions of calorimetric values of representative sample colors, and the web pattern indicates a fine cell grid. In Step S40, ink amounts at grid points (web intersection points) are calculated by non-uniform interpolation of ink amounts for a plurality of representative sample colors. FIGS. 7B and 7C respectively show an example of representative sample points before and after the interpolation at L*=23.8. The non-uniform interpolation may be carried out using, for example, the griddata function of MATLAB (trade mark of MathWorks Inc.). In a working example, the preliminary profile is produced with input of 64×64×64 grid points of the CIELAB space. The non-uniform interpolation may be executed by using non-linear interpolation or linear interpolation. The non-linear interpolation usually tends to have higher accuracy and lower processing speed than the linear interpolation.

In Step S45, the profile generator 140 produces a final ink profile 142 (FIG. 2) by linear interpolation of the preliminary profile. This final ink profile 142 is obtained by inputting grid points of cells that are finer that those of the preliminary profile. In a working example, the final profile is produced with input of 256×256×256 grid points of the CIELAB space. As mentioned hereinabove, the preliminary profile has as input 64×64×64 grid points of the CIELAB space. Therefore, the final ink profile 142 can be easily obtained by linear interpolation of the preliminary profile. By creating a profile with input of 256×256×256 grid points of the CIELAB space as the final ink profile 142, ink amounts corresponding to all CIELAB input values can be directly obtained. Accordingly, the processing time required for subsequent creation of the lookup table can be reduced.

In Step S50, the gamut mapping processor 160 (FIG. 2) performs gamut mapping on the basis of the final ink profile 142 and the sRGB profile 162 to create the profile data 15b, 15c. The gamut mapping is performed due to a difference between the gamut realizable in the printer (also termed "ink color space") and the gamut realizable in the input color space (in this embodiment, the sRGB space). The gamut of the ink color space is defined by the final ink profile 142, while the gamut of the input color space is defined by the sRGB profile 162. Since there are typically discrepancies between the input color space and the ink color space, it is necessary to map the gamut of the input color space to the gamut of the ink color space.

Figure 8:
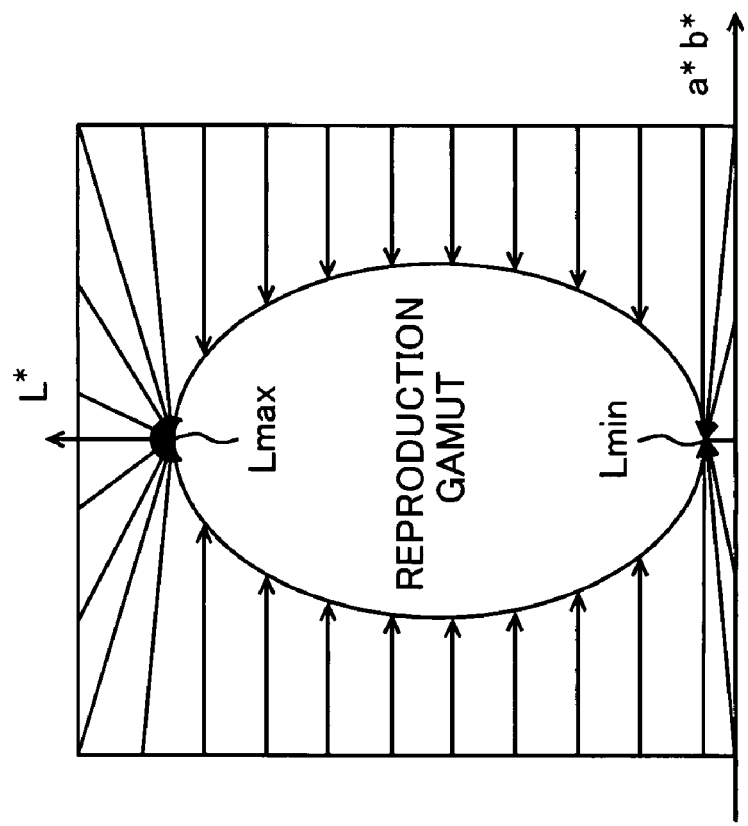
FIG. 8 illustrates gamut mapping in Step S50.
Figure 8:
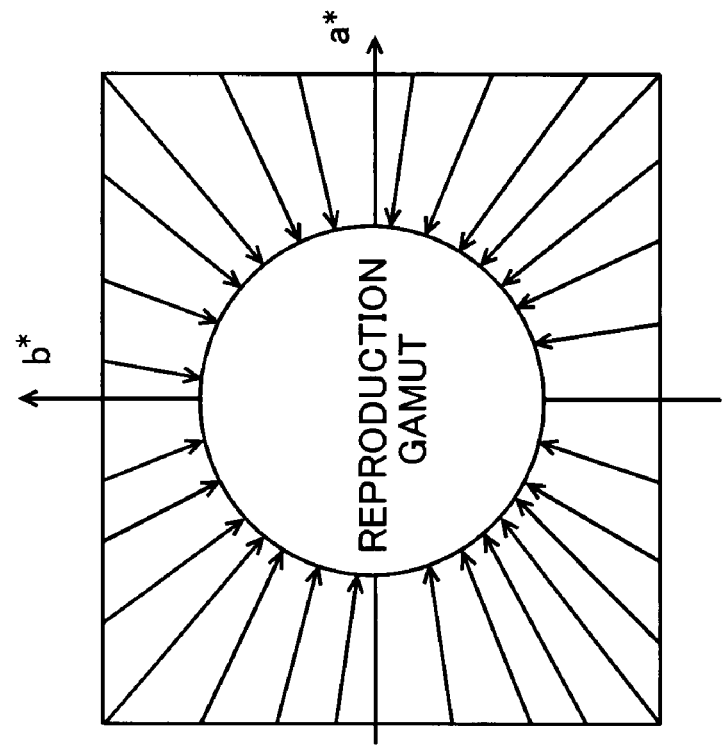

FIGS. 8A and 8B show an example of gamut mapping. Here, a method termed "gamut clipping" is employed. Specifically, as shown in FIG. 8A, colors in the sRGB color space lying outside the gamut of the ink color space are mapped so as to reduce chroma while maintaining hue. Concerning lightness L*, for colors within the lightness range of the ink color space, lightness is maintained as-is. Colors having lightness greater than the maximum value Lmax for lightness of the ink color space are mapped to the maximum value Lmax. On the other hand, colors having lightness smaller than the minimum value Lmin for lightness of the ink color space are mapped to the minimum value Lmin. Various methods for gamut mapping are known, and any of these methods may be employed.

Once gamut mapping has thus been performed, the final profile data 15b, 15c are complete. By installing such final profile data 15b, 15c in a printer, it is possible to produce printouts having high chroma constancy (thus, little change in color appearance under different viewing conditions) and high image quality. Interpolation relating to the ink profile 142 is not necessary in the above-described configuration. For example, the profile data 15b, 15c can be also produced using a preliminary ink profile instead of the final ink profile 142. Further, calorimetric values after interpolation are not limited to the above-described numerical values.

As described above, the profile data 15b, 15c that have thus been produced take into account the color difference evaluation index and the image quality evaluation index, and appropriate necessary indices are selected as such indices. Therefore, profile data having various indices added thereto can be easily produced. Thus, a profile that makes it possible to attain advantageous color representation under various viewing conditions can be easily produced. Moreover, a profile that enables high-quality printing simultaneously with attaining the color representation can be produced.

In the above-described embodiment, profile data 15b, 15c that define the correspondence relationship of sRGB and CMYKlclm are created, but it goes without saying that other implementation modes can be employed for the profile. For example, the present invention can be also applied to creating a media profile in a configuration in which color conversion is performed using a source profile that converts device-dependent colors at the input side to device-independent colors and a media profile that converts the device-independent colors to device-dependent colors at the output side. In this case, a media profile is produced by gamut mapping grid point of the Lab color space to the Lab space defined in the ink profile 142. Thus, where the ink profile 142 is produced, the printer gamut is established. Therefore, grid points of the CIELAB space that are present outside the gamut are associated with the gamut surface or grid points within the gamut. With the profile that is thus produced, any CIELAB values obtained from the source file can be converted to CMYKlclm values.

B. Example of Spectral Printing Model

A cellular Yule-Nielsen spectral Neugebauer model will be explained below as an example of a spectral printing model. This model is based on the well-known spectral Neugebauer model and Yule-Nielsen model. In the explanation below, a mode relating to the case in which inks of three types (CMY) are used will be described, but the model can be easily expanded to a model using any large number of inks. The cellular Yule-Nielsen spectral Neugebauer model is described in Color Res. Appl. 25, 4-19, 2000, R. Balasubramanian, Optimization of the spectral Neugebauer model for printer characterization, J. Electronic Imaging 8(2), 156-166 (1999).

FIG. 9 shows a spectral Neugebauer model. In the spectral Neugebauer model, the spectral reflectance $R(\lambda)$ of any printed matter can be given by the following Equation (7)
(Equation (7))

Here, $a_i$ is a surface area ratio of the i-th region, $R_i(\lambda)$ is a spectral reflectance of the i-th region. Index "i" means respectively a region (w) where no ink is present, a region (c) where only the cyan ink is present, a region (m) where only the magenta ink is present, a region (y) where only the yellow ink is present, a region (r) where the magenta ink and the yellow ink are discharged, a region (g) where the yellow ink and the cyan ink are discharged, a region (b) where the cyan ink and the magenta ink are discharged and a region (k) where the three CMY inks are discharged. Further, $f_c$, $f_m$, $f_y$ are the ratios of surface area covered by the ink when only one of CMY inks is discharged (ink area coverage). The spectral reflectance $R_i(\lambda)$ is acquired by measurements with a spectral reflectometer.

The ink area coverage ratios $f_c$, $f_m$, $f_y$ are given by a Murray-Davis model shown in FIG. 9B. In the Murray-Davis model, for example, the ink area coverage $f_c$ is a nonlinear function of the ink discharge quantity $d_c$ of cyan and given in the form of a one-dimensional lookup table. The ink area coverage is a nonlinear function of the ink discharge quantity because the ink spreads sufficiently when a small amount of ink is discharged in a unit surface area, but when a large amount of ink is discharged, the ink piles up and the surface area covered by the ink does not increase.

If a Yule-Nielsen model relating to spectral reflectance is applied, Equation (7) can be written as Equation (8a) or Equation (8b) below
(Equation (8b))

Here, n is a predetermined coefficient of 1 or more; for example, n can be set to 10. Equation (8a) and Equation (8b) represent a Yule-Nielsen spectral Neugebauer model.

The cellular Yule-Nielsen spectral Neugebauer model is obtained by dividing the ink color space of the aforementioned Yule-Nielsen spectral Neugebauer model into a plurality of cells.

Figure 10:
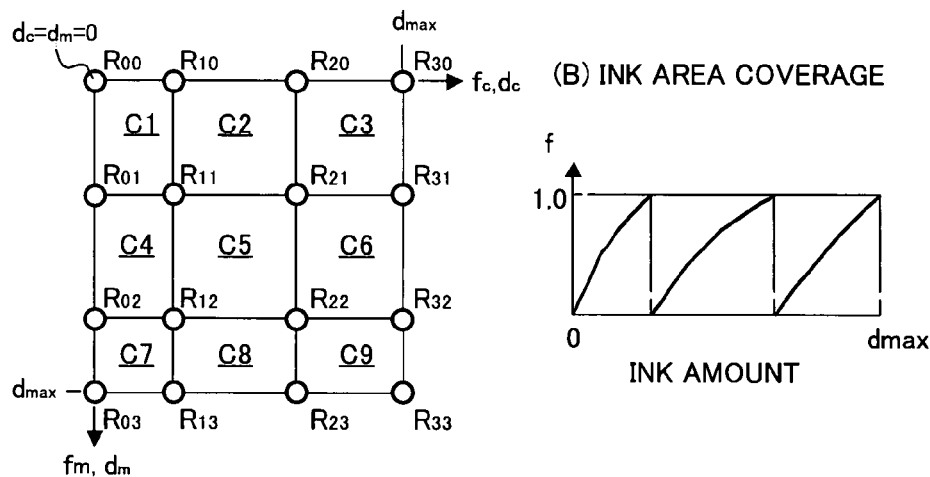
FIG. 10 illustrates the Cellular Yule-Nielsen Spectral Neugebauer model.
Figure 10:
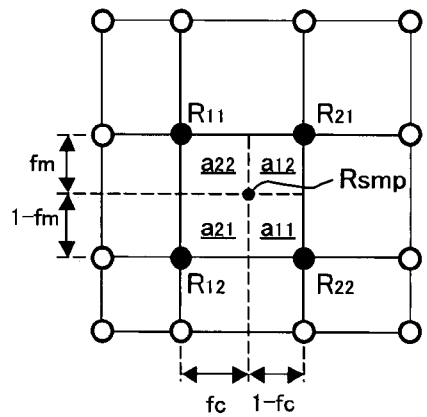

FIG. 10A shows an example of cell division in the cellular Yule-Nielsen spectral Neugebauer model. Here, for the sake of simplicity, the cell division is plotted in a two-dimensional space comprising two axes of the cyan ink area coverage $f_c$ and magenta area coverage $f_m$. The two axes $f_c$ and $f_m$ can be also considered as the axes indicating the ink discharge quantities $d_c$, $d_m$. White circles are grid points (referred to as "nodes") of cell division, and the two-dimensional space is divided into nine cells C1-C9. Spectral reflectance R00, R10, R20, R30, R01, R11, ..., R33 are determined in advance with respect to a printed matter (color patch) in 16 nodes.

FIG. 10B shows the shape of the ink area coverage $f_c(d)$ corresponding to this cell division. Here, the range $0\text{-}d_{max}$ of ink quantity of ink of one kind is divided into three sectors, and the ink area coverage $f_c(d)$ is represented by a curve that increases monotonously from 0 to 1 in each sector.

FIG. 10C illustrates a method for calculating the spectral reflectance $Rsmp(\lambda)$ of a sample in the central cell C5 in FIG. 10A. The spectral reflectance $Rsmp(\lambda)$ is given by the following Equation (9).
(Equation (9))

Here, the ink area coverage $f_c$, $f_m$ are the values given by the graph shown in FIG. 13C and are defined within the cell C5. Further, the values of spectral reflectance $R11(\lambda)$, $R12(\lambda)$, $R21(\lambda)$, $R22(\lambda)$ in the four apex points of the cell C5 are adjusted so as to give accurately the sample spectral reflectance $R_{smp}(\lambda)$ according to Equation (9).

If the ink color space is thus divided into a plurality of cells, the sample spectral reflectance $R_{smp}(\lambda)$ can be calculated with better accuracy than in the case without such division. FIG. 11 shows node values of cell division employed in the present embodiment. As shown in this example, it is preferred that the node values of cell division be set independently for each ink.

Figure 12:
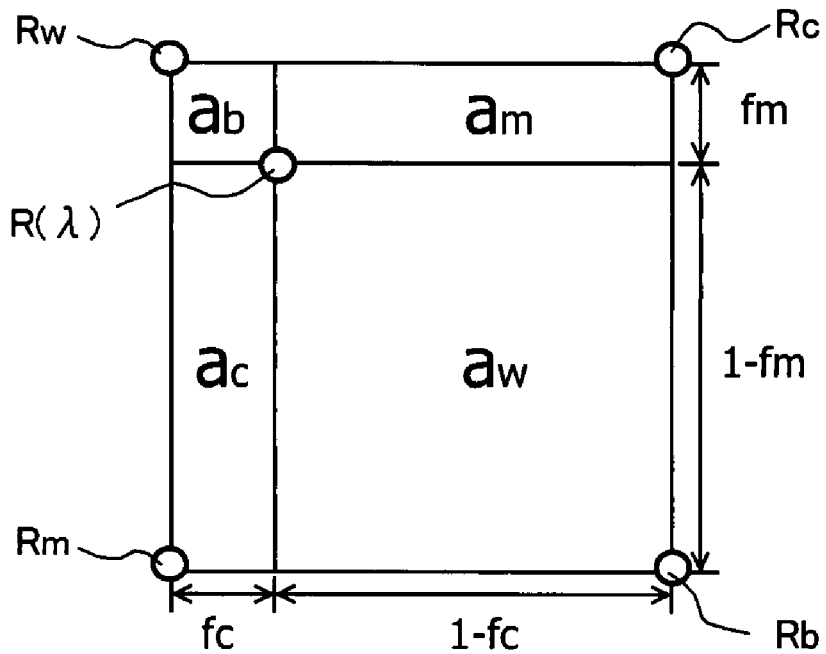
FIG. 12 illustrates a method for finding a spectral reflectance that cannot be measured in the Cellular Yule-Nielsen Spectral Neugebauer model.

However, in the model shown in FIG. 13A, the spectral reflectance in all the nodes is usually impossible to obtain by measuring the color patch. This is because if a large amount of ink is discharged, blurring occurs and a color patch of uniform color is impossible to print. FIG. 12 shows a method for finding the spectral reflectance that cannot be measured. This example relates to the case in which only the inks of two kinds (cyan and magenta) are used. The sample spectral reflectance $R(\lambda)$ of any color patch printed with the inks of two kinds (cyan and magenta) is given by Equation (10) below.
(Equation (10))

Let us assume that amongst a plurality of parameters contained in Equation (10), only the spectral reflectance $Rb(\lambda)$ obtained in the case of 100% discharge quantity of both the cyan ink and the magenta ink are unknown and values of other parameters are known. In this case, if Equation (10) is modified, Equation (11) can be obtained.
(Equation (11))
As mentioned above, all the terms in the right side are already known. Therefore, the unknown spectral reflectance Rb(λ) can be calculated by solving Equation (11). The estimation of spectral reflectance is described in R. Balasubramanian, Optimization of the spectral Neugebauer model for printer characterization, J. Electronic Imaging 8(2), 156-166 (1999).

The spectral reflectance of secondary colors other than the secondary colors of cyan and magenta also can be found in a similar manner. Further, if the spectral reflectance of a plurality of secondary color is found, then the spectral reflectance of a plurality of tertiary colors also can be found in a similar manner. The spectral reflectance for each node of the ink color space that was divided into cells can be found by successively finding the spectral reflectance of higher orders in such manner.

The spectral printing converter 100 shown in FIG. 1 has the values of spectral reflectance in each node of the ink color space that was divided into cells as shown in FIG. 10A and the one-dimensional lookup table showing the ink area coverage shown in FIG. 10C and is configured so as to calculate the sample spectral reflectance $R_{smp}(\lambda)$ relating to any sample ink quantity data by using these values and table.

Generally, the spectral reflectance of the printed color patch depends on the ink set and printing medium. Therefore, the spectral printing converter 100 shown in FIG. 1 is produced for each combination of ink set and printing medium. Also, each of profiles of ink profile 142 and profile data 15b, 15c is produced for each combination of ink set and printing medium.

D. Example of Graininess Profile

Figure 13:
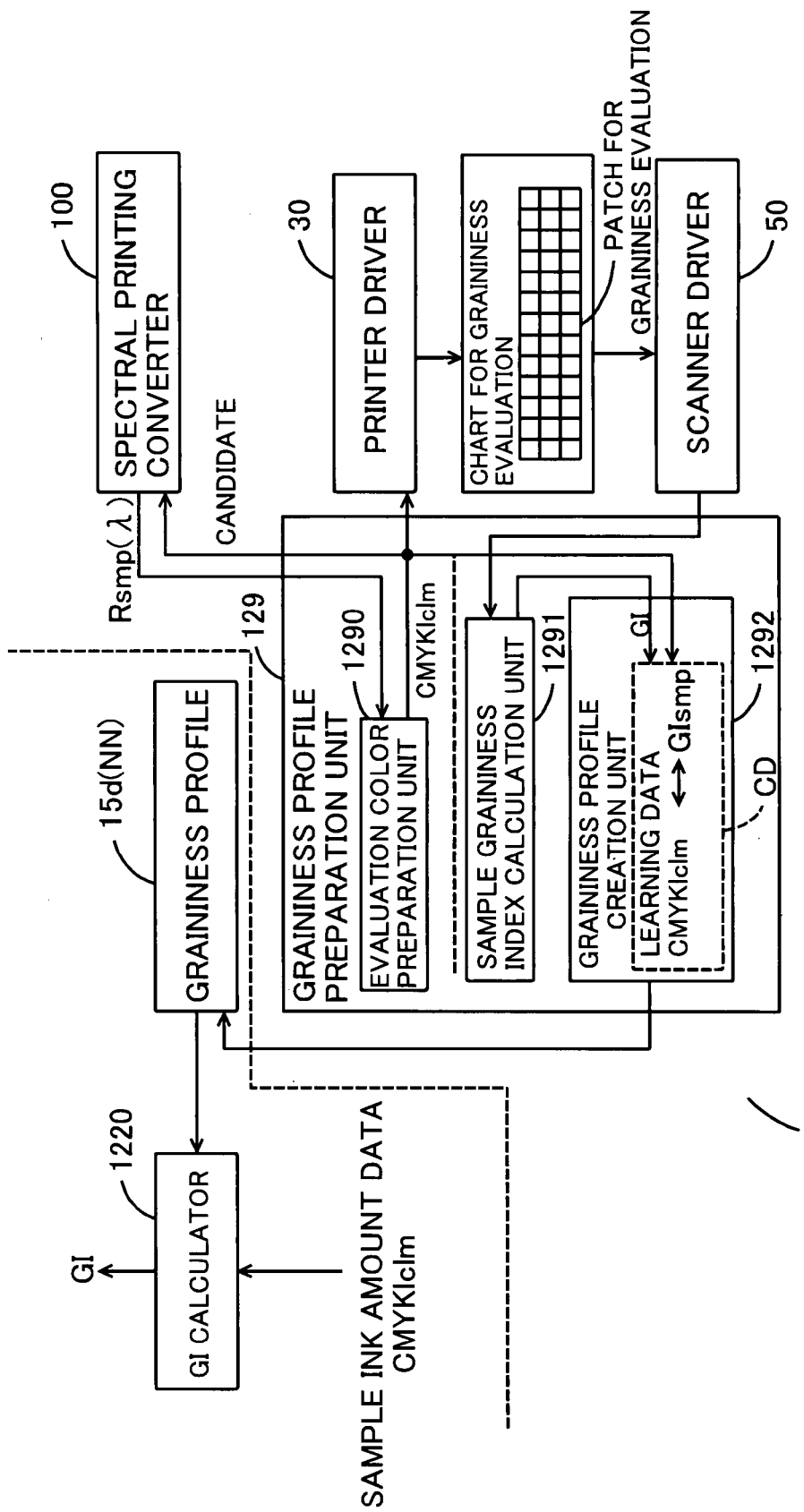
FIG. 13 is a block diagram showing a system configuration in the first embodiment of the invention.

As described above, the graininess profile 15d is a profile that is prepared in advance when the processing of FIG. 3 is performed. The configuration of the graininess profile 15d and the procedures for preparation thereof will be described below in greater detail. FIG. 13 is a block-diagram of a graininess profile preparation device for preparing a graininess profile. This graininess profile preparation device is realized with the above-described computer 10. It goes without saying that the graininess profile preparation device may be also realized with another computer. The computer 10 is provided with a graininess profile preparation unit 129, and the graininess profile 15d is prepared in the HDD 15 with the graininess profile preparation unit 129. The graininess profile preparation unit 129 comprises an evaluation color preparation unit 1290, a sample graininess index calculator 1291, and a graininess profile creation unit 1292.

The evaluation color preparation unit 1290 prepares ink amount data for graininess evaluation that are designed for evaluating the graininess. The ink amount data for graininess evaluation are represented by CMYKlclm ink amount vectors that can be used by the printer 40, and the evaluation color preparation unit 1290 prepares a plurality of ink amount data for graininess evaluation so that the data can be almost uniformly distributed in the CMYKlclm space. Further, a plurality of ink amount data for graininess evaluation are prepared so that calorimetric values (L*a*b* values) obtained when printing is performed in the printer 40 based on the ink amount data for graininess evaluation are almost uniformly distributed in the L*a*b* space. The evaluation color preparation unit 1290 outputs to the printer driver 30 the image data that enable the printing of color patches (patches for graininess evaluation) on the basis of the prepared ink amount data for graininess evaluation.

The sample graininess index calculation unit 1291 acquires from the scanner driver 50 the image data that are obtained by reading the patches for graininess evaluation with the scanner 60 and calculates a sample graininess index GIsmp for each patch for graininess evaluation from the image data. The graininess profile creation unit 1292 produces as the graininess profile 15d a neural network constructed by using as learning data a plurality of correspondence relationships of the ink amount data for graininess evaluation and sample graininess indices GIsmp and stores the produced graininess profile in the HDD 15.

Figure 14:
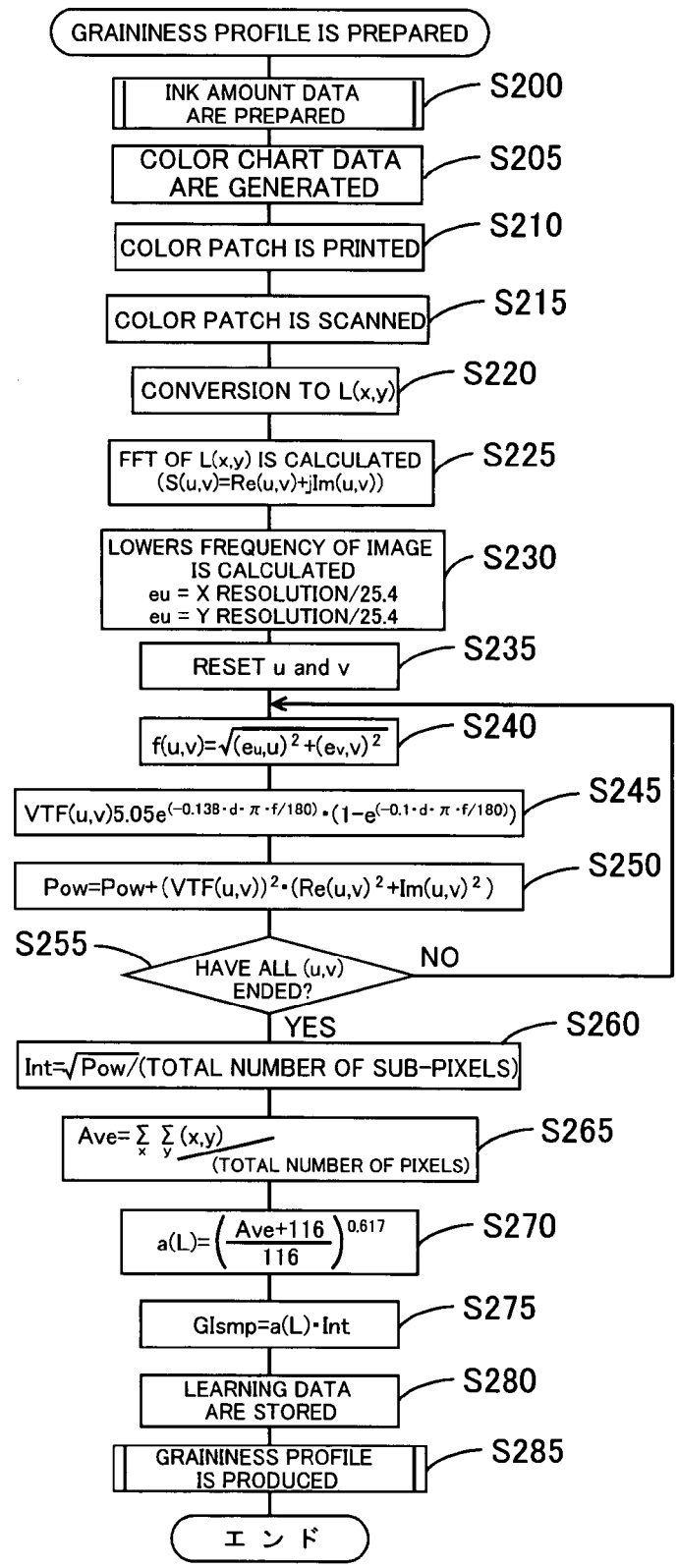
FIG. 14 is a flowchart illustrating the processing of preparing a graininess profile.

Processing performed in each unit will be described below in greater detail with reference to a processing flow performed in the graininess profile preparation device shown in FIG. 13. FIG. 14 is a flowchart of the processing procedure. In Step S200, the evaluation color preparation unit 1290 prepares a large number (N) of ink amount data for graininess evaluation. Here, a plurality of ink amount data for graininess evaluation that have gradation in relation to ink amount and ink amount data for graininess evaluation that are almost uniformly distributed in the CIELAB space (L*a*b* space) as a calorimetric value space are prepared.

Figure 15:
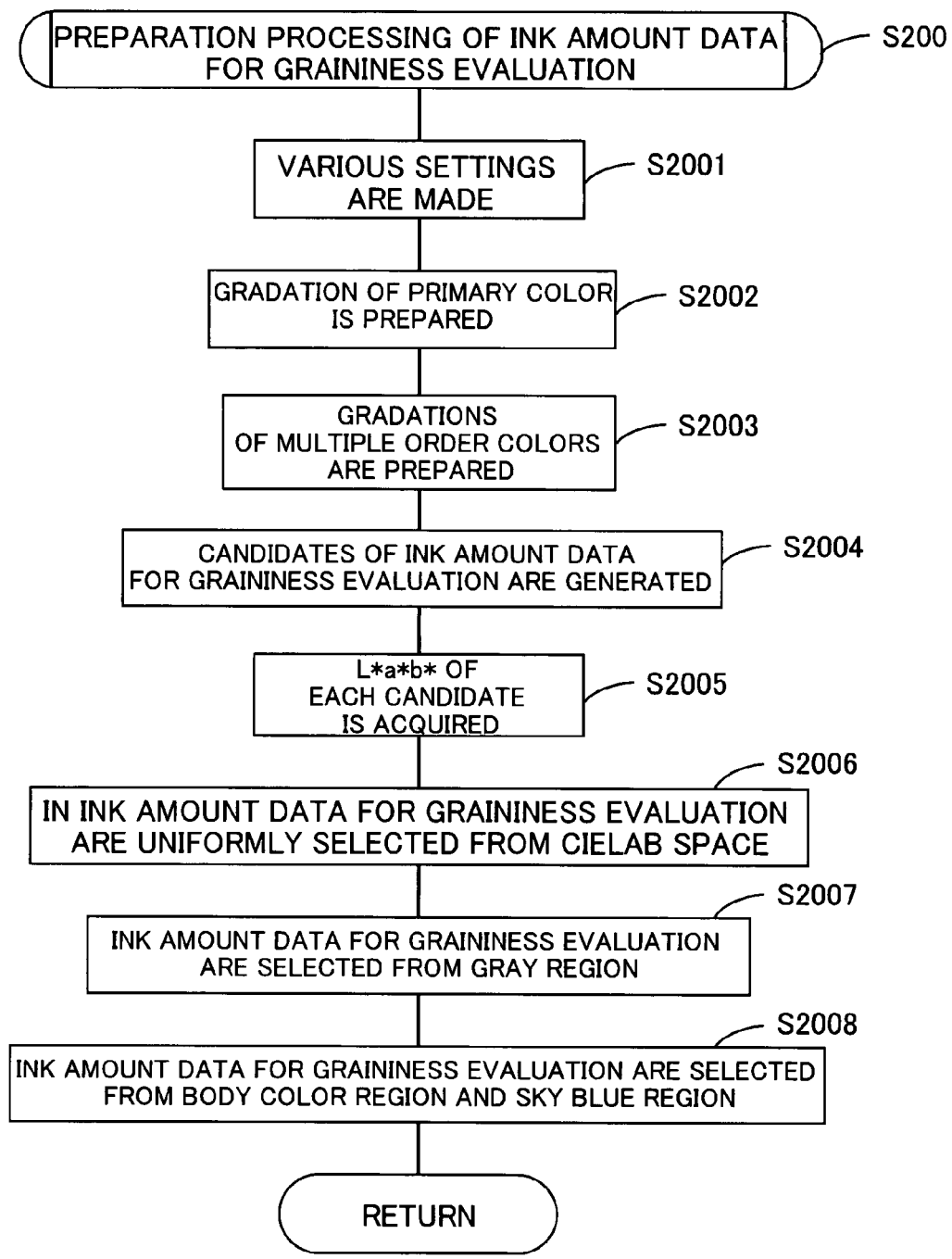
FIG. 15 is a flowchart illustrating the processing of preparing ink amount data for graininess evaluation.

FIG. 15 shows a flow of processing for the preparation of ink amount data for graininess evaluation that is performed in the evaluation color preparation unit 1290. In Step S2001, a variety of settings are performed. For example, ink set, printing medium, and light source settings are made for the above-described spectral printing model converter 100. In Step S2002, the evaluation color preparation unit 1290 prepares ink amount data for graininess evaluation that reproduce a group of color patches with primary color gradations.

In the present embodiment, CMYKlclm (256 gradations) is assumed as an ink set. Therefore, CMYKlclm becomes each primary color. For example, gradations of C ink are divided into 16 equal fractions and 16 ink amount data for graininess evaluation (C=0, 15, 31, . . . , 239, 255, M=Y=K=lc=lm=0) are prepared. Likewise, 16 ink amount data for graininess evaluation are also prepared for MYKclm ink. In step S2003, the evaluation color preparation unit 1290 prepares ink amount data for graininess evaluation that reproduce a group of color patches with secondary color gradations. The secondary colors in the present embodiment include blue color obtained by mixing equal amounts of CM inks, red color obtained by mixing equal amounts of MY inks, green color obtained by mixing equal amounts of YC inks, and light blue color obtained by mixing equal amounts of lclm inks.

For example, the density gradation of blue color is subdivided into 16 equal fractions and 16 ink amount data for graininess evaluation (C=M=0, 15, 31, . . . , 239, 255, Y=K=lc=lm=0) are prepared. Likewise, 16 ink amount data for graininess evaluation (MY=0, 15, 31, . . . , 239, 255, C=K=lc=lm=0), (YC=0, 15, 31, . . . , 239, 255, M=K=lc=lm=0), (lclm=0, 15, 31, . . . , 239, 255, C=M=Y=K=0) are prepared for red color and green color. Furthermore, 16 ink amount data for graininess evaluation (CMY=0, 15, 31, . . . , 239, 255, K=lc=lm=0) are also prepared for tertiary color (composite gray) obtained by mixing equal amounts of CMY inks.

In Step S2004, a large number of ink amount sets that are randomly distributed over the entire ink amount space are generated as candidates for ink amount data for graininess evaluation and inputted to the spectral printing model converter 100. For example, ink amount coordinates on grid points obtained by subdividing the ink amount gradations of CMYKlclm into 16 equal fractions are generated as candidates for ink amount data for graininess evaluation. In this case, $16^6=16,777,216$ candidates are generated.

The spectral printing model converter 100 calculates spectral reflectance Rsmp(λ) for the case of color patch printing with respect to each inputted candidate of ink amount data for graininess evaluation. In Step S2005, XYZ values are calculated by multiplying the spectral reflectance Rsmp(λ) corresponding to candidates of each ink amount data for graininess evaluation that are generated in step S2004 by isochromatic functions x(λ), y(λ), z(λ) of XYZ tristimulus values and a spectral distribution P(λ), of a light source that has been set and performing integration. In the present embodiment, the XYZ values are taken to be calculated by assuming a spectral distribution P(λ) of CIE illuminant D50. In the above-described manner, colors of color patches reproduced according to the candidates of ink amount data for graininess evaluation can be obtained as XYZ values. The color calculator 110 then converts the XYZ values to L*a*b* values. Because the XYZ values and L*a*b* values are device-independent color spaces, the color space conversion can be performed by a known conversion equation. In Step S2006, data that will be used as ink amount data for graininess evaluation are selected from the candidates of ink amount data for graininess evaluation based on the L*a*b* values corresponding to the candidates of ink amount data for graininess evaluation.

Figure 16:
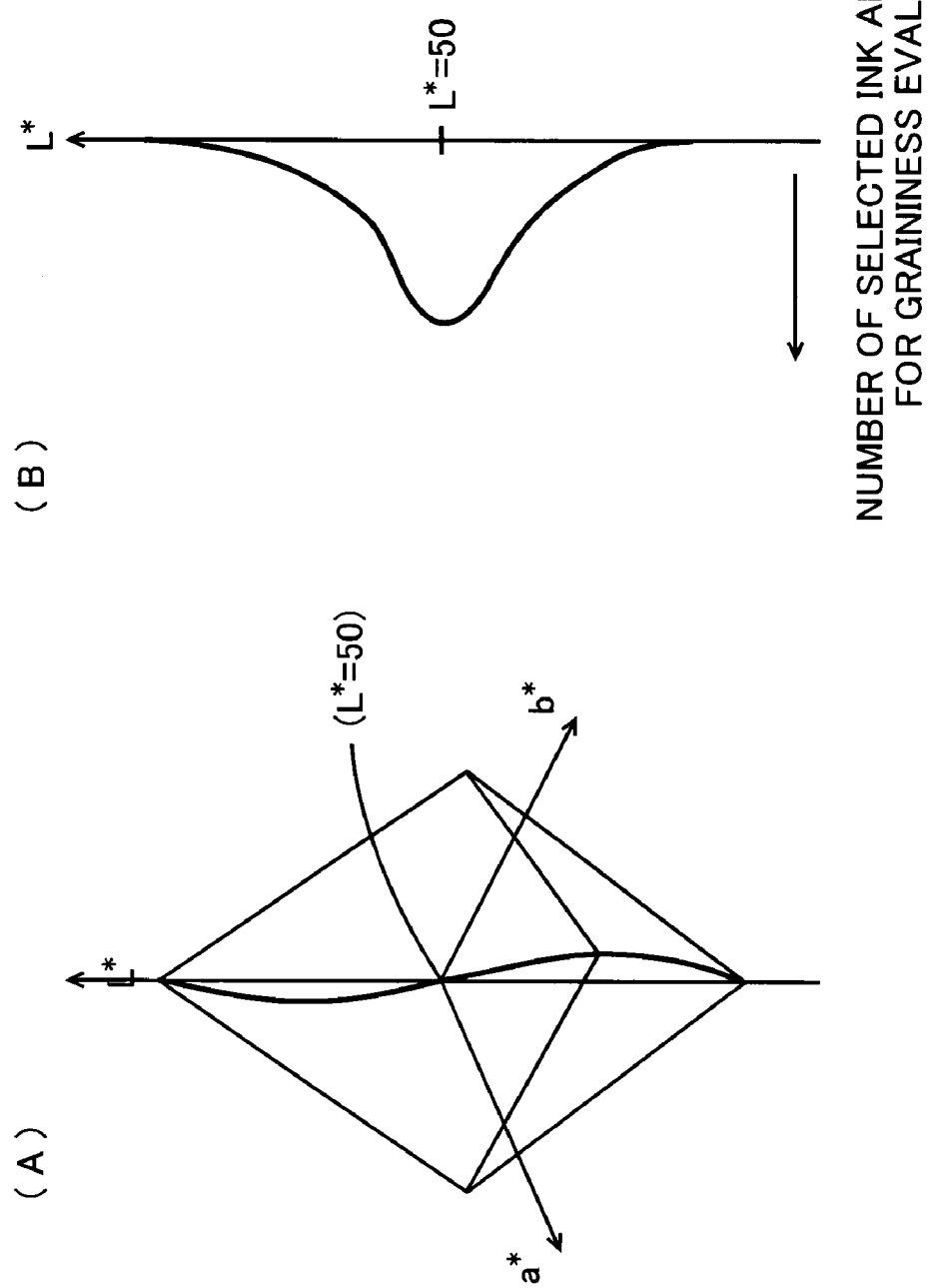
FIG. 16 is a graph illustrating the distribution of ink amount data for graininess evaluation.

FIG. 16A shows schematically a printer gamut. In the figure, the printer gamut in D50 is shown in CIELAB space. In the spectral printing model converter 100, because spectral reflectance Rsmp(λ) within a range of ink dot formation states that can be formed by the printer is evaluated, the L*a*b* values corresponding to the candidates of ink amount data for graininess evaluation that are calculated in the color calculator 110 are distributed in the printer gamut. In Step S2006 a plurality of discrete lightness regions are defined for lightness L*, and the number of ink amount data for graininess evaluation that are selected for each of these lightness regions is determined.

FIG. 15B shows a number distribution of ink amount data for graininess evaluation that are selected for each lightness region. In the figure, the number of ink amount data for graininess evaluation is set to a normal distribution with a medium lightness (L*=50) as an average value (most frequent value). Therefore, a large number of ink amount data for graininess evaluation are used in the medium-lightness region, and the number of ink amount data for graininess evaluation that will be used decreases with a transition to high-lightness region and low-lightness region. In the present embodiment, the total number of ink amount data for graininess evaluation that are selected from lightness regions is 1000. Where the number of ink amount data for graininess evaluation that are selected for each lightness region is determined, candidates of ink amount data for graininess evaluation to which the L*(a*b*) values belong are extracted for each lightness region, and the number of candidates of ink amount data for graininess evaluation that is determined for corresponding lightness region is selected from the extracted candidates. At this time, the candidates of ink amount data for graininess evaluation are randomly selected in a printer gamut relating to a*b* direction in the corresponding lightness region. Where the candidates of ink amount data for graininess evaluation corresponding to all the lightness regions are selected, the selected candidates are set as ink amount data for graininess evaluation.

As shown in FIGS. 16A and 16B, the number distribution of ink amount data for graininess evaluation that are selected for each lightness region can be considered to correspond to a cross-sectional surface area of an a*b* plane for each lightness region of the printer gamut. Therefore, by making the number distribution such as shown in FIG. 16B, it is possible to obtain a uniform density of candidates of ink amount data for graininess evaluation that are selected in the a*b* plane for each lightness region of the printer gamut. Thus, in Step S2006, a plurality of ink amount data for graininess evaluation are almost uniformly prepared in the printer gamut in CIELAB calorimetric value space. Therefore, even when candidates of ink amount data for graininess evaluation are concentrated in a certain color region in CIELAB space, the ink amount data for graininess evaluation can be prepared so that the corresponding L*a*b* values will be uniformly distributed in the printer gamut. Further, a large number of ink amount data for graininess evaluation can be prepared in a medium-lightness region where the printer has the highest color representation capacity. In the present embodiment, candidates of ink amount data for graininess evaluation are randomly selected with respect to a*b* in lightness regions, but better uniformity may be ensured by selecting the candidates of ink amount data for graininess evaluation on equidistantly spaced grid points with respect to a*b*. In Step S2007, candidates of ink amount data for graininess evaluation in the vicinity of gray axis (a*b*=0) are selected as ink amount data for graininess evaluation.

FIG. 17A shows a color region in the vicinity of gray axis where ink amount data for graininess evaluation are selected in Step S2007. The a*b* plane of a predetermined lightness L* is also shown in the figure. As shown in the figure, ink amount data for graininess evaluation are randomly selected from a gray region within a constant chroma C* with the gray axis as a center. In the present embodiment, about 350 data are selected. Further, in Step S2008, candidates of ink amount data for graininess evaluation in the vicinity of skin color and sky blue color are selected as ink amount data for graininess evaluation. FIG. 17B shows a skin color region in which ink amount data for graininess evaluation are randomly selected in Step S2008, and FIG. 17C shows a sky blue color region in which ink amount data for graininess evaluation are randomly selected in the same step. Here, about 350 data are also selected from the skin color region and from sky blue color region. In Steps S2007, S2008, candidates of ink amount data for graininess evaluation on the equally spaced grid points may be also selected for a*b* in each color region. In FIGS. 17A, 17B and 17C, each target color in the a*b* plain is shown, and the target color region is also defined for lightness L*. For example, L*=45 to 85 is taken as a target color region and ink amount data for graininess evaluation are selected that correspond to a*b* values within a range shown in FIGS. 17A, 17B and 17C and having L*=45 to 85. Once a total of N ink amount data for graininess evaluation have been prepared in the above-described manner, the processing of preparing the ink amount data for graininess evaluation is completed and the processing flow returns to the main flow shown in FIG. 14.

In Step S205 of FIG. 14, the evaluation color preparation unit 1290 generates a chart data having arranged therein a plurality of patches for graininess evaluation. The patches for graininess evaluation are sample color samples that are printed, for example, as rectangles on a printing paper, and the inner zones of the same patches for graininess evaluation are printed according to the same ink data amounts for graininess evaluation. Thus, regions corresponding to the patches for graininess evaluation in the corresponding image data are filled with pixels having gradations of the same ink data amounts for graininess evaluation. In the present embodiment, taking the printing and evaluation efforts into account, chart data are generated in which a plurality of color patches are arranged, wherever possible, in a plurality of different positions on the same printing paper. Here, the chart data are generated as image data in the CMYKlclm color system in which the color of each pixel is represented by ink amount data for graininess evaluation (ink amount vector of CMYKlclm). Once chart data are generated, they are outputted to he printer driver 30.

In Step S210, the printer driver 30 performs printing on the basis of the chart data, thereby outputting a chart for graininess evaluation to the printer 40. The processing performed by the printer driver 30 is identical to that of the printer driver 30 explained in Section A, but with respect to the chart data of the CMYKlclm color system, the half-tone processing unit 34 performs half-tone processing as is, without the color conversion unit 32 performing color conversion. The chart for graininess evaluation is thus printed in the printer 40 that is controlled by the printer driver 30.

In Step S215, the chart for graininess evaluation is scanned by the scanner 60. Here, the scanning is performed with a resolution higher than that during color chart printing with the printer. As a result, image data that allow the distribution state of ink dots in each color patch to be determined in greater detail can be obtained with the scanner input unit 126. The scanned image data are preferably converted to device-independent image data of a CIELAB color system by using the input device profile of the scanner 60. In Step S220, the scanned image data are converted into image data L(x, y) of lightness L* distribution on the printing medium (x, y mean horizontal and vertical coordinates on the printing medium). The sample graininess index calculator 1291 then calculates a sample graininess index GIsmp based on the image data L(x, y).

Figure 18:
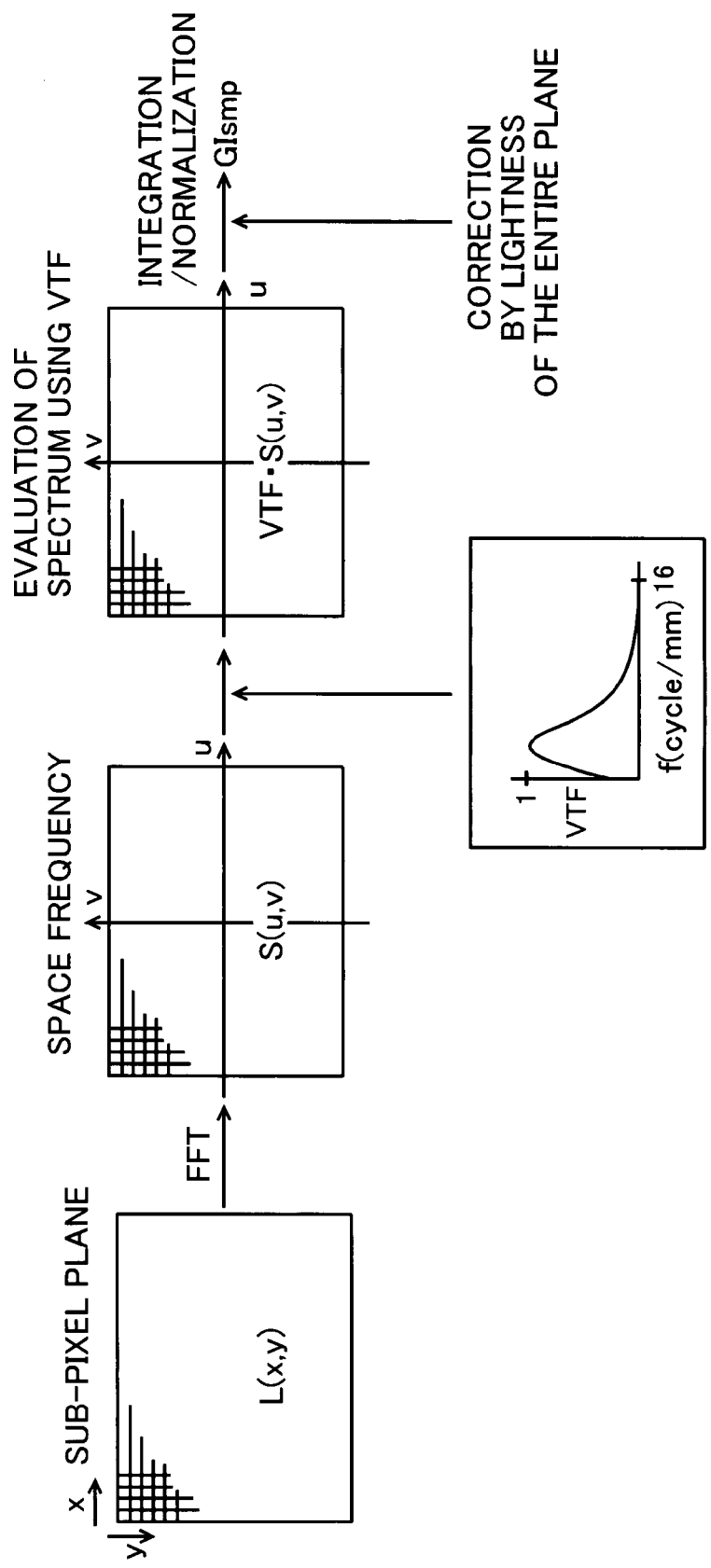
FIG. 18 is a flowchart illustrating the processing of calculating GIsmp.

FIG. 18 illustrates how the sample graininess index GIsmp is calculated. In the present embodiment, the sample graininess index GIsmp is calculated by evaluating the image lightness with a spatial frequency (cycle/mm). For this purpose, first, a FFT (Fast Fourier Transformation) is implemented with respect to the lightness L(x, y) shown at the left end of FIG. 18 (step S225). FIG. 18 shows the spectrum of the spatial frequency obtained as S(u, v). The spectrum S(u, v) is composed of a real part Re(u, v) and an imaginary part Im(u, v), wherein S(u, v)=Re(u, v)+jIm(u, v). The spectrum S(u, v) is equivalent to the above-described Wiener spectrum.

Here, (u, v) has the dimension of the inverse space (x, y), but in the present embodiment, (x, y) are defined as coordinates, and the resolution and other parameters of the scanner 60 have to be taken into account in order to ensure correspondence to the actual length dimension. Therefore, the conversion of dimensions is also necessary in the case where the S(u, v) is evaluated by the dimension of spatial frequency. First, the size f (u, v) of the spatial frequency corresponding to coordinates (u, v) is calculated. Thus, the lowest frequency $e_u$ in the main scanning direction is defined as (X resolution)/25.4, and the lowest frequency $e_v$ in the secondary scanning direction is defined as (Y resolution)/25.4. The X resolution and Y resolution are resolutions at the time of scanning with the scanner 60. Here, 1 inch is taken as 25.4 mm. If the lowest frequency eu, ev in each scanning direction is calculated, then the size f (u, v) of the spatial frequency in any coordinate (u, v) can be calculated as $((e_u \cdot u)^2+(e_v \cdot v)^2)^{1/2}$.

Figure 17:
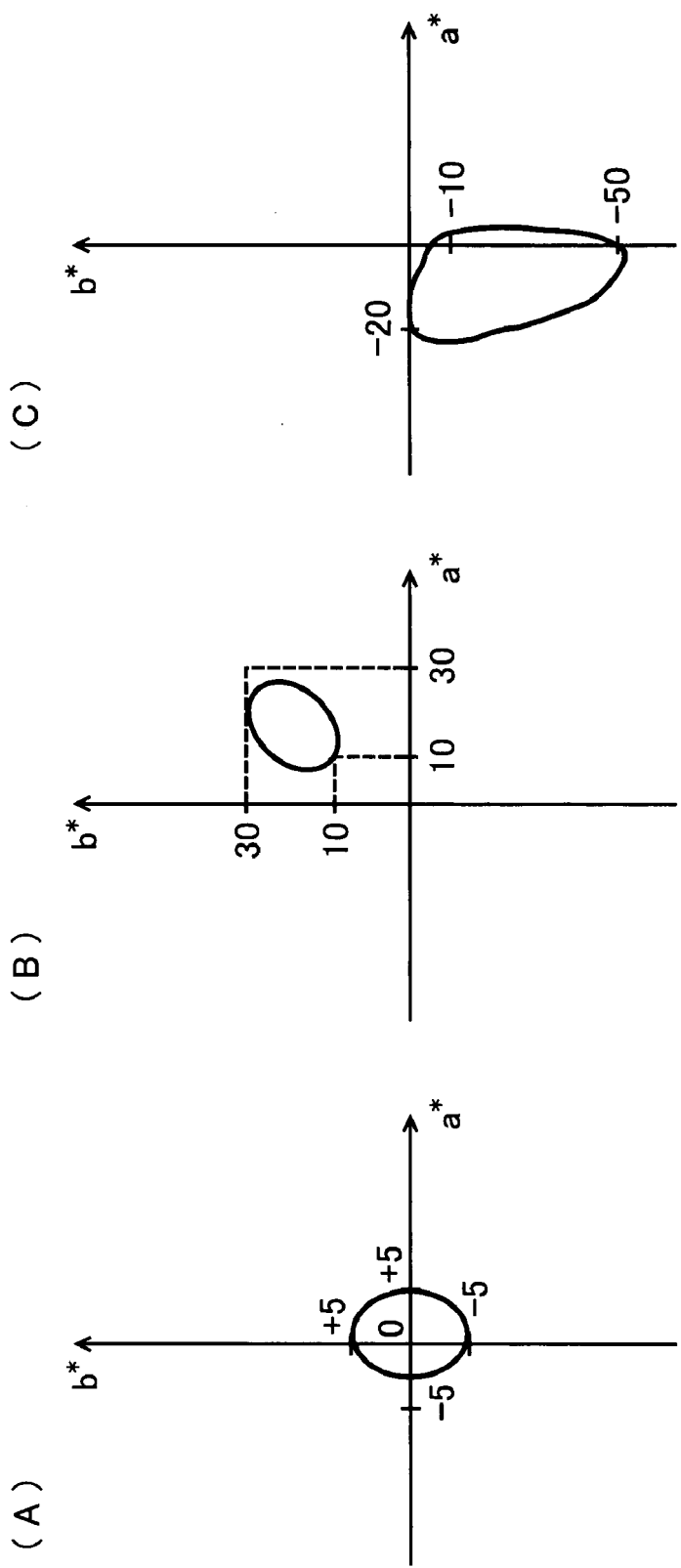
FIG. 17 is a graph illustrating the distribution of ink amount data for graininess evaluation.

On the other hand, sensitivity to lightness differs according to the size f(u, v) of the spatial frequency between people, and the spatial frequency characteristic of vision is, for example, a characteristic such as VTF(f) shown in the lower section in the center of FIG. 17. The VTF(f) in FIG. 17 is as follows: VTF(f)=5.05×exp(−0.138·d·π·f/180)×(1−exp(−0.1·d·π·f/180). Here, d is the distance from the eye to the printing matter, and f is the size f of the spatial frequency. Because f is presented as the above-mentioned function of (u, v), the spatial frequency characteristic VTF of vision can be taken as a function VTF(u, v) of (u, v).

If the above-described spectrum S(u, v) is multiplied by VTF(u, v), then the spectrum S(u, v) can be evaluated in a state in which the spatial frequency characteristic of vision is taken into account. Further, if the evaluation result is integrated, then the spatial frequency can be evaluated with respect to the entire sub-pixel plane. Accordingly, in the present embodiment, in the processing of steps S235-S255, the processing preceding the integration is performed, first, both coordinates in (u, v) are initialized to "0" (step S235) and a spatial frequency f(u, v) in a certain coordinate (u, v) is calculated (step S240). Then, the VTF at this spatial frequency f is calculated (step S245).

Once the VTF has been obtained, the second power of the VTF is multiplied by the second power of the spectrum S(u, v), and the sum with a variable Pow for substituting the integration results is calculated (step S250). Thus, because the spectrum S(u, v) includes the rear part Re(u, v) and the imaginary part Im(u, v), first, the integration is performed with the second power of VTF and the second power of spectrum S(u, v) in order to evaluate the size of the spectrum. Then, it is determined whether the above-described processing has been performed with respect to all the coordinates (u, v) (step S255), and if it is not determined that the processing has been completed with respect to all the coordinates (u, v), the unprocessed coordinates (u, v) are extracted and the processing of step S240 and subsequent steps is repeated. If the size of the spatial frequency increases as shown in FIG. 18, then the VTF decreases rapidly and becomes almost "0". Therefore, the computation can be carried out in a necessary and sufficient range by limiting the value region of coordinates (u, v) in advance to below the predetermined value.

Once the integration has been completed, the ratio of $Pow^{1/2}$/(total number of pixels) is calculated (step S260). Thus, a square root is taken of the variable Pow to return to the dimension of the size of the spectrum S(u, v), and then normalization is performed by dividing by the total number of pixels. With such a normalization, an objective index (Int in FIG. 18) that does not depend on the number of pixels of the original half tone data is calculated. In the present embodiment, the sample graininess index GIsmp is then obtained by performing correction that takes into account the effect of lightness of the entire printed patter. Thus, in the present embodiment, the correction is performed such that even if the spatial frequency spectrum is the same, different printed images are viewed by the human eye when the entire printer matter is light or dark and the graininess is easier felt when the entire printed matter is light. For this purpose, first, the average Ave lightness of the entire image is calculated by adding up the lightness L(x, y) for all the pixels and dividing by the number of pixels (step S265).

Further, the correction coefficient a(L) based on the lightness of the entire image is defined as $a(L)=((Ave+16)/116)^{0.8}$, the correction coefficient a(L) is calculated (step S270), and the result is multiplied by the aforementioned Int to obtain a sample graininess index GIsmp (step S275). The correction coefficient a(L) is equivalent to the above-described lightness correction term $a_L$. Further, the correction coefficient may be a function such that the value of the coefficient increases or decreases by averaging the lightness, and a variety of other functions can be also employed. It goes without saying, that the components for evaluating the sample graininess index GIsmp are not limited to the lightness component, and the spatial frequency may be evaluated by taking into account the hue and chromaticity component. The sample graininess index GIsmp may be calculated by calculating a lightness component, a red-green component, and a yellow-blue component as chroma values, subjecting then to Fourier transformation, and then multiplying by the spatial frequency of vision that was defined in advance for each color component.

The graininess of the printed color patch is thus quantitatively represented by the sample graininess index GIsmp by the above-described processing of steps S205-S275. By performing the processing of steps S205-S275 with respect to color patches printed according to a plurality of ink quantity sets generated in step S200, the sample graininess index GIsmp relating to each ink amount data for graininess evaluation can be obtained. In step S280, a learning data CD is stored that records the corresponding relationship between each ink amount data for graininess evaluation and the sample graininess index GIsmp. In step S285, the graininess profile production unit 1292 conducts the processing of producing the graininess profile 200 based on the learning data CD.

Figure 19:
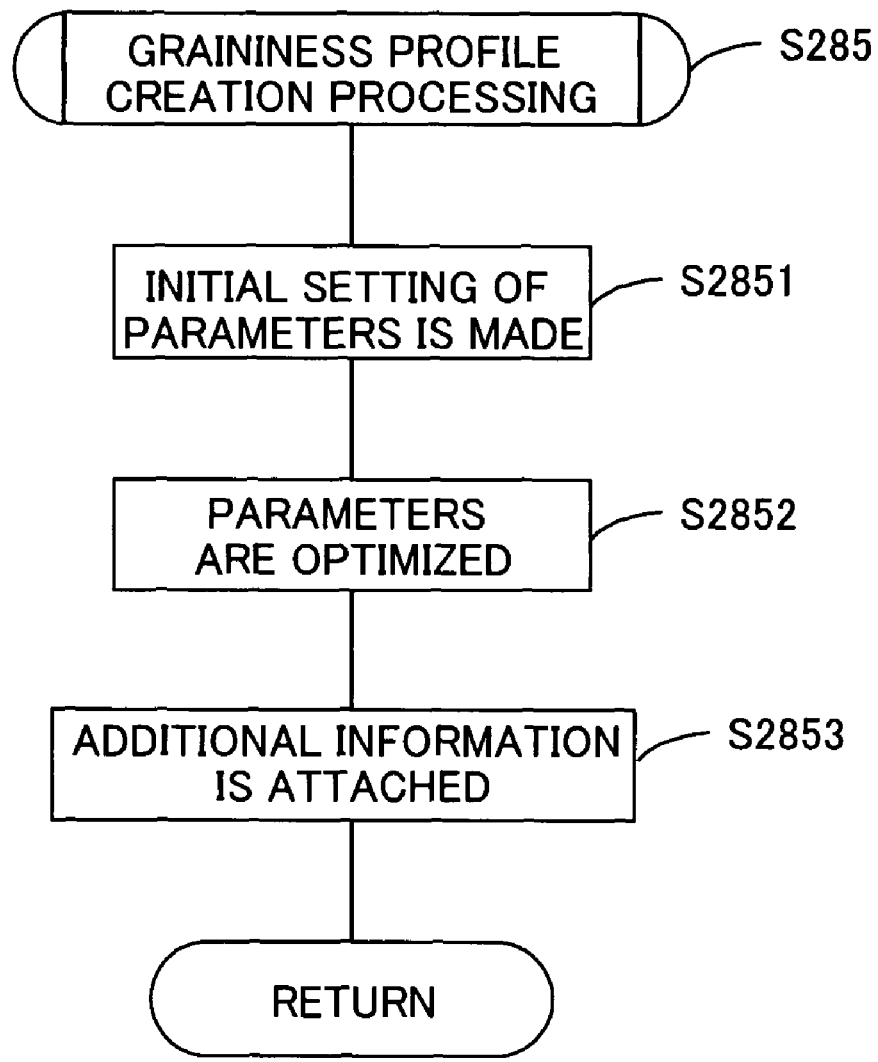
FIG. 19 is a flowchart illustrating the processing of producing a graininess profile.
Figure 20:
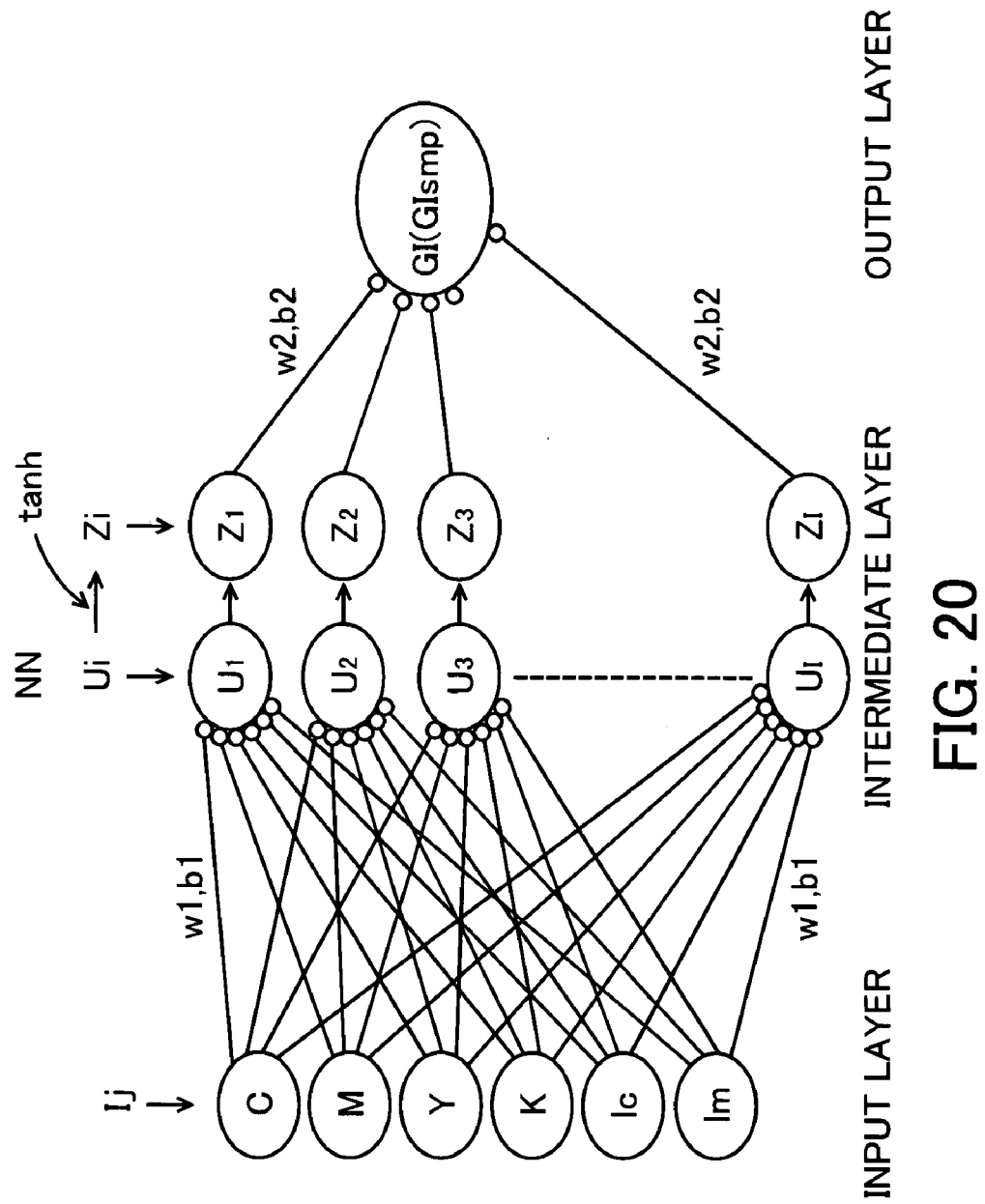
FIG. 20 is an explanatory drawing illustrating an NN structure.

FIG. 19 is a flowchart of the graininess profile production processing. FIG. 20 shows a structure of a neural network (NN) as a graininess profile in the present embodiment. In step S2851 shown in FIG. 19, the initial setting of each parameter determining the NN structure is performed. In the NN of the present embodiment, the input layer is an ink quantity vector $I_j$=(C, M, Y, K, lc, lm), (j=1-6). On the other hand, the output layer becomes a sample graininess index GIsmp. The NN of the present embodiment has a three-layer structure in which a monolayer interlayer is set and the number of intermediate units constituting the interlayer can be set arbitrarily. Representing an intermediate unit by $U_i$ (m=1-I), the total number I (for example, I=23) is set in step S2851. Generally, if the number of intermediate units $U_i$ is less than the number of master signals, the trend to under-fitting is strengthened. Therefore, it is preferred that the appropriate number I of the intermediate units $U_i$ be set by taking into consideration the number N of the ink amount data for graininess evaluation that were generated in step S200.

Each intermediate unit $U_i$ will be assumed to be represented by the following Equation (12)
(Equation (12))

In Equation (12), each intermediate unit $U_i$ has a weight $W1_{ij}$ inherent to each ink quantity $I_j$, and the intermediate units are obtained by multiplying each ink quantity $I_j$ by the weight $W1_{ij}$ and combining the products linearly. Further, each intermediate unit $U_i$ has an inherent bias $b1_i$, and the bias $b1_i$ is added to the linear combination of ink quantities $I_j$. The initial setting of all the weights $W1_{ij}$ and biases $b1_i$ is performed in step S2851. At the initial stage, the weight $W1_{ij}$ and bias $b1_i$ may be determined in any way. For example, the weight $W1_{ij}$ and bias $b1_i$ may be dispersed according to a normal distribution having 0 as a frequency average.

The finally obtained graininess index GI is assumed to be represented by the following Equation (13).
(Equation (13))

The graininess index GI in Equation (13) has an inherent weight $W2_i$ for each intermediate unit $U_i$ and the graininess index is obtained by multiplying the output value $Z_i$ from each intermediate unit $U_i$ by the weight $W2_i$ and combining the products linearly. The bias b2 is added in a similar manner. The initial setting of each weight $W2_i$ and bias b2 is performed in step S2851. The relationship between the intermediate unit $U_i$ and the output value $Z_i$ can be represented by the transfer function of Equation (14) below.
(Equation (14))

The transfer function may be a differentiable monotonously growing continuous function, and a linear function also can be employed. In the present embodiment, a nonlinear hyperbolic tangent function is set to obtain a nonlinear output. It goes without saying that a sigmoid function can be also used. The initial setting of all the weights $W2_i$ and biases b2 is also performed in step S2851. At the initial stage, the weight $W2_i$ and bias b2 may be determined in any way. In this case, too, the weight $W2_i$ and bias b2 may be dispersed according to a normal distribution having 0 as a frequency average. The NN structure is created by initially setting each parameter in the above-described manner. However, because each parameter is set appropriately, they have to be learned and optimized with the learning data CD that is based on actual evaluation of color patches.

Accordingly, the optimization of parameters is performed in step S2852. Here, the optimization of parameters $W1_{ij}$, $b1_i$, $W2_i$, b2 is performed by an error back propagation method. With the error back propagation method, an error between the output (sample graininess index GIsmp) with respect to the input (ink amount data for graininess evaluation) in the learning data CD and the sample graininess index GI outputted when a ink amount data for graininess evaluation is inputted in the NN is successively transferred to the layer of the preceding gradation, thereby successively determining the parameters of each layer. As a base guideline, the parameters $W1_{ij}$, $b1_i$, $W2_i$, b2 are optimized so as to minimize the aforementioned error, whereby the graininess index $GI_{NN}$ predicted in the NN assumes a value close to the graininess index GI obtained by actual evaluation. However, when this guideline is followed, if the sample graininess index GIsmp obtained by actual evaluation contains noise, the noise is also reproduced in the NN output. Thus, over-fitting occurs. Accordingly, the evaluation function E represented by Equation (15) below is used to inhibit the over-fitting.
(Equation (15))

The slope of the evaluation function E is then found by partial differentiation of the evaluation function E by a parameter p that is the optimization object, while changing the parameter p, and the value of the parameter p at which the absolute value of the slope is reduced to a minimum is taken as the parameter p after optimization (slope method). As a result, a parameter p at which the evaluation function E is reduced to a minimum in fluctuations of the parameter p that is the optimization object can be specified. A parameter from amongst the parameters $W1_{ij}$, $b1_i$, $W2_i$, b2 that is the optimization object is represented by the parameter p, and the parameter p that is the optimization object is set sequentially in the order of proximity from the output. If all the parameters $W1_{ij}$, $b1_i$, $W2_i$, b2 are sequentially optimized, the same processing is repeated the prescribed number of times or until the evaluation function E become below the predetermined threshold. As a result, the evaluation function E can be converged to a small value, while reflecting the interaction between the parameters $W1_{ij}$, $b1_i$, $W2_i$, b2.

Further, $E_D$ is an error function for evaluating the error of graininess indexes $GI_{NN}$, GI. This function is represented by Equation (16) below.
(Equation (16))

Thus, the error function $E_D$ is represented by the second power of the error of the graininess indexes $GI_{NN}$, GI with respect to all the ink amount data for graininess evaluation (n is a ink amount data number, n=1-N). The graininess index $GI_{NN}$ is obtained by successively inputting the ink amount data for graininess evaluation into the input layer of the NN. By minimizing the evaluation function E including the error function ED, the displacement between the graininess index GI obtained by actual evaluation and the graininess index $GI_{NN}$ that is outputted by the NN can be minimized with respect to an arbitrary ink quantity set including the ink quantity space. Further, when the evaluation function E does not become below the desired threshold even when the optimization is repeated the prescribed number of times, the number I of intermediate units $U_i$ may be increased to improve the fitting capacity. Conversely, when the evaluation function E becomes less than the desired threshold after a very small number of optimization cycles, the number I of intermediate units $U_i$ may be increased to inhibit the fitting capacity.

On the other hand, $E_W$ is an inhibition function for inhibiting the over-fitting of the graininess index $GI_{NN}$ based on the NN with respect to the sample graininess index GIsmp based on actual evaluation. This function is represented by Equation (17) below.

(Equation (17))

In Equation (17) the inhibition function $E_W$ is represented by the sum of second powers of parameter $p_s$ that are the optimization objects. The index s (s=1–S) in this equation means the number of parameters p of the same kind. For example, when the weight $W2_i$ is taken as a parameter p that is an optimization object, then i (i=1–I) is equivalent to s (s=1–S). According to Equation (17), the parameter $p_s$ can be converged to 0 by minimizing the evaluation function E that includes the inhibition function $E_W$. If the absolute value of the weights $W1_{ij}$, $W2_i$ in NN increases, the curvature of the fluctuation curve of the outputted graininess index $GI_{NN}$ become abrupt. In such a case, there is a high probability of the abnormal master signal containing noise (graininess index GI) of producing an undesirable effect. Therefore, the curve of the graininess index $GI_{NN}$ can be smoothed and over-fitting caused by the sample graininess index GIsmp containing noise can be inhibited by converging the weights $W1_{ij}$, $W2_i$ to 0 with the inhibition function $E_W$.

Here, in Equation (15), α, β can be taken as coefficients (hyper-parameters) for adjusting the weights of the error function $E_D$ and inhibition function $E_W$ in the evaluation function E. The hyper-parameters α, β are given by the following Equation (18) and Equation (19).

(Equation (18))
(Equation (19))

γ in Equation (18) and Equation (19) above is represented by the following Equation (20).

(Equation (20))

Further, $\lambda_s$ of Equation (20) above is an intrinsic value of a hessian matrix comprising S rows×S column that was obtained by second-order differentiation of the error function $E_D$ by the parameter $p_s$ that is the optimization object. This intrinsic value $\lambda_s$ can be said to reflect the slope fluctuations of the error function $E_D$ relating to the parameter $p_s$. When the slope fluctuations of the error function $E_D$ are large, the hyper-parameter α becomes large and the inhibition function $E_W$ gains importance. Conversely, when the slope fluctuations of the error function $E_D$ are small, the hyper-parameter β becomes large and the inhibition function $E_D$ gains importance.

Thus, when the graininess index $GI_{NN}$ outputted by the NN abruptly starts or stops tracing the sample graininess index GIsmp that is actually evaluated, there is a high probability that the sample graininess index GIsmp based on actual evaluation of the periphery thereof will be abnormal (large effect of noise), and in this case the weight of the inhibition function $E_W$ is increased. As a result, the unreasonable fitting can be prevented with respect to the abnormal sample graininess index GIsmp and a NN output with a high degree of smoothness can be obtained. It is preferred that the hyper-parameters α, β be updated once the optimization of the parameters advances to a certain stage.

Once the parameters $W1_{ij}$, $b1_i$, $W2_i$ b2, I have thus been set, the NN structure is established and the NN constituting the main part of the graininess profile 15d is produced. In the next Step S2853, an additional information is added to the NN. The additional information indicates conditions under which the graininess profile 15d is produced and mainly serves to specify printing conditions during printing of the patches for graininess evaluation in Steps S205, S210 of FIG. 14. More specifically, model information or device information on the printer 40 that prints the patches for graininess evaluation, or conditions under which the printer driver 30 performs resolution conversion, half-tone processing, or microweave processing in step S210 is added as the additional information.

Once the graininess profile 15d is thus produced, the GI calculator 1220 can calculate the graininess index GI by applying any sample ink amount data (CMYKlclm) to Equation (5) in Step S75 of FIG. 5. As described above, in Step S75, the graininess profile 15d is used that corresponds to the printing conditions based on the profile data 15b, 15c, but because additional information has been added to the NN of each graininess profile 15d, an adequate NN can be used.

The calculation of GI by Equation (5) is substantially identical to performing successively the calculation by Equations (12) to (14) with respect to the sample ink amount data. By using the NN as in the present embodiment, an unknown graininess index GI corresponding to any sample ink amount data can be predicted easily and accurately. Further, because the NN is created based on actual evaluation of the patches for graininess evaluation that are actually printed in the printer 40, the graininess index GI can be predicted by taking into account a stationary error characteristic of the printer 40. Furthermore, because overfitting in Equation (15) is suppressed, noise effect can be prevented even in the case of a small number of ink amount data for graininess evaluation, the number of patches for graininess evaluation that are to be printed can be reduced, and time and trouble of printing and scanning can be saved.

FIG. 20A shows how the NN of the present embodiment is fitted in the actually evaluated graininess index GIsmp. Basically, the graininess index GI passes in the vicinity of the actually evaluated graininess index GI that is plotted by points. However, because overfitting in Equation (15) is suppressed, for example, even when the actually evaluated sample graininess index GI that is affected by noise such as shown by point F in the figure is present in the learning data CD, overfitting for the point F can be inhibited and smooth variation of the graininess index GI can be predicted, and a prediction that is closer to a true value can be made. In the case where such sample graininess index GIsmp of the noise is present, the gradient variation of the error function ED becomes large and hyperparameter α also increases. Accordingly, a great deal of importance is attached to the inhibit function $E_W$. Where the inhibit function $E_W$ is important, a force converging the weights $W1_{ij}$, $W2_i$ to 0 increases and smoothness of the variation curve of the graininess index GI can be ensured.

Further, in the present embodiment, the ink amount data for graininess evaluation is prepared almost uniformly in the printer gamut in the CIELAB space. Therefore, fitting can be performed with respect to sample graininess indices GI of uniform density over the entire region of printer gamut. When the ink amount data for graininess evaluation is thus prepared to be almost uniform in the CIELAB space, the variation of sample graininess index GI occurring in response to variation of each ink amount cannot always be determined, but because a color patch group of gradations relating to ink amounts is evaluated separately from the almost uniform ink amount data for graininess evaluation in the CIELAB space, the variation characteristic of the sample graininess index GIsmp corresponding to the variation of ink amounts can be reflected in learning of NN. Further, because a patch group for graininess evaluation of gradation is also evaluated with respect to secondary colors and tertiary colors, it is possible to realize learning that also reflects the alternating effect on the sample graininess index GIsmp occurring due to color mixing of a plurality of inks.

Figure 21:
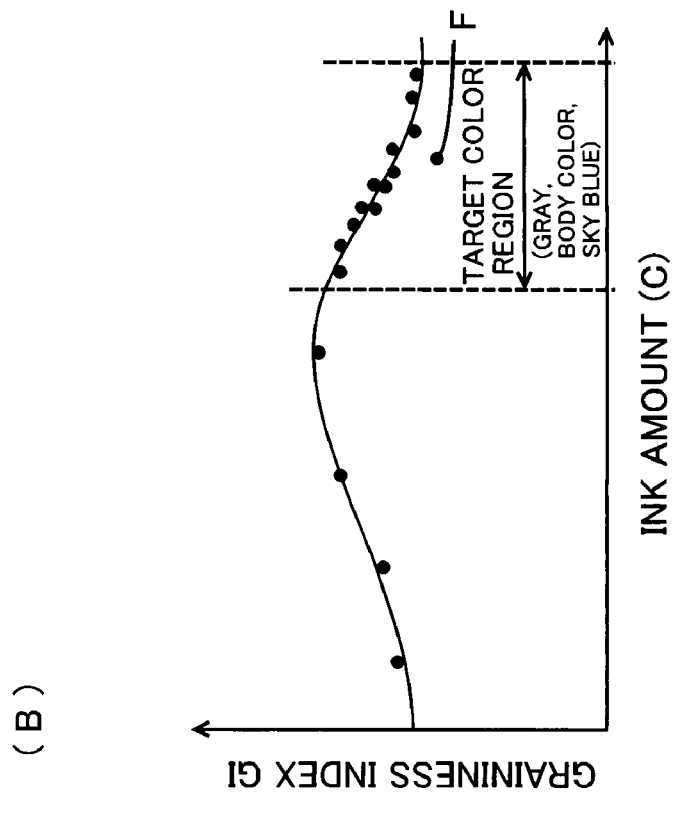
FIG. 21 is an explanatory drawing that shows fitting performed with NN.
Figure 21:
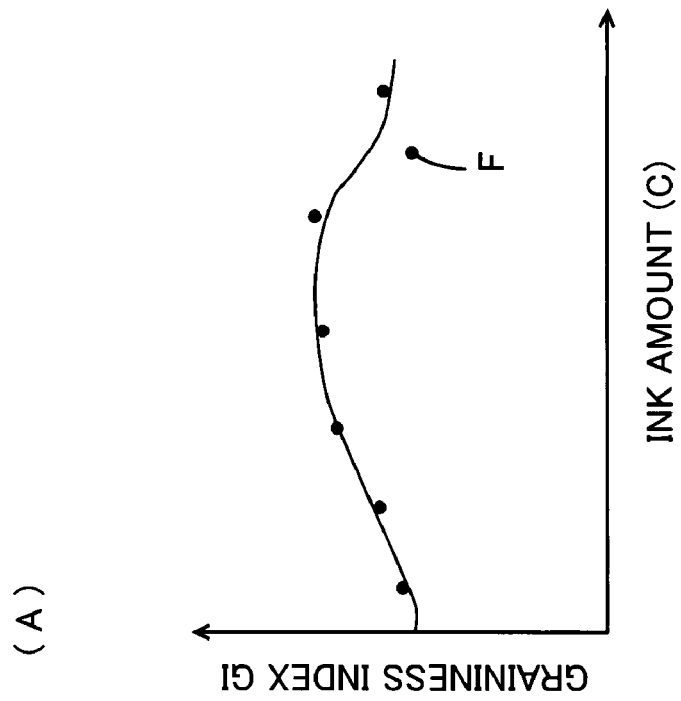

Further, because a large number of ink amount data for graininess evaluation are prepared in the gray region, skin color region, and sky blue region, the density of actually evaluated sample graininess index GI for which fitting is performed in these color regions can be increased. FIG. 21B shows how the density of actually evaluated sample graininess index GI is increased in the gray region, skin color region, and sky blue region. Where the density of actually evaluated sample graininess index GIsmp is thus high, the effect of noise on fitting in these color regions can be inhibited. Therefore, a more accurate prediction of graininess index GI can be realized for these color regions.

D. VARIANT EXAMPLES

D1. Variant Example 1

In the embodiments described hereinabove, six inks, namely, CMYKlclm, are used, but ink types are not limited to these and any plural number of inks can be used. However, the use of inks having colors that are equivalent to secondary colors of the basic ink colors CMYK, such as orange ink and green ink is preferred due to a greater degree of freedom as to the shape of spectral reflectance that can be reproduced.

D2. Variant Example 2

In the first embodiment hereinabove, the color space of calorimetric values is divided into a plurality of cells, and a sample that has the best evaluation index EI within each cell is selected as a representative sample. However, the method for selecting a plurality of representative samples for use in creating a color conversion profile is not limited to the above-described methods; generally, selection of a plurality of representative samples on the basis of an evaluation index EI is possible. For example, it would be possible to select a plurality of representative samples without dividing the color space of calorimetric values into a plurality of cells. Specifically, a plurality of grid points (nodes) can be defined within the color space of calorimetric values, and samples meeting predetermined evaluation criteria in proximity to the nodes can be selected as representative samples for the nodes.

D3. Variant Example 3

A configuration in which a profile that has been selected in advance by the user is selected and acquired from the HDD 15 is explained by way of an example for the profile selector 33 of the above-described embodiment. However, the profile selection method is not limited to that in this example. For example, because indices that are to be considered when a profile is produced may differ depending on printing conditions, a configuration can be employed in which a profile that has to be selected is determined in advance for each printing condition, and when printing with the printer 40 is performed, the profile is selected based on this printing condition.

Various approaches may be employed in associating printing conditions with indices that have to be taken into account when a profile is produced. For example, where the printing condition is one of copying an original image, profile data 15c taking the MI into account are preferably selected. With such a selection, a printout can be obtained such that colors of the original are faithfully reproduced even when the viewing conditions change. Where the printing condition is one of creating a poster or other picture using photo retouching software or the like, and producing a test sheet for printing same in large quantities, a profile data 15b taking into consideration CII is preferably selected. Thus, in the printouts that are printed with reference to the profile data 15b, changes in color appearance are small even when viewing conditions change. Therefore, where colors are confirmed at a test sheet stage, colors determined at the test sheet stage can be expected to be matched after the posters or the like that have been printed in large quantities are distributed, regardless of the environment at the distribution destination site.

Further, pattern of ink bleeding may differ completely with the type of printing medium, for example, between plain paper and photographic paper; with plain paper, conditions may occur such that image quality will not change that much when the graininess index is taken into consideration. Accordingly, unnecessary profile production procedures can be avoided by determining in advance indices to be taken into consideration with respect to each type of printing media. In any event, as described hereinabove, with a configuration such that profiles are selected based on printing conditions, profile data 15b, 15c can be produced by using optimum indices matching the printing conditions.

D4. Variant Example 4

Various other methods may be also employed for selecting a profile with the profile selector 33 as described hereinabove. For example, a profile may be selected based on the type of image to be printed. For example, as noted previously where there is an original image from which a copy is to be printed, it will be desirable to select profile data 15c, which take into consideration MI. On the other hand, where an image has been created using photo retouching software or the like, it will be desirable to select profile data 15b, which takes into consideration CII.

D5. Variant Example 5

In the above-described embodiment, an example is explained in which the user selection is followed with respect to the index that is selected by the index selector 126, but it goes without saying that a configuration in which the user selection is followed is not limiting. For example, a configuration may be used such that printing conditions and indices are associated in advance and the index selector 126 selects an index with reference to the printing condition, or a configuration may be employed such that an index is selected depending on whether the original image is present in images that are printing objects.

D6. Variant Example 6

Further, the method for producing profile data 15b, 15c in FIG. 2 is not limited to that in the embodiment hereinabove. For example, a smoothing process that enables the output with smooth gradation may be performed in the profile generation unit 140. In such smoothing process, a smoothed ink profile, a smoothed ink profile 144 is produced from the aforementioned ink profile 142. Thus, by means of processing similar to that in the first embodiment, the steps preceding Step S35 in FIG. 3 are performed and representative samples are selected. Next, Steps S40, S45 are not performed; instead, CIELAB calorimetric values and ink amounts are associated to the create ink profile 142. As described hereinabove, because there are $16^3$ cells, $16^3$ or fewer representative samples are registered in the ink profile 142.

In the profile data 15b, 15c for use in a typical printer, number of samples of ink amounts and sample colors defined in each profile do not necessarily match those of the representative samples. Accordingly, it is necessary to perform interpolation calculations on calorimetric values corresponding to random ink amounts, while referring to the representative samples. Regardless of whether interpolation calculations are made by uniform or non-uniform interpolation, where the representative samples are arranged irregularly in the CIELAB space, accuracy of the interpolation calculations will be poor. Where the accuracy of the interpolation calculations is poor, the conversion accuracy when color conversion is performed with the profiles in the profile data 15b, 15c will be poor as well, and it will not be possible to obtained printed results of high image quality by performing printing using profiles in the profile data 15b, 15c.

Figure 22:
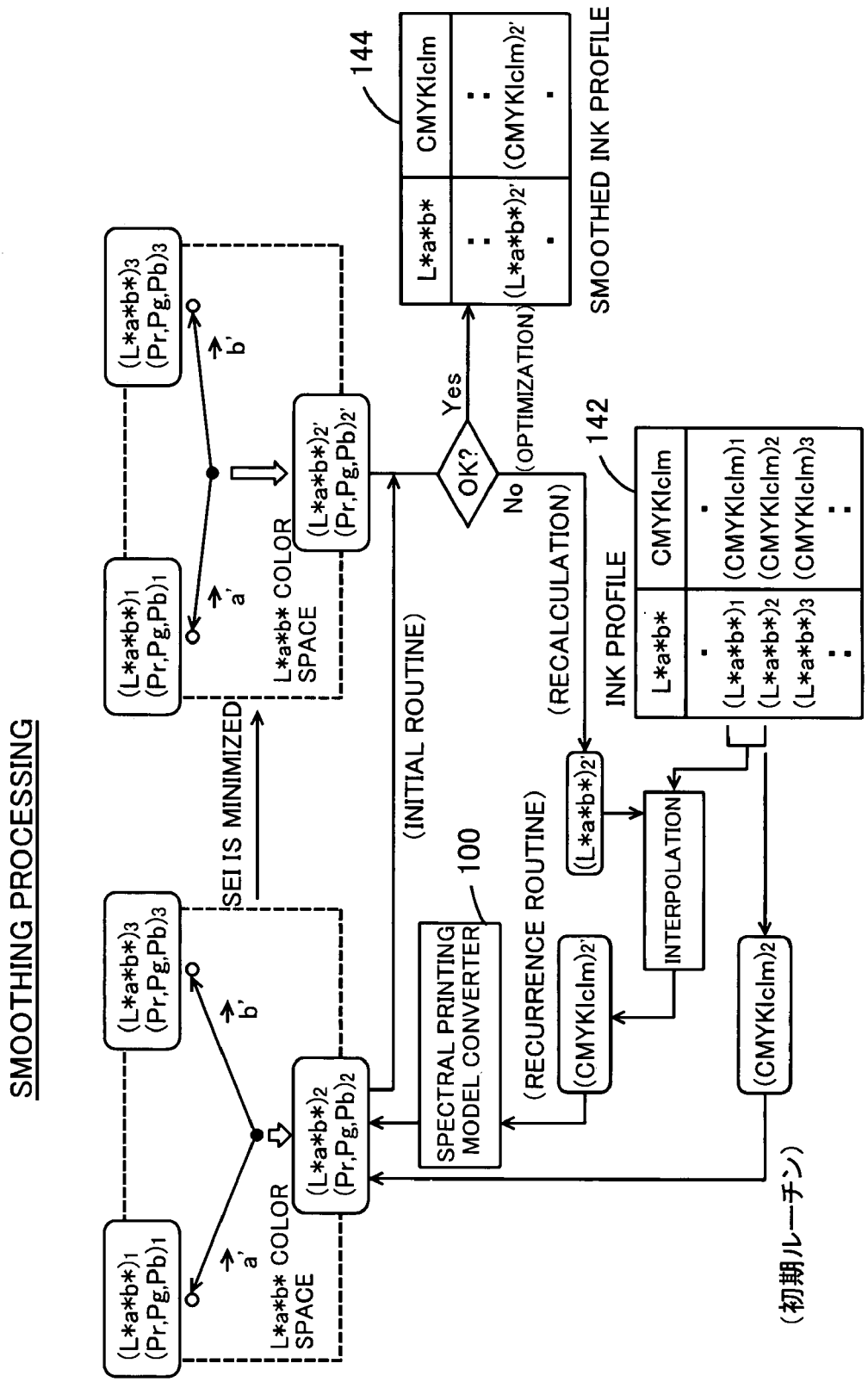
FIG. 22 is a block diagram for explaining the smoothing processing.

Accordingly, a smoothing processing is performed with respect to the ink profile 142, and representative samples on which interpolation calculations can be performed with high accuracy are re-selected to produced a smoothed ink profile 144. FIG. 22 is an explanatory drawing illustrating the smoothing processing in a working example. In this working example, the calorimetric values described in the ink profile 142 may be considered as grid points in the CIELAB space, and a smoothness evaluation index SEI is defined, this index serving to evaluate whether the arrangement of these grid points in the CIELAB color space has been smoothed.

Here, the degree of smoothness of arrangement is a degree of distortion when a plurality of grid points are arranged side by side in space. For example, where grid points are arranged in a cubic grid in a color space, there is no distortion, but when grid points are shifted from the cubic grid positions, the distortion of the grid increases. Also, a more uniform arrangement of grid points within a color space may be said to have a higher degree of smoothness, whereas when a curve is considered that connects neighboring grid points within a color space, the curve being drawn from one boundary to the other boundary of the gamut formed in the color space, the degree of smoothness may be said to decrease with the increase in the order of the function describing the curve.

Generally, with grid points arranged in a regular manner within each color space, when colors therebetween are calculated by means of interpolation, it is possible to perform interpolation without large variations in interpolation accuracy caused by local position of the space. Therefore, by optimizing grid point positions through smoothing, it is possible to increase interpolation accuracy during interpolation performed with reference to ink profile. Grid points to be optimized through smoothing may be also referred to as optimization-targeted grid points.

It will be sufficient to indicate the degree of smoothness of arrangement with a value of SEI, and the evaluation is improved by bringing this value closer a theoretical value. In a working example shown in FIG. 22, position information indicating the positions of grid points of calorimetric values that are objects of smoothing (optimization-targeted grid points) is defined, and the SEI is defined as a function having this position information as a variable. SEI is also defined as a function having a smaller value as the degree of smoothness in grid point arrangement increases. By defining SEI in this way, grid point arrangement can be optimized by searching for calorimetric values that minimize SEI. This search can be carried out by various methods. For example, a Quasi Newton method, a conjugate gradient method, or other algorithm can be employed.

Figure 23:
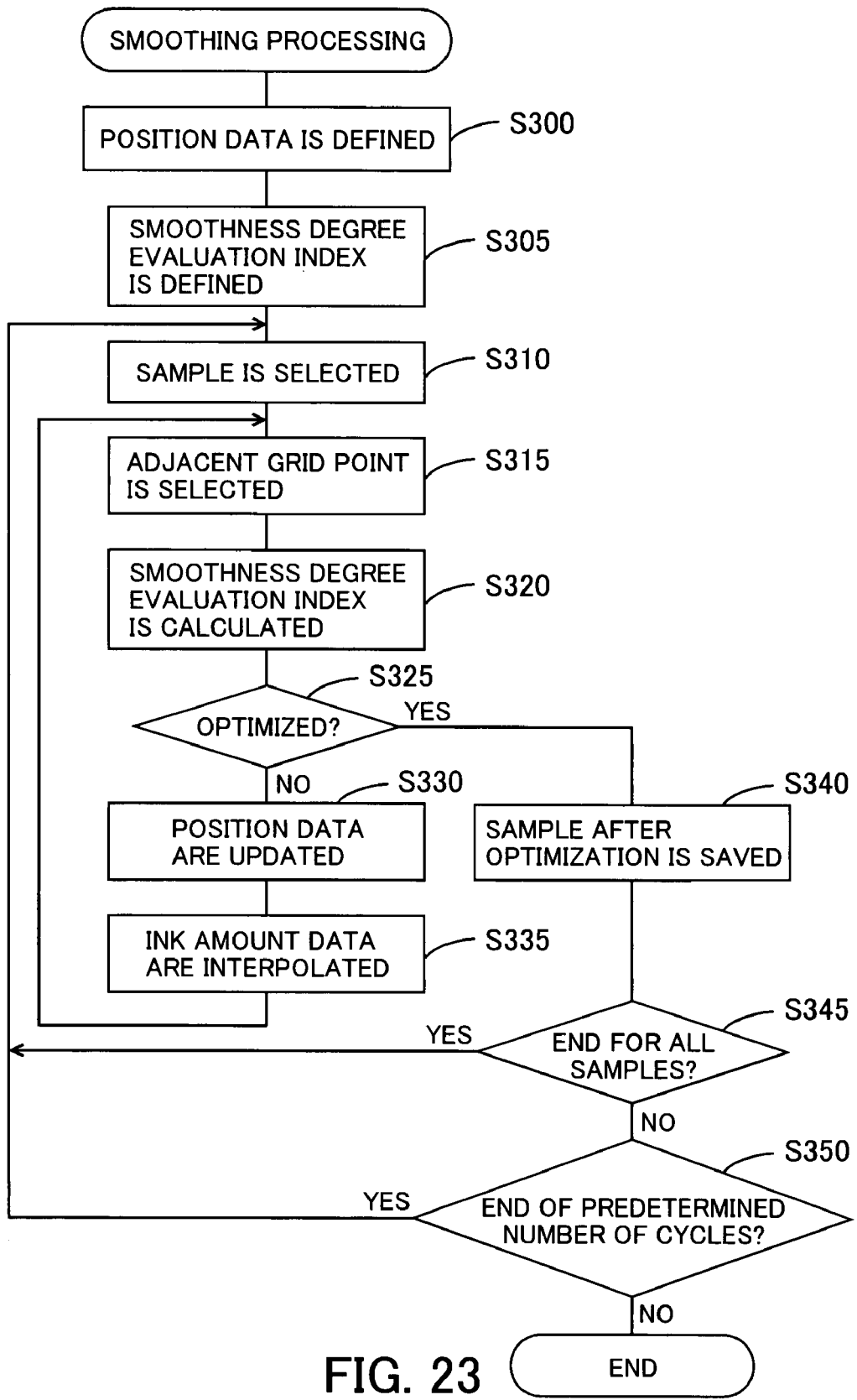
FIG. 23 is a flowchart of smoothing processing.
Figure 24:
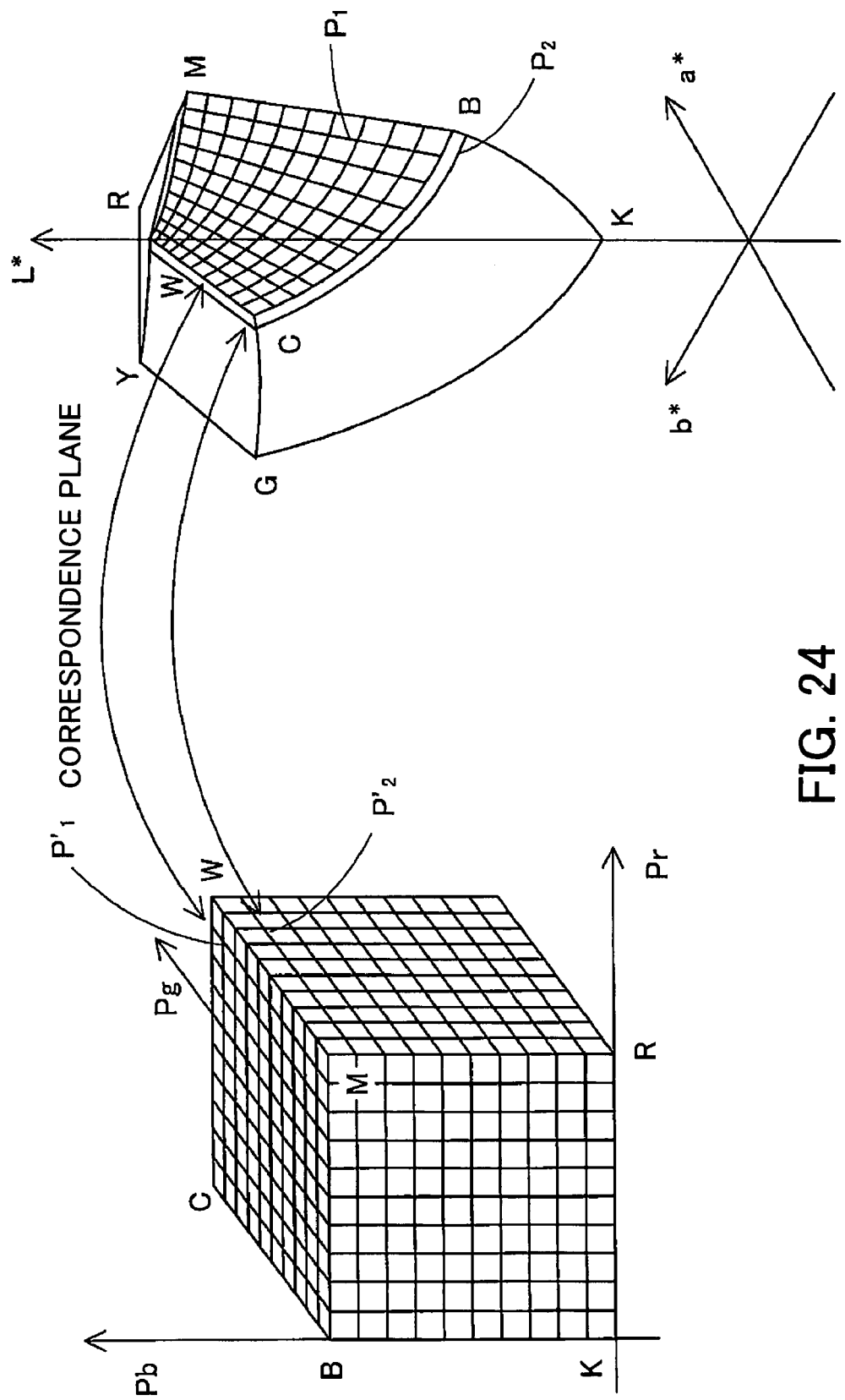
FIG. 24 is an explanatory drawing illustrating the selection of position information.

FIG. 23 is a flowchart of processing in this working example. The profile generator 140, when performing the smoothing processing, defines the aforementioned position information in Step S300. FIG. 24 shows an example of how the position information is defined. A plurality of calorimetric values are described in the ink profile 142; when these calorimetric values are plotted in the CIELAB space, a gamut like that shown at the right side in FIG. 24 is formed. Further, calorimetric values are a set of discrete values, and FIG. 24 shows the exterior planes of the gamut formed by the grid points located on the outermost side, among the plotted calorimetric values. Apices WKRGBCMY respectively indicate white, black, red, green, blue, cyan, magenta, and yellow; for achromatic colors W, K, these correspond to the maximum lightness and minimum lightness colors, and for the chromatic colors RGBCMY to the color of maximum saturation for each color.

Position information is defined so as to specify uniquely each grid point in the CIELAB space and to make it possible to ascertain positional relationships with neighboring grid points. In a working example, the following definitions are used for three variables (Pr, Pg, Pb): $0 \leq Pr \leq$ (R direction grid point number $-1$; $0 \leq Pg \leq$ (G direction grid point number $-1$); and $0 \leq Pb \leq$ (B direction grid point number $-1$). Here, the R direction grid point number is the number of grid points positioned on the ridgeline connecting black (K) and red (R) in the gamut shown at the right side in FIG. 22. Similarly, the G direction grid point number is the number of grid points positioned on the ridgeline connecting black (K) and green (G) in the gamut shown at the right side in FIG. 24, and the B direction grid point number is the number of grid points positioned on the ridgeline connecting black (K) and blue (B) in the gamut shown at the right side in FIG. 24.

Initial values for the three variables (Pr, Pg, Pb) are integers. Here, where position information (Pr, Pg, Pb) is plotted in a three-dimensional orthogonal space, a generally cubic grid like that shown at the left side in FIG. 22 is formed. At the left side in FIG. 24, intersections of straight lines correspond to initial values of position information (Pr, Pg, Pb). The number of grid points shown in FIG. 24 is merely exemplary. By performing association with grid points in the CIELAB space described above after the position information has been defined in the above manner, it becomes possible to ascertain grid point positions and relative mutual arrangement with surrounding neighboring grid points.

Position information is associated with grid points in the CIELAB space by assuming that the exterior plane of the generally cubic body shown at the left side in FIG. 24 corresponds to the exterior plane of the gamut shown at the right side in FIG. 24. For example, an exterior plane WMBC (exterior plane $P_1$) of the gamut corresponds to an exterior plane $P_1'$ formed by fixing position information Pb to the maximum value at the left side in FIG. 24 and taking random values for position information Pr, Pg. Here, by associating the grid point corresponding to apex B on the exterior plane P1 and the grid point corresponding to apex B on the exterior plane $P_1'$ (Pb is at maximum value, Pr=Pg=0), grid points on the exterior plane $P_1$ are associated with position information on the exterior plane $P_1'$.

Likewise, by considering a curved surface $P_2$ on the inside of the exterior plane $P_1$ of the gamut and extracting grid points located on the exterior plane $P_1$ in the vicinity of the curved surface $P_2$, it is possible to associate these grid points with position information on a plane $P_2'$ inside the cube shown at the left side in FIG. 24. All gamut grid points located within the gamut and position information can be associated by similar operations. Where it is possible to associate grid points and position information in this way, the position of any grid point can be specified by position information.

For example, where position information for two neighboring grid points is respectively $(Pr_0, 0, 0)$ and $(Pr_1, 0, 0)$, an arbitrary position between these grid points is expressed, by means of an arbitrary value $Pr_2$ between $Pr_0$ and $Pr_1$, as $(Pr_2, 0, 0)$. It goes without saying that the definition of position information given hereinabove is merely exemplary; any method that uniquely specifies each grid point in the CIELAB space and enables relative mutual arrangement with surrounding neighboring grid points to be ascertained can be used to determine position information. The number of grid points present on a single plane may be given, for example, as: ((total number of calorimetric values described in the ink profile 142)$^{1/3}$)$^2$.

Once all the grid points in a gamut have been associated with position information, the SEI is defined in Step S305. In a working example shown in FIG. 22, the SEI is defined as a function that includes an absolute value of the sum of vectors of mutually opposite orientations, the vectors being oriented from an optimization-targeted grid point towards neighboring points adjacent to the grid point. This SEI can have a functional form that is different for each location in the CIELAB space to which the optimization-targeted grid point belongs. In a working example, the functional form differs by location in the gamut. A more specific example of the function will be described below.

Once the SEI has been defined, an optimization processing is performed by the processing of Steps S310 to S350 in FIG. 23. In Step S310, a single optimization-targeted grid point is extracted from a sample described in the aforementioned ink profile 142. In the initial routine, ink amount data described in the ink profile 142 and the calorimetric value that correspond to this ink amount data are the objects of optimization. In Step S315, from among the calorimetric values described in the ink profile 142, there are extracted calorimetric values corresponding to grid points that are present around the optimization-targeted Lab grid point and are adjacent to the grid point. The calorimetric values extracted here differ depending on the functional form of SEI, and will be described below in greater detail. Where neighboring grid points have already been optimized, calorimetric values for the optimized grid points are extracted.

In Step S320, the SEI is calculated using the aforementioned optimization-targeted grid point and neighboring grid points. The SEI variable is the position information described above. Therefore, the SEI can be calculated using the aforementioned optimization-targeted grid point and neighboring grid point position information. Because the SEI is a function whose value decreases as the arrangement of the optimization-targeted grid points is smoothed, it is possible to search for a more optimal grid point position by means of updating the position information of optimization-targeted grid point and varying the optimization-targeted grid point position. Thus, in Step S325, it is determined whether the value of SEI has become equal to or less than a certain predetermined threshold value. Thus, when the value of SEI becomes equal to or less than a certain predetermined threshold value, the grid point position is determined to have been optimized (sufficiently smoothed).

When the processing of step S325 determined that the grid point position has not been optimized, position information is updated in Step S330. Thus, using position information of optimization-targeted grid point as a variable, position information that minimizes the SEI is calculated using a quasi Newton method, common gradient method, etc., and the result is taken as new position information. Once position information has been updated, in Step S335 ink amount data corresponding to the new position information are calculated with reference to the ink profile 142. Thus, calorimetric values are calculated from updated position information, and ink amount data corresponding to these calorimetric values are calculated from the ink profile 142.

Once calorimetric values and ink amount data corresponding to updated position information have been calculated in the above-described manner, the processing that starts with Step S315 is repeated. In this repeated processing, the processing that starts with Step S315 may be repeated by associating calorimetric values updated in Step S330 and the updated position information. Alternatively, the processing that starts with Step S315 may be repeated, as shown in FIG. 22, by inputting the ink amount data to the aforementioned converter 100, calculating calorimetric values from the results obtained, and associating these calorimetric values with updated position information. During updating in Step S330, because ink amount data are calculated with reference to the ink profile 142, the property of the above-described CII and GI being low is preserved in the ink amount data. Therefore, even when printing is performed using the updated ink amount data, the properties of small difference in color appearance and inconspicuous graininess are preserved.

The rectangles indicated by broken lines in FIG. 22 show how the optimization processing is performed for the SEI of a certain functional form. The rectangle at the left side indicates the state before the optimization, and the rectangle at the right side indicates the state after the optimization. In each rectangle, the optimization-targeted grid point is shown by a black circle, and neighboring grid points are shown by white circles. In the example shown in the figure, calorimetric values of the neighboring grid points are respectively $(L^*a^*b^*)_1$, $(L^*a^*b^*)_3$, and position information thereof is respectively $(Pr, Pg, Pb)_1$, $(Pr, Pg, Pb)_3$. The calorimetric value of the optimization-targeted grid point is $(L^*a^*b^*)_2$, and position information thereof is $(Pr, Pg, Pb)_2$.

By using position information, it is possible to define vectors of mutually opposite orientations, the vectors being oriented from the optimization-targeted grid point towards neighboring points adjacent to the grid point, as are vector a and vector b shown in FIG. 22. The absolute value of the sum of the vectors is the SEI. Where the SEI is minimized in the manner described above, position information is updated to give $(Pr, Pg, Pb)_2'$. If, due to updating, the SEI is not equal to or less than a predetermined threshold value (i.e., has not been optimized), the processing is repeated. Thus, a calorimetric value $(L^*a^*b^*)_2'$ corresponding to position information $(Pr, Pg, Pb)_2'$ is calculated, and if not optimized by this calorimetric value, then re-calculated.

In the example shown in FIG. 22, ink amount data $(CMYKlclm)_2'$ corresponding to calorimetric value $(L^*a^*b^*)_2'$ is calculated from the correspondence relationship between calorimetric value $(L^*a^*b^*)_1$ and ink amount data $(CMYKlclm)_1$ and the correspondence relationship between calorimetric value $(L^*a^*b^*)_2$ and ink amount data $(CMYKlclm)_2$, with reference to the ink profile 142. It goes without saying that, interpolation is shown in a simplified form, and interpolation calculations are performed extracting four or more calorimetric values having values close to the updated calorimetric values from the ink profile 142. Once ink amount data $(CMYKlclm)_2'$ has been calculated, this value is inputted to the converter 100, and the calorimetric value thereof is calculated. The optimization processing described above is then repeated with the calorimetric value thus obtained. In other words, calculations are performed recursively.

When in Step S325 of the flow chart shown in FIG. 23 the grid point position is determined to have been optimized, in Step S340 the optimized sample data are entered to the smoothed ink profile 144. In the example shown in FIG. 22, the calorimetric value $(L*a*b*)_2'$ at the point in time the optimization is determined to have been made and the ink amount data $(CMYKlclm)_2'$ corresponding to this calorimetric value are entered to the ink profile 144.

In Step S345, a determination is made as to whether optimization has been completed for all ink amount data described in the ink profile 142. The processing that begins at Step S310 is then repeated until it is determined in Step S345 that optimization has been completed for all ink amount data. In the flowchart in FIG. 23, in Step S350, a determination is made as to whether a predetermined number of corrections have been performed. The processing that begins at Step S310 is repeated until it is determined in Step S350 that the predetermined number of corrections have been performed. Thus, the results of the optimization processing are assumed to be a true solution by means of performing a predetermined number of corrections.

It goes without saying that sufficient optimization of the arrangement of grid points over the entire gamut would be preferred, in Step S350, it may also be determined whether SEI values for all ink amounts and the average value thereof are equal to or less than a predetermined threshold value. A variety of other configurations are also possible. Thus, sufficient optimization may be assumed to have been made when the average value of SEI values is almost constant between the (n−1) correction and the n-th correction. Once grid point arrangement has been sufficiently smoothed in the manner described above, the process of smoothing for calorimetric values described in the aforementioned ink profile 144 is complete.

Figure 25:
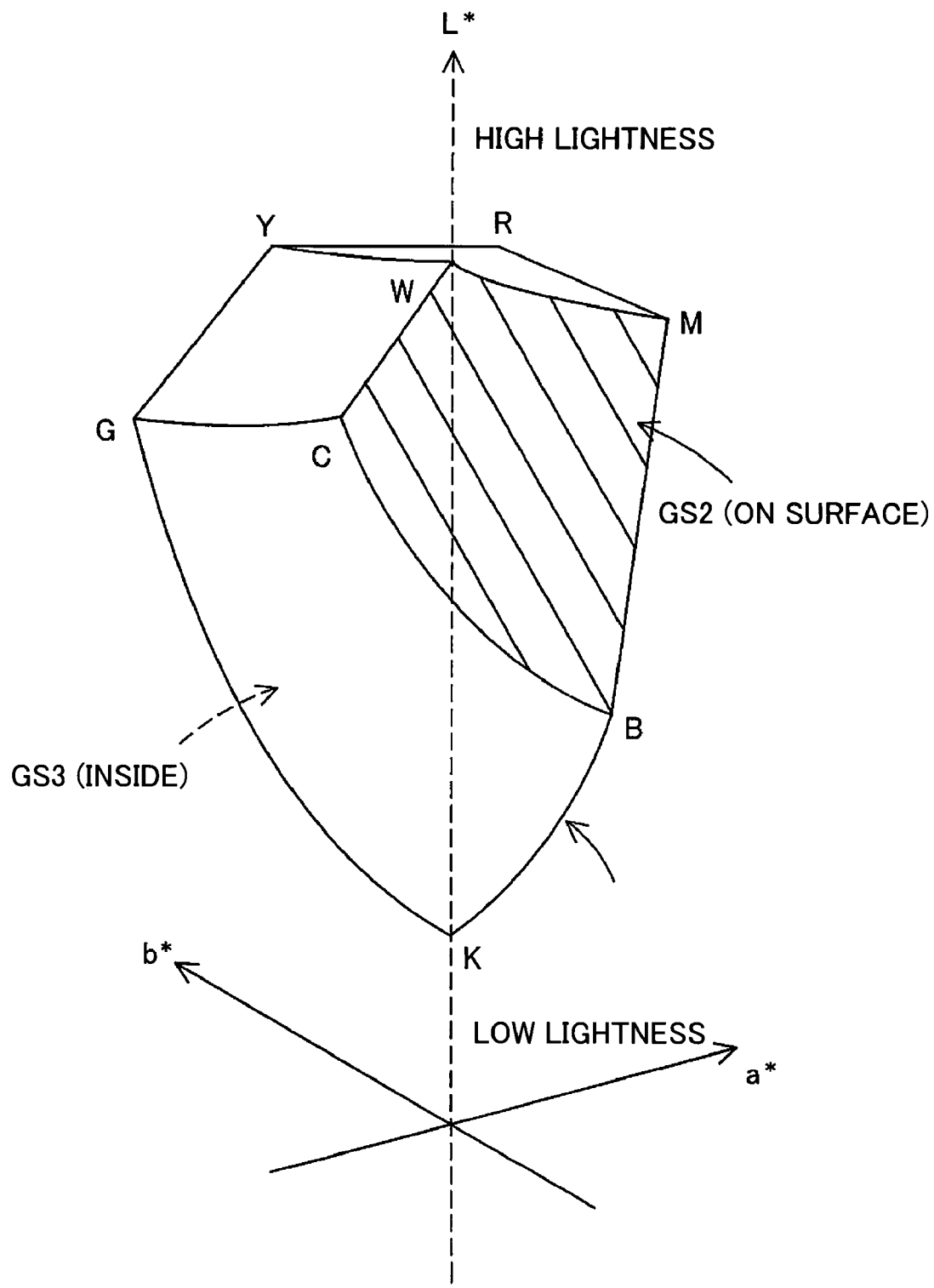
FIG. 25 is a schematic diagram illustrating a color gamut of a printer.

A specific example of optimization processing by SEI in Steps S315-S335 will be described below in greater detail. FIG. 25 is a schematic diagram of the gamut formed by calorimetric values described in the ink profile 142. As shown in the figure, the gamut has an irregular shape in the CIELAB space. While this gamut is of irregular shape, the gamut boundaries can be easily associated with the boundaries of a cube formed by the position information (Pr, Pg, Pb) described above. Thus, the boundaries of the cube are the twelve ridgelines and 6 exterior faces defining the exterior boundaries of the cube, and in the gamut shown in FIG. 25, the twelve ridgelines and six exterior faces constitute the boundaries thereof. More specifically, when only the Pb component is taken as a variable larger than 0 along the Pb axis ridgelines from position information (0,0,0) and the Pr and Pg components are held constant at minimum values, the grid point corresponding to this position information will be located on the ridgelines shown as $G_{s1}$ in FIG. 25.

Likewise, colors of the apices on the uppermost surface in the cube formed by position information are BWCM respectively. Position information on this surface can be represented by fixing only the Pb component to a maximum value, and varying the other components at random. Color on this plane is on the surface denoted by $G_{s2}$ in the gamut shown in FIG. 25. Therefore, where even any one of the aforementioned components of position information is at maximum value or minimum value, the color thereof can be said to be located on a gamut boundary. When performing optimization for such a color on a gamut boundary, freedom to move within the CIELAB space would create the risk that a sufficiently large size of the gamut may not be ensured. Therefore, in the present embodiment, in order to preserve the gamut size, an SEI is acquired whose functional form differs between the twelve ridgelines and six exterior planes that form the gamut boundaries, and the gamut interior.

Figure 26:
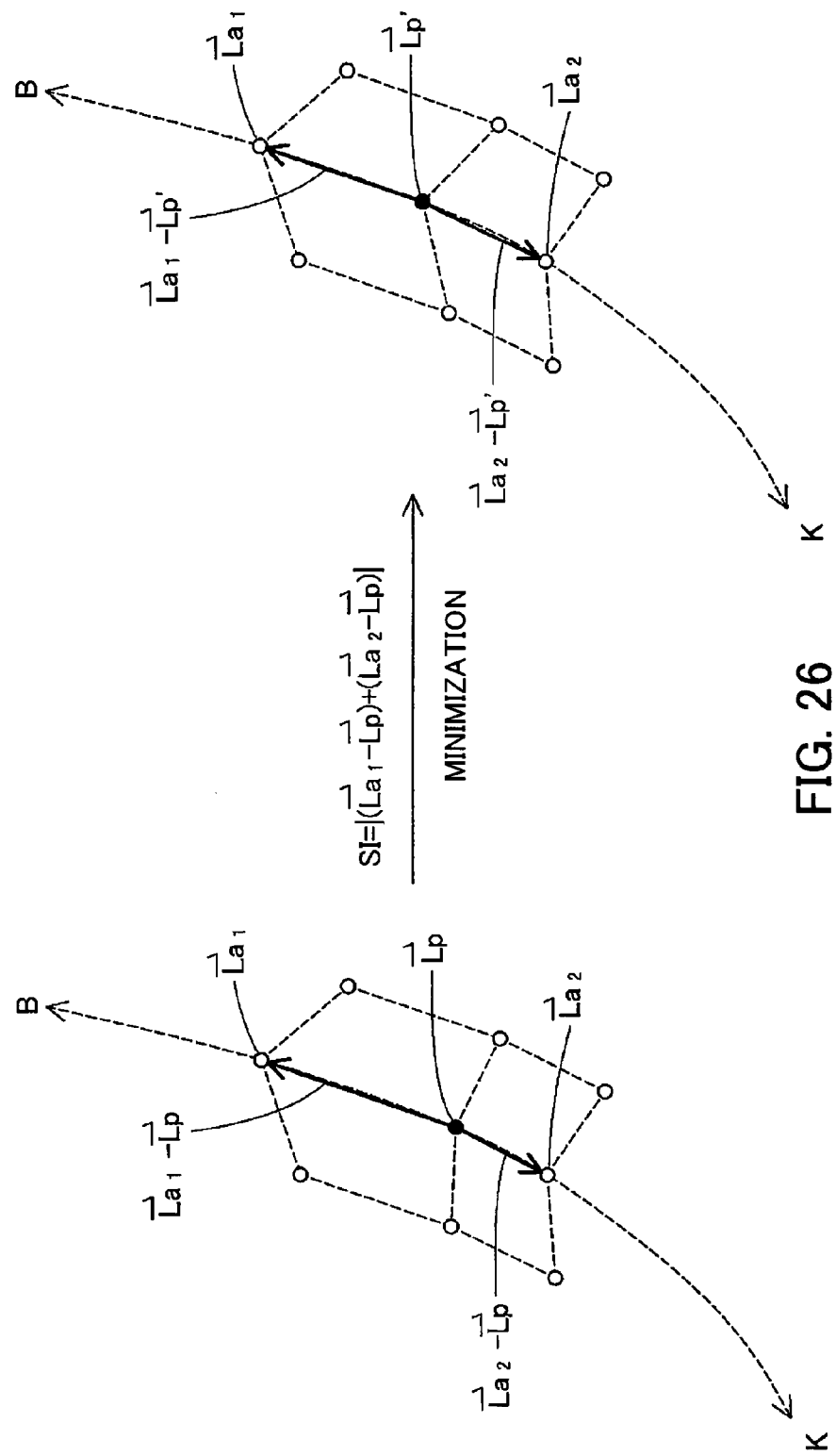
FIG. 26 is an explanatory drawing of a SEI that optimizes grid points on a ridge line.

FIG. 26 illustrates an SEI ($SI_1$) for optimizing grid point on an ridgeline formed at a gamut boundary in the CIELAB space. In the figure, the curve represented by the broken line indicates the ridgeline formed at a gamut boundary. The optimization-targeted grid point is represented by a black circle, and surrounding grid points are represented by white circles. In order to preserve the gamut size, it is necessary for the optimization-targeted grid point represented by a black circle to be present on the ridgeline represented by the broken line. Accordingly, in this embodiment, in Step S310, when grid points present on the ridgeline represented by the broken line, as shown in FIG. 26, are extracted as optimization targets, in Step S315, the grid points are extracted that are adjacent to the optimization-targeted grid point and present on ridgelines represented by broken lines.

In the figure, the optimization-targeted grid point is shown by vector $L_p$, and grid points extracted as neighboring grid points are shown by vector $L_{a1}$ and vector $L_{a2}$. Here, vector $L_p$ is calculated by (21) below, with the aforementioned position information (Pr, Pg, Pb) represented as the variable.
(Equation (21))

Here, f in the equation is a function for finding the vector $L_p$ from position information (Pr, Pg, Pb), function f being an equation used when calculating a calorimetric value corresponding to position information (Pr, Pg, Pb). Thus, position information indicating an optimization-targeted grid point is the variable, and position information for neighboring grid points is fixed. Since calorimetric values for grid points corresponding to the fixed position information are known, a calorimetric value corresponding to the variable position information can be interpolated from the relative relationship of the fixed position information and the variable position information. f is a function representing this relationship.

Using this vector $L_p$ and also vector $L_{a1}$ and vector $L_{a2}$, SEI is calculated by Equation (22) shown below.
(Equation (22))

Thus, the value of the function is smallest when neighboring grid points to either side of the optimization-targeted grid point are at equal distances therefrom and face in directly opposite directions, and the value is largest when there is a significant difference between these distances and orientation deviates from directly opposite.

Where grid points are arranged uniformly, grid point arrangement tends to be smooth. Therefore, by minimizing $SI_1$ in Equation (22) it is possible to acquire a vector $L'_p$ in which the grid point position of vector $L_p$ has been optimized, as shown at the right side in FIG. 26. While vector $L_p$, vector $L_{a1}$, and vector $L_{a2}$ are represented by position information (Pr, Pg, Pb), in $SI_1$, position information giving vector $L_{a1}$ and vector $L_{a2}$ is fixed, whereas in the position information (Pr, Pg, Pb) giving vector $L_p$, only any one component is variable, with the other two being held constant at minimum value or maximum value. For example, the color on the ridgeline represented by the broken line shown in FIG. 26 is between B and K, and the position information Pr, Pg specifying the grid point that corresponds to this color are at their minimum values, while position information Pb is any value. Accordingly, in order to move a grid point in the CIELAB space on this ridgeline, Pb may be varied, while position information Pr, Pg are held constant at their minimum values.

The same is true for the other ridgelines of the gamut boundaries: where the optimization-targeted grid point is present on a gamut boundary on the ridgeline from K to R, Pr is variable, while position information Pg, Pb are held constant at their minimum values. Where the optimization-targeted grid point is present on a gamut boundary on the ridgeline from K to G, Pg is variable, while position information Pr, Pb are held constant at their minimum values. Where the optimization-targeted grid point is present on a gamut boundary on the ridgeline from W to C, Pr is variable, while position information Pg, Pb are held constant at their maximum values; where the optimization-targeted grid point is present on a gamut boundary on the ridgeline from W to M, Pg is variable, while position information Pr, Pb are held constant at their maximum values; and where the optimization-targeted grid point is present on a gamut boundary on the ridgeline from W to Y, Pb is variable, while position information Pr, Pg are held constant at their maximum values.

Furthermore, where the optimization-targeted grid point is present on a gamut boundary on the ridgeline from M to R, Pb is variable, while position information Pr is held constant at maximum value and Pg is held constant at minimum value; where the optimization-targeted grid point is present on a gamut boundary on the ridgeline from M to B, Pr is variable, while position information Pb is held constant at maximum value and Pg is held constant at minimum value; where the optimization-targeted grid point is present on a gamut boundary on the ridgeline from C to G, Pb is variable, while position information Pg is held constant at maximum value and Pr is held constant at minimum value; and where the optimization-targeted grid point is present on a gamut boundary on the ridgeline from C to B, Pg is variable, while position information Pb is held constant at maximum value and Pr is held constant at minimum value.

Where the optimization-targeted grid point is present on a gamut boundary on the ridgeline from Y to R, Pg is variable, while position information Pr is held constant at maximum value and Pb is held constant at minimum value; and where the optimization-targeted grid point is present on a gamut boundary on the ridgeline from Y to G, Pr is variable, while position information Pg is held constant at maximum value and Pb is held constant at minimum value. Where SEI is minimized by appropriately changing the position information, which varies depending on the position of the optimization-targeted grid point, position information that minimizes $SI_1$ at this point in time can be calculated, and by repeating this processing, it is possible to acquire a vector $L'_p$ that optimizes grid point position.

Figure 27:
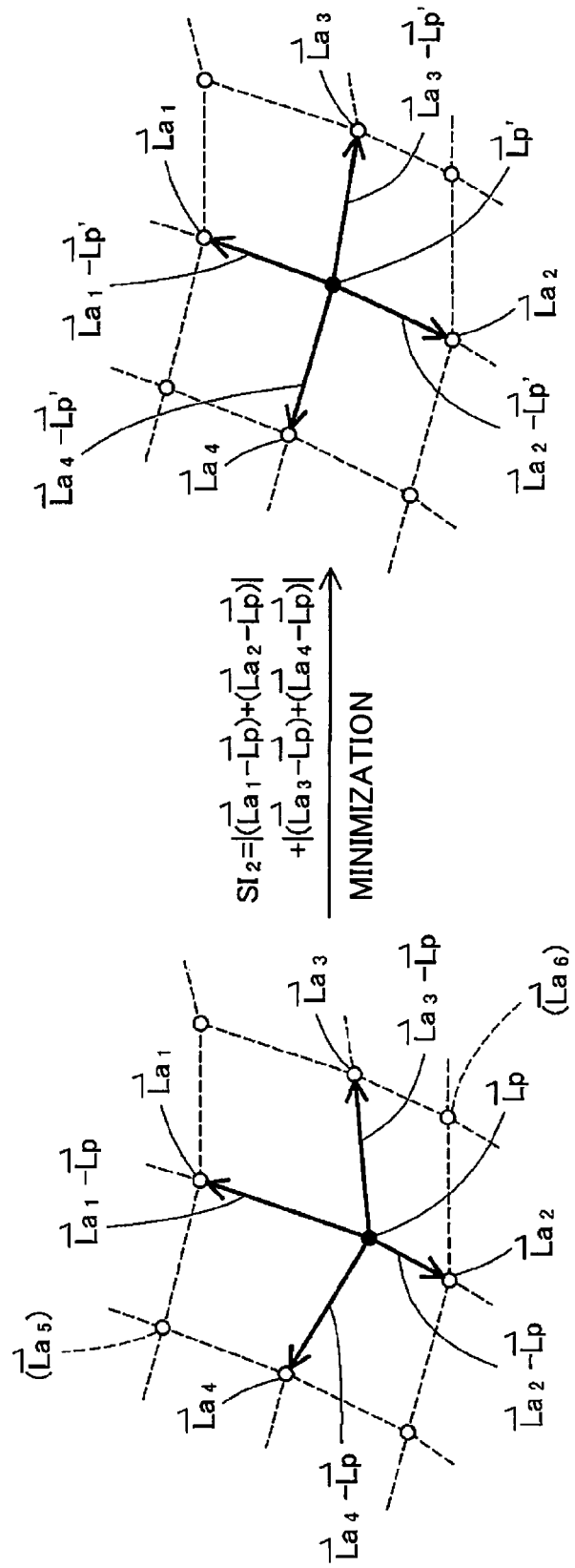
FIG. 27 is an explanatory drawing of a SEI that optimizes grid points on an outer surface.

FIG. 27 is an explanatory drawing illustrating an SEI ($SI_1$) for optimizing a grid point on an exterior face formed at a boundary of the gamut in the CIELAB space. In the figure, broken lines are straight lines connecting the grid points. Since these grid points are present on an exterior face of a gamut boundary, the other grid points are present only on the rearward or forward side of paper surface. The optimization-targeted grid point is indicated by a black circle, and surrounding grid points are indicated by white circles. In order to preserve the gamut size, the optimization-targeted grid point is not allowed to move significantly in the perpendicular direction relative to the exterior face in which the white circles and black circle are present. Accordingly, in the present embodiment, when a grid point that is represented by the black circle in FIG. 27 that is present on an exterior face of a gamut boundary is extracted as an object for optimization in Step S310, in Step S315, four grid points neighboring the optimization-targeted grid point at four sides and located on the exterior face of the gamut boundary are extracted.

In the figure, the optimization-targeted grid point is denoted by vector $L_p$, and grid points extracted as neighboring grid points are denoted by vector $L_{a1}$ to vector $L_{a4}$. Here, vector $L_p$ is calculated by Equation (21) above, with the aforementioned position information (Pr, Pg, Pb) represented as the variable. Using vector $L_p$ and vector $L_{a1}$ to vector $L_{a4}$, an SEI that will optimize the grid point located on the exterior face of the gamut boundary can be represented by Equation (23) below.

(Equation (23))

Thus, the value of SEI decreases when distances from the optimization-targeted grid point to vectors facing in mutually opposite directions are equal and vector orientations become close to directly opposite orientations.

Grid point arrangement tends to be smooth when lines connecting neighboring grid points (lines passing through grid points denoted by vector $L_{a1}$–vector $L_p$–vector $L_{a4}$ in FIG. 27) approximate straight lines and when grid points are arranged uniformly. Therefore, by minimizing $SI_2$ in Equation (23) it is possible to acquire a vector $L'_p$ in which the grid point position of vector $L_p$ has been optimized, as shown at the right side in FIG. 27.

While vector $L_p$ and vector $L_{a1}$ to vector $L_{a4}$ are represented by position information (Pr, Pg, Pb), only any two position information components are variable, with the remaining one being held constant at minimum value or maximum value, in $SI_2$ position information (Pr, Pg, Pb) giving vector $L_p$. For example, the position information Pb for a grid point corresponding to the color on the WMBC exterior face on the gamut boundary represented by hatching in FIG. 25 is at maximum value, while position information Pr, Pg are any values. Accordingly, in order to move a grid point in the CIELAB space over the WMBC exterior face, position information Pb may be held constant at maximum value, while varying Pr, Pg.

The same is true for other exterior faces of gamut boundaries. In order to move a grid point in the CIELAB space over the MRKB exterior face of a gamut boundary, position information Pg may be held constant at minimum value, while varying Pr, Pb. In order to move a grid point over the RYGK exterior face of a gamut boundary, position information Pb may be held constant at minimum value, while varying Pr, Pg.

Further, in order to move a grid point over the YWCG exterior face of a gamut boundary, position information Pg may be held constant at maximum value, while varying Pr, Pb. In order to move a grid point over the WYRM exterior face of a gamut boundary, position information Pr may be held constant at maximum value, while varying Pg, Pb. In order to move a grid point over the CGKB exterior face of a gamut boundary, position information Pr may be held constant at minimum value, while varying Pg, Pb. In this way, by minimizing $SI_2$ by selecting position information that varies depending on the position of the optimization-targeted grid point, position information that minimizes SEI at that point in time can be calculated, and by repeating this processing, a vector $L'_p$ that optimizes this grid point position can be acquired.

Figure 28:
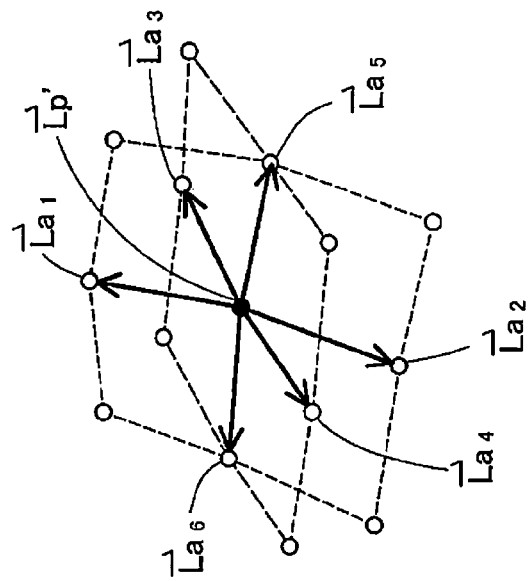
FIG. 28 is an explanatory drawing of a SEI that optimizes grid points in a color gamut.
Figure 28:
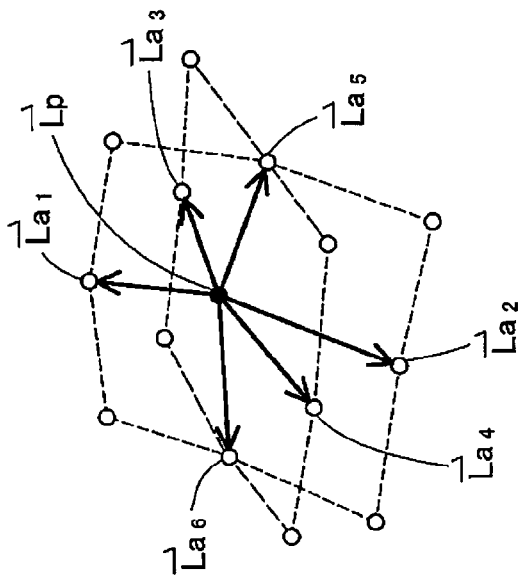

FIG. 28 is an explanatory drawing illustrating an SEI ($SI_3$) for optimizing a grid point located in the interior of the CIELAB space, but not at a gamut boundary. In the figure, broken lines represent straight lines interconnecting a plurality of grid points present in a plane formed by cutting the gamut in two directions. Further, the optimization-targeted grid point is represented by a black circle, and surrounding grid points are represented by white circles. In this embodiment, grid points in the gamut interior can be moved freely without imposing any condition for preserving the gamut size. Accordingly, in this embodiment, when a grid point present in the gamut interior and represented by the black circle in FIG. 28 is extracted as an object for optimization in Step S310, there are extracted in Step S315 six grid points that neighbor the optimization-targeted grid point at six sides thereof.

In the figure, the optimization-targeted grid point is denoted as vector $L_p$, and grid points extracted as neighboring grid points are denoted as vector $L_{a1}$ to vector $L_{a6}$. Here, vector $L_p$ is calculated by Equation (20) above, with the aforementioned position information (Pr, Pg, Pb) represented as the variable. Using vector $L_p$ and vector Lai to vector $L_{a6}$, an SEI that will optimize the grid point located in the gamut interior is represented by Equation (24) below.
(Equation (24))

Thus, the value of SEI decreases when distances from the optimization-targeted grid point to vectors facing in mutually opposite directions are equal and when vector orientations are close to directly opposite orientations.

Grid point arrangement tends to be smooth when lines connecting neighboring grid points (lines passing through grid points denoted by vector $L_{a1}$–vector $L_p$–vector $L_{a2}$ in FIG. 28) approximate straight lines and when grid points are arranged uniformly. Therefore, by minimizing $SI_3$ in Equation (24) it is possible to acquire a vector $L'_p$ in which the grid point position of vector $L_p$ has been optimized, as shown at the right side in FIG. 28.

While vector $L_p$ and vector $L_{a1}$ to vector $L_{a6}$ are represented by position information (Pr, Pg, Pb), in $SI_3$ position, all position information components (Pr, Pg, Pb) giving vector $L_p$ are variable. In this way, by minimizing $SI_3$ by varying the position information, position information that minimizes SEI at that point in time can be calculated, and by repeating this process, a vector $L'_p$ that optimizes this grid point position can be acquired.

Once the smoothed ink profile 144 has been produced by ink the profile generator 140 by means of the above-described processing, a uniformly spaced lookup table is created to facilitate the interpolation processing when creating the aforementioned printer lookup table 180. Thus, in the smoothed ink profile 144, although Lab grid point arrangement has been smoothed, the grid points are not necessarily spaced uniformly. Where spacing among grid points is not uniform, it becomes difficult to search for a grid point for interpolating any interpolated point during creation of the printer lookup table 180. The interpolation calculations by themselves also become complex.

Accordingly, in this embodiment, grid point spacing is rendered uniform by performing interpolation calculations for the smoothed ink profile 144. This processing is performed by the interpolation calculations similar to non-uniform interpolation shown in FIGS. 7A to 7C.

Once a uniformly spaced profile defining correspondence relationships for uniformly spaced Lab grid points and ink amounts has been created in the above-described manner, in Step S50 shown in FIG. 3, a processing similar to that in the first embodiment is performed. Thus, a gamut mapping processor 160 (FIG. 2) performs gamut mapping on the basis of the aforementioned uniformly spaced profile and the sRGB profile 162 and produces the profiles in profile data 15b, 15c. By installing profiles in profile data 15b, 15c on the printer, it becomes possible to produce a printout having high color constancy (that is, a small change in color appearance under different viewing conditions). Further, with the smoothing described above, interpolation can be performed with a high degree of accuracy. Therefore, a printout of high image quality free from tone jumps can be obtained.

D7. Variant Example 7

It is not mandatory that the aforementioned color difference evaluation index CDI consist of CII and MI, or the image quality evaluation index IQI consist of GI and Tink. Thus, any one of CII and MI or both these indices can be selected as the color difference evaluation index CDI and any other indices representing color difference between a sample color and a comparative may be employed. Likewise, a variety of other indices capable of evaluating image quality can be used as the IQI. For example, an index for evaluating a gamut size, or an index for evaluating a degree of smoothness of grid point arrangement can be used.

As a more specific example of an index for evaluating a gamut size, an index indicating chroma saturation $((a^{*2}+b^{*2})^{1/2})$ can be used. Thus, where calorimetric values are calculated from the aforementioned sample ink amount data, the aforementioned chroma saturation can be calculated; by multiplying this chroma saturation by a coefficient having a minus sign "$-k_i$", it is possible to define an evaluation index that gives a smaller value of evaluation index $EI_1$ as the chroma saturation increases. Therefore, by selecting the sample that gives the lowest possible value of evaluation index $EI_1$, the sample with the highest possible chroma saturation (largest possible gamut) can be selected.

As a more specific example of an index SI for evaluating a degree of smoothness of grid point arrangement, a configuration can be employed in which a sample is selected using an evaluation index that excludes index SI for evaluating a degree of smoothness and then an evaluation index including the SI is re-calculated. This embodiment can be realized through a configuration substantially identical to that in the first embodiment shown in FIG. 1, but prior to evaluating the SI, an evaluation index $EI_1$ of a form that does not include the SI in the second term of Equation (1) is calculated, and an initial sample set is selected. The initial sample set is then smoothed by means of a Gaussian function, the distance between the initial sample targeted for smoothing and the smoothed sample is calculated for each cell, and the result is taken as the SI.

Figure 29:
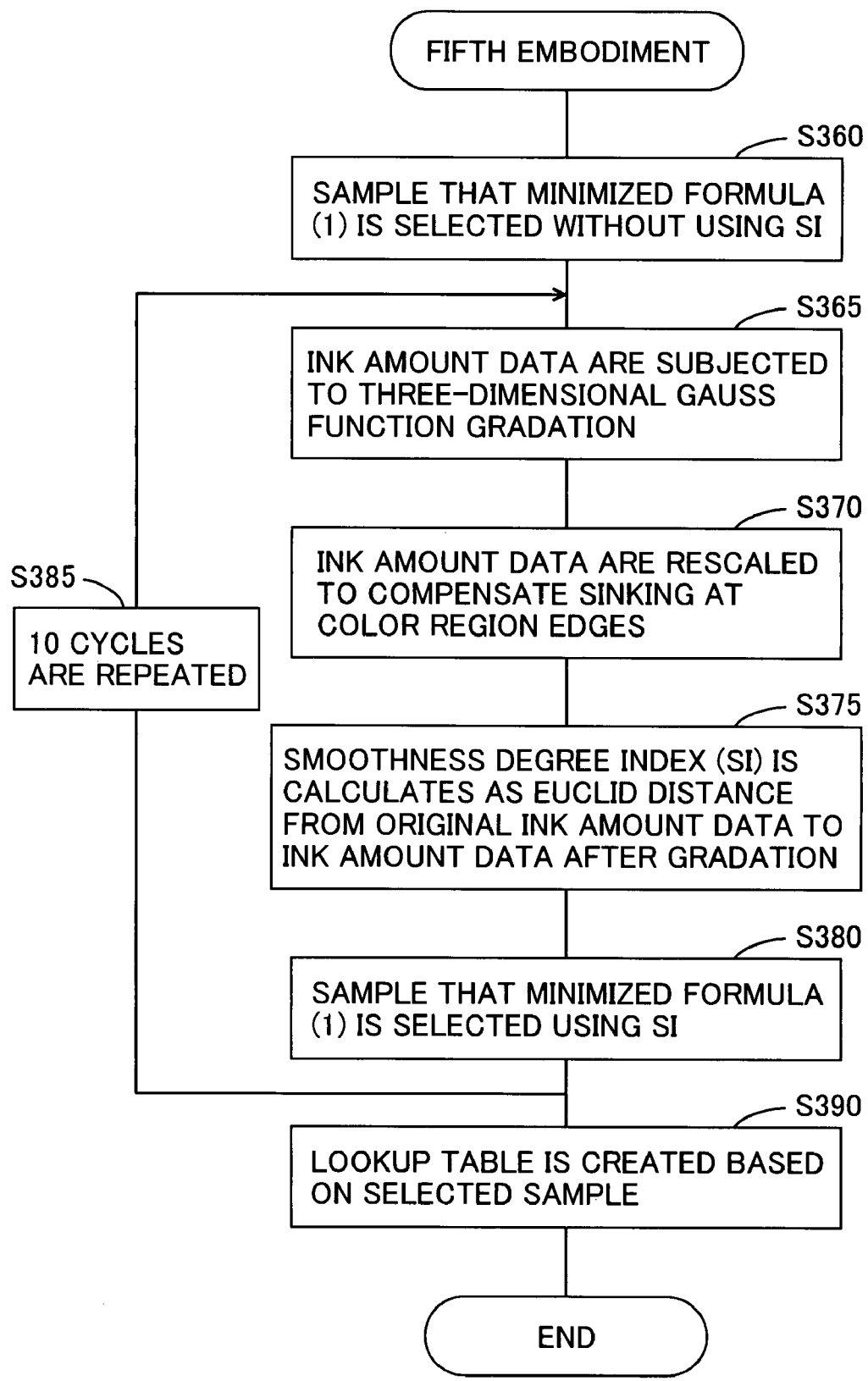
FIG. 29 is a flowchart illustrating the processing procedure in Seventh Modified Example.

More specifically, the processing is performed following the flowchart shown in FIG. 29. Thus, the evaluation index generator 120 calculates an evaluation index including no SI by a processing similar to that in the first embodiment, and in step S360, the sample selector 130 selects a sample that minimizes Equation (1), and the selected sample is taken as an initial sample set. The initial sample sets are taken as the objects of initial blurring in the repeated processing of Step S365 and subsequent steps. Thus, in the repeated processing, a blurring processing is performed by means of a three-dimensional Gaussian function in the CIELAB space.

Thus, a three-dimensional Gaussian function that is attenuated with the distance in the CIELAB space is defined as weight coefficients to sample ink amounts, and values of weight coefficients are calculated by means of the Gaussian function from the distances between the sample that is the object of blurring processing and other samples. The products of ink amounts of other samples and weight coefficients are summed up and normalized by the sum total of all samples for the ink amount of the sample that is the object of blurring processing. This smoothes the change in the ink amount of the sample. In step S370, scaling processing is performed to prevent the ink amounts from falling to "0" outside the gamut. Thus, each ink amount data is divided by the maximum value of ink amount data of each color. This scaling processing is performed to prevent the reduction in ink amount within the gamut in repeated smoothing processing.

In step S375, according to Equation (25) a distance between ink amount grid points prior to blurring and ink amount grid points after the blurring is calculated or each ink amount data, and the result is taken as SI.

(Equation (25))
Here, an ink amount grid point is a grid point in six-dimensional ink amount space formed by ink components. In Equation (25), "ink" is a code identifying ink color, Aink denotes ink amount data prior to blurring processing, and Ablurred denotes ink amount data after the blurring processing.

The SI indicates variation of ink amount between that before the blurring and that after the blurring, and by comparing the two for each sample, it is possible to evaluate the degree to which the ink amount of the original sample is close to the ink amount after the blurring. Here, because it can be considered that the smaller is SI the smaller is the difference in ink amount, a sample with a small SI can be considered to have a small and smooth spread in ink amount. Accordingly, in step S380, the aforementioned CII, GI and SI are calculated for each of the samples and then the evaluation coefficient is calculated by Equation (1) with the evaluation index calculator 120. By such a process, it is possible to select a sample ink amount data that has small values for CII, GI, and SI in each cell.

The aforementioned Steps S555 to S570 are repeated the predetermined number of times as shown in Step S385. In this repeated processing, ink amount data selected by Equation (1) are subjected to blurring processing by means of the three-dimensional Gaussian function. Sample selector 130 then selects for each cell the sample having the smallest evaluation index on the basis of Equation (1) calculated at the last stage of the aforementioned repeated processing and takes the selected sample as a smoothed. On the basis of samples so selected, in step 390, the profile generator 140 calculates the ink profile 142, and the gamut mapping processor 160 uses this ink profile 142 and the sRGB profile 162, which has been prepared in advance, to produce profiles in the profile data 15b, 15c. With this variant example, smoothed profile can be produced without performing recursive calculations in the profile generator 140.

D8. Variant Example 8

Figure 30:
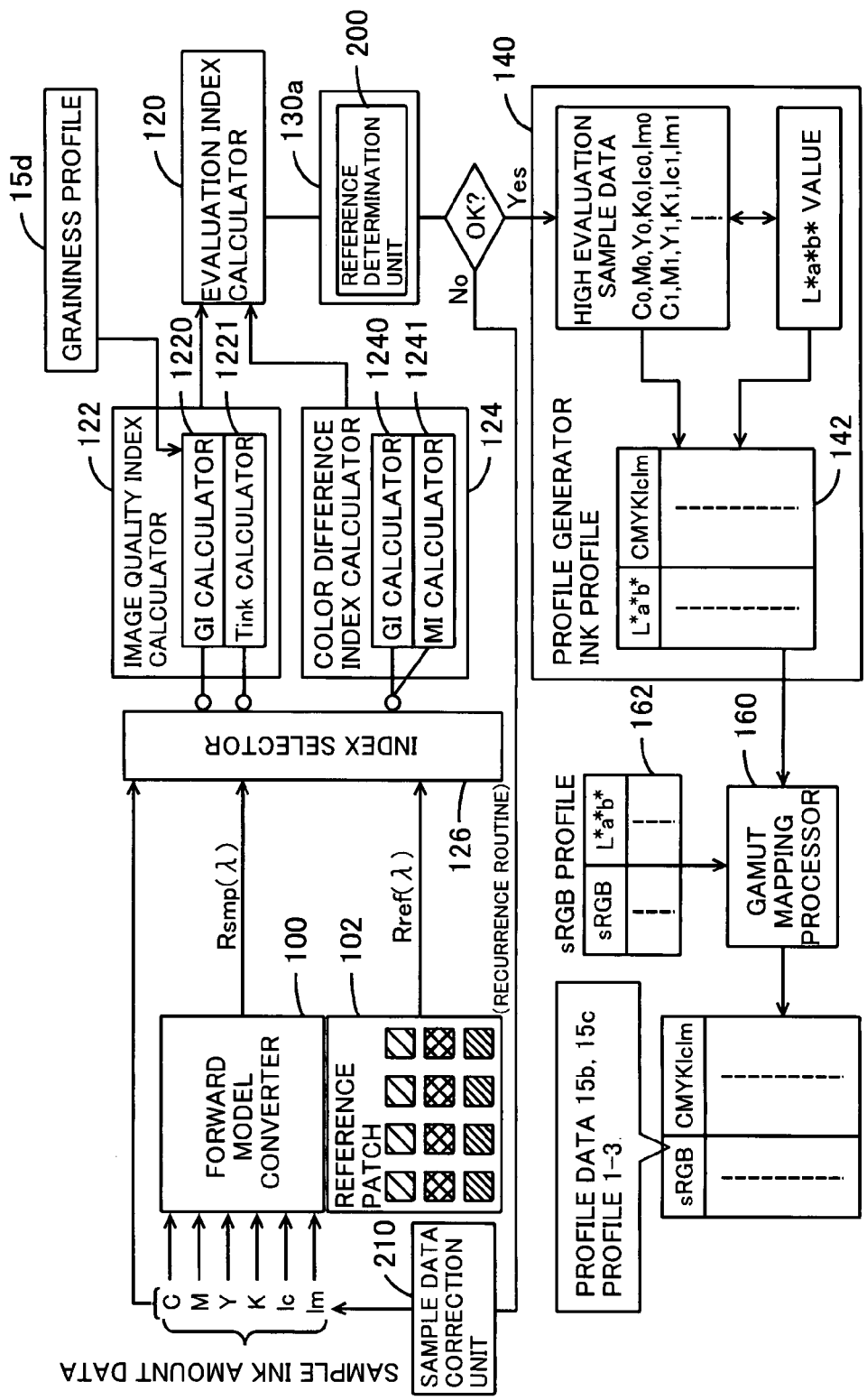
FIG. 30 is a block diagram illustrating a system configuration of a variant example of the present invention.

In the above-described embodiment, the CIELAB space is divided into a plurality of cells, and the most highly rated sample in each cell is selected. However, the sample selection method is not limited to this particular method. For example, a configuration in which optimal sample ink amount data are selected by means of recursive calculations may be also used. FIG. 30 is a block diagram showing system configuration in such variant example. The major differences between this system and the system of the first embodiment shown in FIG. 2 are that the sample selector 130a includes a criteria determination unit 200 and that a sample data modifier 210 has been added. In this system configuration, when a certain sample does not meet predetermined evaluation criteria, the sample data modifier 210 modifies the sample ink color data and again performs the calculation of the evaluation index $EI_1$ for the modified sample ink color data. A color conversion profile is then produced using samples that meet the evaluation criteria.

Figure 31:
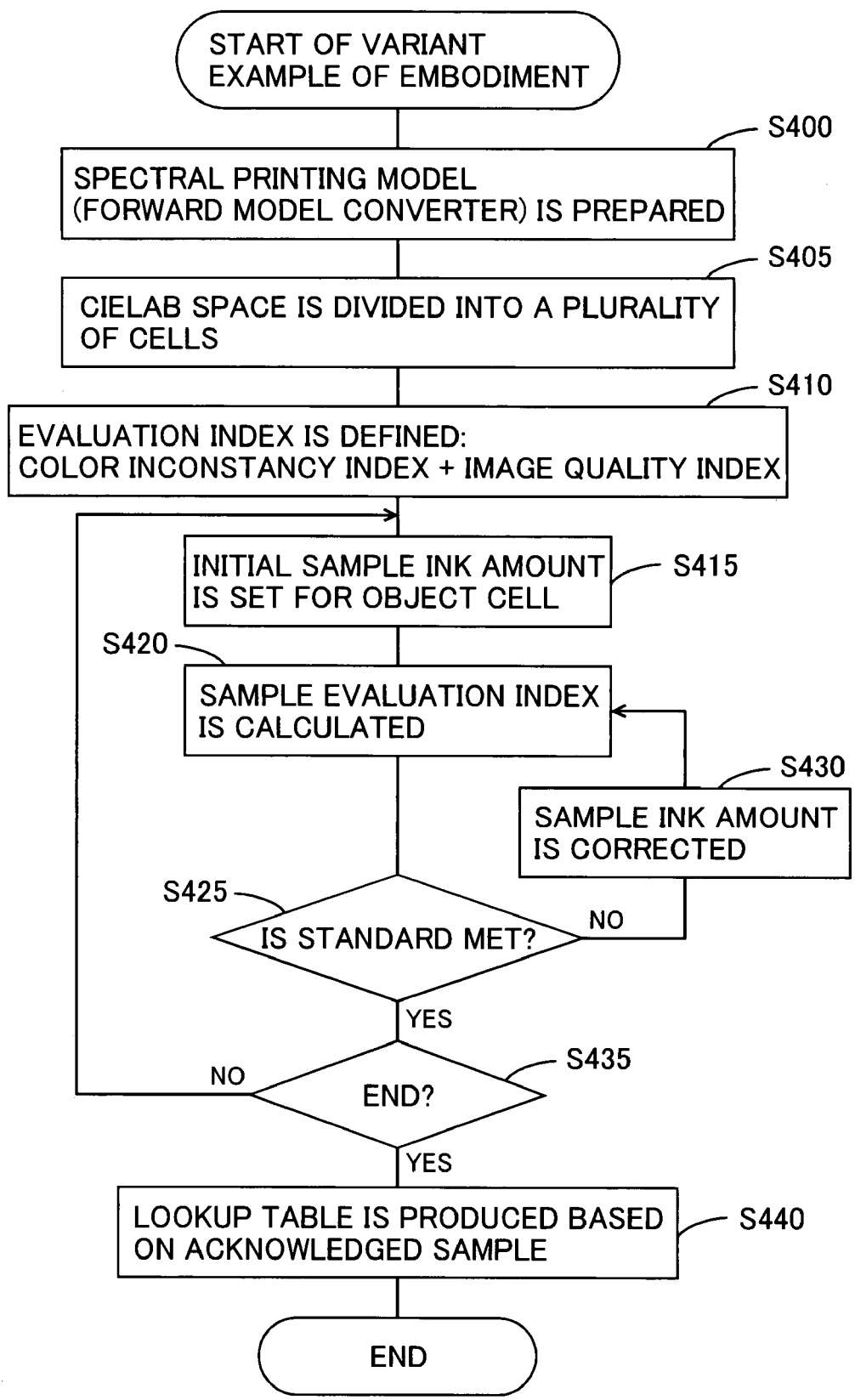
FIG. 31 is a flowchart illustrating the processing procedure of a variant example of the present invention.

FIG. 31 is a flowchart illustrating processing flow in this variant example. In Step S400, a spectral printing model is created. This Step S400 is the same as Step S10 in FIG. 3. In Step S405, the CIELAB color space is divided into a plurality of cells. Here, the same 16×16×16 cell division as used in Step S16 in the first embodiment can be employed.

In Step S410, the index selector 126 selects an index targeted for calculation, and the evaluation index calculator 120 sets an evaluation index $EI_1$ for determining quality of samples.

Steps S415 to S430 are a recursive routine for selecting one representative sample for each cell. In Step S415, one cell in the CIELAB space is selected as the object for processing (object cell), and initial sample ink amount data are set for the object cell. For this initial sample ink amount data, the calorimetric value (L*a*b* value) of the sample color printed out in response to the ink amount data is present within in the object cell. The calorimetric value of the sample color is calculated under a first viewing condition (for example, illuminant D50 and CIE 1931 2° Standard Observer)

When the calorimetric value of the initial sample ink amount data, which has been set, is not within the object cell, the initial sample ink amount data is modified until the calorimetric value located within the object cell is obtained.

For some cells, in some instances, there may be no ink amount data that gives a calorimetric value within the cell. For example, the color of a cell having high lightness or low lightness and high chroma saturation may not be reproducible. In such a case, the cell is not considered as an object for processing, so as to be excluded from subsequent processing.

In Step S420, the evaluation index generator 120 calculates evaluation index $EI_1$ for the initial sample ink amount data. In Step S420, criteria determination unit 200 determines whether the evaluation index $EI_1$ meets predetermined evaluation criteria. Evaluation criteria may be given by the following Equation (26), for example.
(Equation (26))
Here, δ is the upper permissible limit for evaluation index $EI_1$.

Where Equation (26) is used, criteria is determined to be met when the evaluation index $EI_1$ is equal to or lower than the upper permissible limit δ. Alternatively, rather than using a single evaluation index $EI_1$, a plurality of evaluation indices may be calculated for a single set of sample ink amount data, and the sample ink amount data may be determined to meet the evaluation criteria when all the evaluation indices meet their respective evaluation criteria.

When the initial sample ink amount data do not meet the evaluation criteria, in Step S430, the sample data modifier 210 modifies the initial sample ink amount data. It is preferred that several following restrictive conditions be imposed with respect to the modified sample ink amount data.

(Restrictive condition 1): the calorimetric values given by the modified sample ink amount data shall be within the object cell.

(Restrictive condition 2): the ink amounts represented by the modified sample ink amount data shall meet the ink duty limit.

Restrictive condition 1 is a condition necessary to find a representative sample for an object cell. Restrictive condition 2 ensures that the modified sample ink amount data represent an ink amount that can be used in actual printing. The ink duty limit refers to an amount of ink that can be ejected onto a printing medium, per unit surface area thereof, and is set in advance for each type of printing medium, with consideration for ink bleed. A typical ink duty limit includes a maximum value of ink amount for each ink and a maximum value of total ink amount for all inks. Additional restrictive conditions besides the aforementioned Restrictive conditions 1, 2 may be also imposed.

Where the sample ink amount data are thus modified, the above-described processing of Steps S420, S425 is again executed using the modified sample ink amount data. In this way, the processing of Steps S420 to S430 are executed recursively, and the sample meeting the evaluation criteria is selected as the representative sample for the object cell. It is conceivable that a sample meeting the evaluation criteria may be impossible to obtain even when the recursive processing is performed a predetermined number of times for a certain object cell. In such a case, from among the plurality of samples that have heretofore been examined in relation to the object cell, the sample that comes closest to meeting the evaluation criteria (sample with the best evaluation index) may be selected as the representative sample. Alternatively, no representative sample may be selected for the object cell.

In Step S435, it is determined whether the processing has been completed for all the cells, and if not completed, the routine returns to Step S415, whereupon processing for the next cell is started. When processing for all the cells has been completed in this way, in Step S440, the selected representative samples are used to create the smoothed ink profile 144 and profiles in the profile data 15b, 15c. The processing of Step S440 is the same as that of Steps S40 to S50 in FIG. 3. It goes without saying that the smoothing process described hereinabove may be performed as well.

Thus, in Variant Example 8, the color space (in the preceding example, the CIELAB color space) of predetermined calorimetric values is divided into a plurality of cells, a representative sample that meets predetermined evaluation criteria is found recursively for each cell, and the representative samples are used to create profiles. Accordingly, the number of cells that do not contain even one sample can be reduced in comparison to the first embodiment. As a result, it is possible to obtain profile data 15b, 15c having a wider gamut. It is also possible to obtain profile data 15b, 15c that are superior in terms of color reproduction characteristics.

D9. Variant Example 9:

The smoothing process described hereinabove is merely exemplary, and provided that a profile capable of color conversion with a high degree of accuracy can be produced by the smoothing process, various other configurations may be also employed. With regard to the aforementioned SEI, a function that gives a larger value with a lower degree of smoothness of grid point arrangement in the CIELAB space may be employed, or any of various other functions besides that described above can be used. For example, with regard to $SI_2$ and $SI_3$, when the grid points are assumed to form a cubic grid, only grid points with orthogonal vectors have been extracted as grid points surrounding the object for optimization, but this method of selection is not mandatory. For example, the SEI may be also obtained by including grid points such as located at diagonal positions when the grid points form a cubic grid, such as vector $L_{a5}$ and vector $L_{a6}$ in FIG. 27. Grid points located at diagonal positions are also located at diagonal positions in grid points formed by position information, and in particular the gray axis connecting KW of the cube formed by the position information described hereinabove corresponds to a diagonal direction of the grid points. Therefore, by improving the degree of smoothness of arrangement for grid points located at diagonal positions as well, it is possible to prevent the occurrence of tone jump during monochrome output.

D10: Variant Example 10

In the embodiment described above, the sum of vectors with mutually opposite orientations is taken so as to decrease the value of SEI in grid point arrangement with a high degree of smoothness, but it goes without saying that other configurations may be also employed. For example, a function for evaluating whether relative positional relationships among grid points are similar may be used. Specifically, in FIG. 27, where the differences of vector $L_{a5}$–vector $L_{a4}$ and vector $L_{a1}$–vector $L_p$ are taken, a differential vector for the two vectors, i.e. (vector $L_{a5}$–vector $L_{a4}$)–(vector $L_{a1}$–vector $L_p$) is obtained, and it may be said that the smaller the value of the differential vector, the more similar are positional relationships among grid points. Therefore, it is possible to acquire an SEI for evaluating the degree of smoothness of the arrangement by finding a sum of differences between vector $L_{a1}$–zector $L_p$ and neighboring vectors among grids.

D11: Variant Example 11:

In the SEI described hereinabove, differences are taken among vectors with mutually opposite orientations centered on an optimization-targeted grid point, and the differences are added together. Thus, a state of uniform distribution of all grid points in the CIELAB space was considered ideal. However, where grid points formed by calorimetric values described in the ink profile 142 are initially nonuniform, or where the grid point spacing in the CIELAB space is intended to be produced nonuniform, the SEI may be changed. As an example that is optimal when nonuniform grid points are made, a treatment in which the SEI is provided with weighting factors, as in Equation (27), can be employed.

(Equation (27))

Here, $W_1$ and $W_2$ are weighting factors.

Where $W_1 > W_2$ in Equation (17), the value of $SI_1$ can be decreased in a state in which the magnitude of the difference of vector $L_{a1}$–vector $L_p$ is smaller than that of vector $L_{a2}$–vector $L_p$, and a state in which the optimization-targeted grid point is closer to one of the grid points can be taken as an optimal state. Weighting factors of various forms can be employed; where non-uniform spacing of grid point arrangement is to be made, factors can be determined using, for example, Equation (28).

(Equation (28))

Here, $D_1$ and $D_2$ are distances between grid points specified by position information in the space formed by the position information. Thus, $D_1$ is the distance from the grid point in position information that gives vector $L_{a1}$ to the grid point in position information that gives vector $L_p$, and $D_2$ is the distance from the grid point in position information that gives vector $L_{a2}$ to the grid point in position information that gives vector $L_p$. It goes without saying that Equation (27) is merely exemplary. By designing a SEI provided with another weight, it is possible to control grid point spacing in the CIELAB space or to increase locally the density of grid points in the CIELAB space according to a specific intention. Furthermore, performing similar weighting in the case of $SI_2$, $SI_3$ as well, it is possible to control readily the grid point spacing.

Configurations in which grid point spacing in the CIELAB space is controlled through design of weighted SEI are especially useful where grid point spacing is to be made non-uniform according to ink characteristics, that is, in the case where grid points are increased in number at a low ink recording rate with consideration for the ink characteristic, such that the degree of change in density decreases with the increase in the ink recording rate. Further, a configuration in which the grid point density is locally increased in the CIELAB space through design of weighted SEI is especially useful, e.g. where local increase in color conversion accuracy is desired.

D12. Variant Example 12

In the above-described embodiment, smoothing of arrangement of optimization-targeted grid points is performed by extracting individual neighboring grid points for each area in the gamut of the CIELAB space. Therefore, there is no connection among grid points optimized by means of $SI_1$ to $SI_3$, respectively. However weighting calculations may be also performed such that the degree of smoothness of arrangement increases even at the boundaries of each area, while optimizing grid points with individual SEI for each area.

With the $SI_1$ to $SI_2$ described hereinabove, one or two components of position information (Pr, Pg, Pb) were held constant, but with $SI_3$ all three components of position information (Pr, Pg, Pb) can vary. Therefore, binding conditions change sharply in the vicinity of gamut boundaries. Even among gamut boundaries, binding conditions change markedly between ridgelines and exterior surfaces forming gamut boundaries. If binding conditions vary sharply, the degree of freedom when moving grid points in order to effect smoothing of grid point arrangement and the degree of freedom relating to the direction of motion will differ completely, thereby creating the risk of discontinuity in the degree of smoothness of grid point arrangement in this case. Accordingly, in order to prevent sharp variations in binding conditions, there is added to the SEI a term that has been weighted so that position information becomes more resistant to variation as the gamut boundaries are approached. An SEI like that given by Equation (29) can be employed for such a configuration.

(Equation (29))

Here, $W_r$ is a weight used when position information Pr is variable; $Pr_0$ is current position information. Similarly, $W_g$, $W_b$ can be defined as weights used respectively when position information Pg or Pg is variable. Each weight has a small value in the vicinity of the center of the gamut, increasing in value in the vicinity of gamut boundaries. In Equation (29), the area around gamut boundaries is taken into consideration for the position information in the case where only Pr is variable; by means of the second term of Equation (29), position information Pr is made more resistant to change as a grid point approaches a gamut boundary (in this case, the end portion of an ridgeline formed on a gamut boundary).

Thus, in the aforementioned second term, the value of weighting factor $W_r$ increases as a gamut boundary is approached, and the second term becomes greater as the distance between position information Pr and current position $Pr_0$ increases. Therefore, in an optimization processing that minimizes $SI_1$, the values of the two components of position information become close to each other as the values of position information Pr, $Pr_0$ come closer to each other and closer to gamut boundaries. According to the same approach, a second term can also be added to $SI_1$ in the case where only position information Pg is allowed to vary, or only position information Pb is allowed to vary. It goes without saying that a similar approach can be followed for $SI_2$, $SI_3$. Thus, for $SI_2$, since two components of position information are variable, two terms are added to SEI; and for $SI_3$, since three components of position information are variable, three terms are added to SEI.

D13. Variant Example 13

In the smoothing processing described above, the degree of smoothness of grid point arrangement in the CIELAB space is verified using calorimetric values described in the ink profile 142, but smoothing may be also carried out in a different color space. For example, by considering the grid point arrangement of ink amount data in an ink amount space and calculating an evaluation index for evaluating the degree of smoothness of grid point arrangement, smoothing can be performed in the ink amount space.

D14. Variant Example 14

Further, in the smoothing processing described above, smoothing is performed using $16^3$ or fewer representative samples selected in Step S35; however, using these representative samples, the number of representative samples can be increased or decreased, or grid point positions of the representative samples can be adjusted to perform the smoothing processing. For example, by performing non-uniform interpolation on the basis of representative samples, there are calculated about $64^3$ grid points and ink amounts corresponding thereto in the CIELAB space, and the calculation results are used for smoothing. In this case, the degree of smoothness of arrangement can be evaluated for grid points that are closer together than is the case where smoothing is performed for $16^3$ samples, thereby making it easy to improve the degree of smoothness. A configuration may be also used in which smoothing is executed by extracting grid points arranged as uniformly as possible in the CIELAB space by performing non-uniform interpolation on the basis of representative samples. In this case, because the distortion in the initial grid point arrangement is decreased, it becomes difficult to reach local minimum in the calculation process and the smoothing process can be facilitated. Further, position information Pr, Pg, Pb and Lab values can be associated in a simpler manner.

D15. Variant Example 15

FIG. 32 shows schematically a lookup table (LUT) as a graininess profile 15d of a variant example. In the figure, sample graininess indices GIsmp corresponding to ink amount data for graininess evaluation located on the grid points with a constant spacing in the ink amount space are described in the LUT. In Step S200 in FIG. 14, because the evaluation color preparation unit 1290 essentially performs uniform generation of ink amount data for graininess evaluation in the CIELAB space, no ink amount data for graininess evaluation are present in the grid points with a constant spacing in learning data CD. Therefore, when a LUT is created, representative ink amount data present on grid points are generated, and sample graininess indices GIsmp corresponding to the representative ink amount data are calculated by interpolation calculations on the basis of the learning data CD. The calculated sample graininess indices GIsmp and representative ink amount data are then associated and recorded.

Because the LUT describes the graininess index GI that corresponds only to representative ink amount data on the grid points, an interpolation method for calculating the graininess index GI for any sample ink amount data other than the representative ink amount data has to be prepared in addition to the LUT. Here, an interpolation method can be applied according to which interpolation of graininess index GI corresponding to any sample ink amount data is performed by weighting based on mutual arrangement of any sample ink amount data in the ink amount space and the representative ink amount data that surround the data. The weighting based on mutual arrangement of any sample ink amount data in the ink amount space and the representative ink amount data that surround them may be ascertained by the distance between any sample ink amount data in the ink amount space and the representative ink amount data that surround them, and also may be ascertained by a volume of a tetrahedron having any ink amount data as apexes. It goes without saying that spline interpolation can be also applied.

D16. Variant Example 16

Further, when correspondence relationship between ink amount data for graininess evaluation in the learning data CD and sample graininess index GIsmp can be approximated with an approximation equation, a graininess index GI corresponding to any ink amount set can be also calculated with the approximation equation. For example, the graininess index GI may be calculated with a polynomial approximation equation having sample ink amount data as variables of a predetermined dimension. In the polynomial approximation equation, coefficients and constants may be optimized, for example, by a least square method. This approach is effective where the possibility of approximating the correspondence relationship between ink amount data for graininess evaluation and sample graininess index GIsmp with an approximation equation has been clarified in advance and where the number of inks constituting an ink set is small.

D17. Variant Example 17

In the embodiments, ink amount data for graininess evaluation are almost uniformly distributed in the calorimetric value space, but the ink amount data for graininess evaluation may be prepared based only on uniformity in the ink amount space. In this case, the processing can be simplified because it is not necessary to perform verification of colorimetric values obtained with the spectral printing model converter 100 with respect to each ink amount data for graininess evaluation. Conversely, ink amount data for graininess evaluation can be also prepared based only on uniformity in the calorimetric value space.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for performing color conversion by referring to a profile defining correspondence relationship between colorimetric values and ink amount data, comprising:
   a profile memory that stores a plurality of profiles; and
   a color converter that selects one profile from among the plurality of profiles and converts given colorimetric values into ink amount data by referring to the selected profile, wherein
   each profile is produced using a plurality of sample ink amount data selected based on evaluation indices including a color difference index and an image quality index,
   the color difference index represents a color difference between a sample color calculated from a spectral reflectance of a virtual sample patch that has to be printed with an ink amount represented by the sample ink amount data and a comparative color selected as a basis for comparison,
   at least one of the image quality indices is a graininess index obtained by applying the sample ink amount data to a neural network prepared based on a plurality of correspondence relationships between ink amount data for graininess evaluation and sample graininess indices obtained by actually evaluating a patch for graininess evaluation that is actually printed with the ink amount represented by the ink amount data for graininess evaluation, the neural network being prepared by taking a plurality of correspondence relationships between the ink amount data for graininess evaluation and the sample graininess indices,
   the ink amount data for the graininess evaluation includes at least two kinds of ink amount data sets, one ink amount data set reproducing a patch for the graininess evaluation, the patch providing a uniform gradation for at least a primary color in an ink amount space, and another ink amount data set being distributed in the entire ink amount space, a number of the another ink amount data set being selected so that a number of a colorimetric value of the patch for the graininess evaluation belonging to each brightness region corresponds to a cross-sectional surface area for each brightness of a printer gamut of a printer that prints using the selected profile, and
   the ink amount data for the graininess evaluation includes an ink amount data set selected from a gray region within a constant chroma $C^*=5$ with a gray axis as a center and an ink amount data set in a vicinity of skin color and sky blue color.

2. The apparatus according to claim 1, wherein preparation is made such that the ink amount data for graininess evaluation are substantially uniform in an ink amount space and colorimetric values of the patch for graininess evaluation are substantially uniform in a colorimetric value space.

3. The apparatus according to claim 1, wherein
   the color difference index includes color difference indices of a plurality of usable types,
   the image quality index includes the graininess index and image quality indices of a plurality of usable types; and
   the color conversion unit receives a selection of the color difference indices and image quality indices made by a user and selects a profile produced using evaluation indices including the selected color difference indices and image quality indices.

4. The apparatus according to claim 1, wherein
   the color difference indices and image quality indices are of a plurality of usable types that are associated with a plurality of printing conditions, and
   the color conversion unit receives one selection from among the plurality of printing conditions and selects a profile produced using an evaluation index including a color difference index and an image quality index of adequate types associated with the selected image condition.

5. The apparatus according to claim 1, wherein
   the plurality of profiles are associated with images of a plurality of types that are reproduced by the ink amount data, and
   the color conversion unit receives one selection from among the images of a plurality of types and selects a profile associated with the selected image type.

6. A method for performing color conversion by referring to a profile defining correspondence relationship between colorimetric values and ink amount data, the method comprising the steps of:
   (a) preparing a plurality of profiles;
   (b) selecting one profile from among the plurality of profiles; and
   (c) converting a given colorimetric value to ink amount data by referring to the selected profile, wherein
   each profile is produced using a plurality of sample ink amount data selected based on evaluation indices including a color difference index and an image quality index, the color difference index represents a color difference between a sample color calculated from a spectral reflectance of a virtual sample patch that has to be printed with an ink amount represented by the sample ink amount data and a comparative color selected as a basis for comparison, at least one of the image quality indices is a graininess index obtained by applying the sample ink amount data to a neural network prepared based on a plurality of correspondence relationships between ink amount data for graininess evaluation and sample graininess indices obtained by actually evaluating a patch for graininess evaluation that is actually printed with an ink amount represented by the ink amount data for graininess evaluation, the neural network being prepared by taking a plurality of correspondence relationships between the ink amount data for graininess evaluation and the sample graininess indices, the ink amount data for the graininess evaluation includes at least two kinds of ink amount data sets, one ink amount data set reproducing a patch for the graininess evaluation, the patch providing a uniform gradation for at least a primary color in an ink amount space, and another ink amount data set being distributed in the entire ink amount space, a number of the another ink amount data set being selected so that a number of a colorimetric value of the patch for the graininess evaluation belonging to each brightness region corresponds to a cross-sectional surface area for each brightness of a printer gamut of a printer that prints using the selected profile, the ink amount data for the graininess evaluation includes an ink amount data set selected from a gray region within a constant chroma $C^*=5$ with a gray axis as a center and an ink amount data set in a vicinity of skin color and sky blue color, and each step of the method for performing color conversion is executed by a microprocessor.

7. A method for creating a profile defining correspondence relationship between colorimetric values and ink amount data representing a set of ink amounts of a plurality of inks that can be used by a printer, the method comprising the steps of:

(a) preparing a spectral printing model converter configured so as to convert ink amount data into a spectral reflectance of a color patch that is printed according to the ink amount data;

(b) preparing a plurality of sample ink amount data that represent respective ink amount set of a plurality of inks;

(c) converting each sample ink amount data to a spectral reflectance of a virtual sample patch that has to be printed with an ink amount represented by the sample ink amount data by using the spectral printing model converter;

(d) selecting at least one from among a plurality of color different indices each representing a color difference between a sample color calculated from the spectral reflectance and a comparative color selected as a basis for comparison, and selecting at least one from among a plurality of image quality indices including at least a graininess index respectively representing an image quality of a virtual sample patch that has to be printed according to the sample ink amount data;

(e) preparing a neural network based on a plurality of correspondence relationships between ink amount data for graininess evaluation and sample graininess indices obtained by actually evaluating a patch for graininess evaluation that is actually printed with an ink amount represented by the ink amount data for graininess evaluation, the neural network being prepared by taking a plurality of correspondence relationships between the ink amount data for graininess evaluation and the sample graininess indices;

(f) calculating values of the selected color difference index and image quality index with respect to the plurality of sample ink amount data and calculating a value of the graininess index by applying the sample ink amount data to the neural network when the graininess index is selected from among image quality indices;

(g) calculating an evaluation index by using the values of the selected color difference index and image quality index with respect to the plurality of sample ink amount data;

(h) selecting a plurality of sample ink amount data on the basis of the evaluation index; and (i) creating a profile defining correspondence relationship between colorimetric values and ink amount data on the basis of the selected plurality of sample ink amount data, wherein the ink amount data for the graininess evaluation includes at least two kinds of ink amount data sets, one ink amount data set reproducing a patch for the graininess evaluation, the patch providing a uniform gradation for at least a primary color in an ink amount space, and another ink amount data set being distributed in the entire ink amount space, a number of the another ink amount data set being selected so that a number of a colorimetric value of the patch for the graininess evaluation belonging to each brightness region corresponds to a cross-sectional surface area for each brightness of a printer gamut of a printer that prints using the profile, the ink amount data for the graininess evaluation includes an ink amount data set selected from a gray region within a constant chroma $C^*=5$ with a gray axis as a center and an ink amount data set in a vicinity of skin color and sky blue color, and each step of the method for creating a profile is executed by a microprocessor.

8. An apparatus for creating a profile defining correspondence relationship between colorimetric values and ink amount data representing a set of ink amounts of a plurality of inks that can be used by a printer, comprising:

a spectral printing model converter configured so as to convert ink amount data into a spectral reflectance of a color patch that is printed according to the ink amount data, and convert each of a plurality of sample ink amount data that respectively represent the ink amount set of a plurality of inks to a spectral reflectance of a virtual sample patch that has to be printed with an ink amount represented by the sample ink amount data;

a selector that selects one from among a plurality of color different indices each representing a color difference between a sample color calculated from the spectral reflectance and a comparative color selected as a basis for comparison and also selects at least one from among a plurality of image quality indices including at least a graininess index respectively representing an image quality of a virtual sample patch that has to be printed according to the sample ink amount data;

a neural network that is prepared based on a plurality of correspondence relationships between ink amount data for graininess evaluation and sample graininess indices obtained by actually evaluating a patch for graininess evaluation that is actually printed with an ink amount represented by the ink amount data for graininess evaluation, the neural network being prepared by taking a plurality of correspondence relationships between the ink amount data for graininess evaluation and the sample graininess indices;

a calculator that calculates values of the selected color difference index and image quality index with respect to the plurality of sample ink amount data and calculates a value of the graininess index by applying the sample ink amount data to the graininess profile when the graininess index is selected from among image quality indices;

a calculator that calculates an evaluation index by using the values of the selected color difference index and image quality index with respect to the plurality of sample ink amount data;

a selector that selects a plurality of sample ink amount data on the basis of the evaluation index; and a profile creation unit that produces a profile defining correspondence relationship between colorimetric values and ink amount data on the basis of the selected plurality of sample ink amount data, wherein the ink amount data for the graininess evaluation includes at least two kinds of ink amount data sets, one ink amount data set reproducing a patch for the graininess evaluation, the patch providing a uniform gradation for at least a primary color in an ink amount space, and another ink amount data set being distributed in the entire ink amount space, a number of the another ink amount data set being selected so that a number of a colorimetric value of the patch for the graininess evaluation belonging to each brightness region corresponds to a cross-sectional surface area for each brightness of a printer gamut of a printer that prints using the profile, and the ink amount data for the graininess evaluation includes an ink amount data set selected from a gray region within a constant chroma $C^* = 5$ with a gray axis as a center and an ink amount data set in a vicinity of skin color and sky blue color.

* * * * *